United States Patent [19]
Traeger

[11] Patent Number: 5,978,569
[45] Date of Patent: *Nov. 2, 1999

[54] SYSTEM HAVING PLURALITY OF DOCKING UNIT RECEPTACLES FOR TRANSMITTING DATA BETWEEN PLURALITY OF PORTABLE DATA ENTRY TERMINALS IN LOCAL AREA NETWORK WITH A CENTRAL CONTROLLER

[75] Inventor: Robert J. Traeger, Cedar Rapids, Iowa

[73] Assignee: Norand Corporation, Iowa

[*] Notice: This patent is subject to a terminal disclaimer.

[21] Appl. No.: 08/739,616

[22] Filed: Oct. 30, 1996

Related U.S. Application Data

[63] Continuation of application No. 08/250,827, May 31, 1994, abandoned, which is a continuation of application No. 07/921,408, Jul. 31, 1992, Pat. No. 5,317,691, which is a continuation of application No. 07/759,807, Sep. 16, 1991, abandoned, which is a continuation of application No. 07/400,833, Aug. 30, 1989, abandoned, which is a continuation-in-part of application No. 07/347,298, May 2, 1989, abandoned, and a continuation-in-part of application No. 07/347,849, May 3, 1989, abandoned.

[51] Int. Cl.$^6$ ..................................................... G06F 13/00
[52] U.S. Cl. ............... 395/200.74; 395/884; 395/200.62
[58] Field of Search ........................... 235/380; 375/211; 395/200.61, 200.52, 200.74, 884

[56] References Cited

U.S. PATENT DOCUMENTS

| | | | |
|---|---|---|---|
| 3,767,206 | 10/1973 | Rehklau et al. | 360/15 |
| 4,345,147 | 8/1982 | Aaron et al. | 235/385 |
| 4,396,985 | 8/1983 | Ohara | 364/405 |
| 4,491,785 | 1/1985 | Pecukonis | 324/67 |
| 4,530,069 | 7/1985 | Desrochers | 395/275 |
| 4,642,556 | 2/1987 | Pecukonis | 324/67 |
| 4,689,478 | 8/1987 | Hale et al. | 235/380 |
| 4,734,710 | 3/1988 | Sato et al. | 346/76 PH |
| 4,738,632 | 4/1988 | Schmidt et al. | 439/341 |
| 4,773,032 | 9/1988 | Uehare et al. | 364/709.04 |
| 4,790,762 | 12/1988 | Harms et al. | 439/59 |
| 4,799,126 | 1/1989 | Kruse et al. | 361/101 |
| 4,837,788 | 6/1989 | Bird | 375/211 |
| 5,189,291 | 2/1993 | Siemiatkowski | 235/472 |
| 5,195,183 | 3/1993 | Miller et al. | 395/200.61 |
| 5,317,691 | 5/1994 | Traeger | 395/200 |
| 5,371,858 | 12/1994 | Miller et al. | 395/200.52 |

OTHER PUBLICATIONS

Norand Data Systems—Data Communications; Norand Corp; 1988.

Norand NM602 Multichannel Controller (without ACU) Instructions.

NX1400 Quad Communication Rack; Service Instruction Book; Norand Corp. Nov. 1987.

4000 Series Communication Network; Norand Corp; 1989.

*Primary Examiner*—Thomas C. Lee
*Assistant Examiner*—David Ton
*Attorney, Agent, or Firm*—Akin,Gump,Struass, Hauer & Feld, L.L.P.

[57] ABSTRACT

In an exemplary embodiment, portable data devices can be coupled with a local area network at any of a multiplicity of points and integrated into the system. The preferred system is highly flexible and closely adaptable to changing needs of an individual user. For example, unitary multiple docking devices each receiving a plurality of hand-held computerized data terminals may be chained in a series to a single primary controller which may have a further LAN channel including an auxiliary unit which may supply charging power to a further series of multiple docking devices, added to the system as needed. A preferred auxiliary unit is capable of handling two-way communication without the provision of a direction control line in the channel. A preferred LAN system may have unitary printed circuit boards or other rigid network pathways provided with multiple docking receptacles. The control for the LAN system will automatically establish identities for randomly added devices.

9 Claims, 42 Drawing Sheets

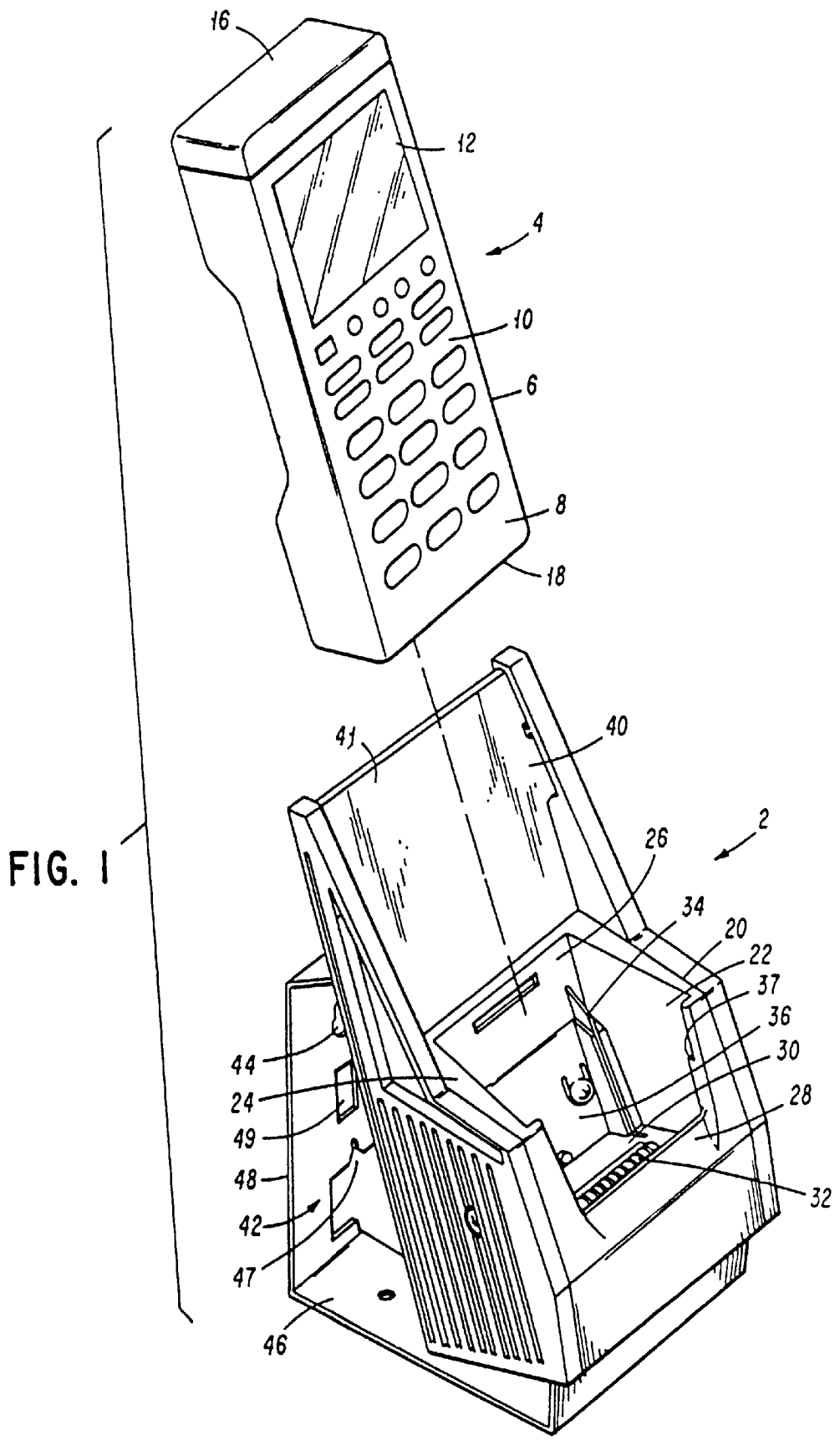

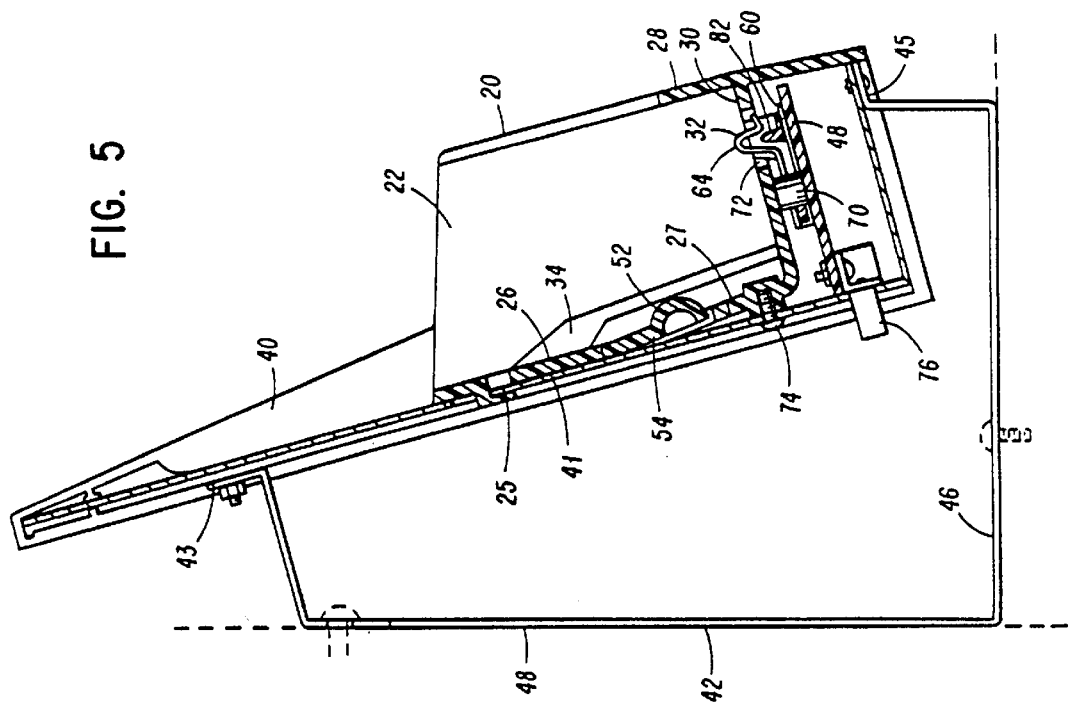
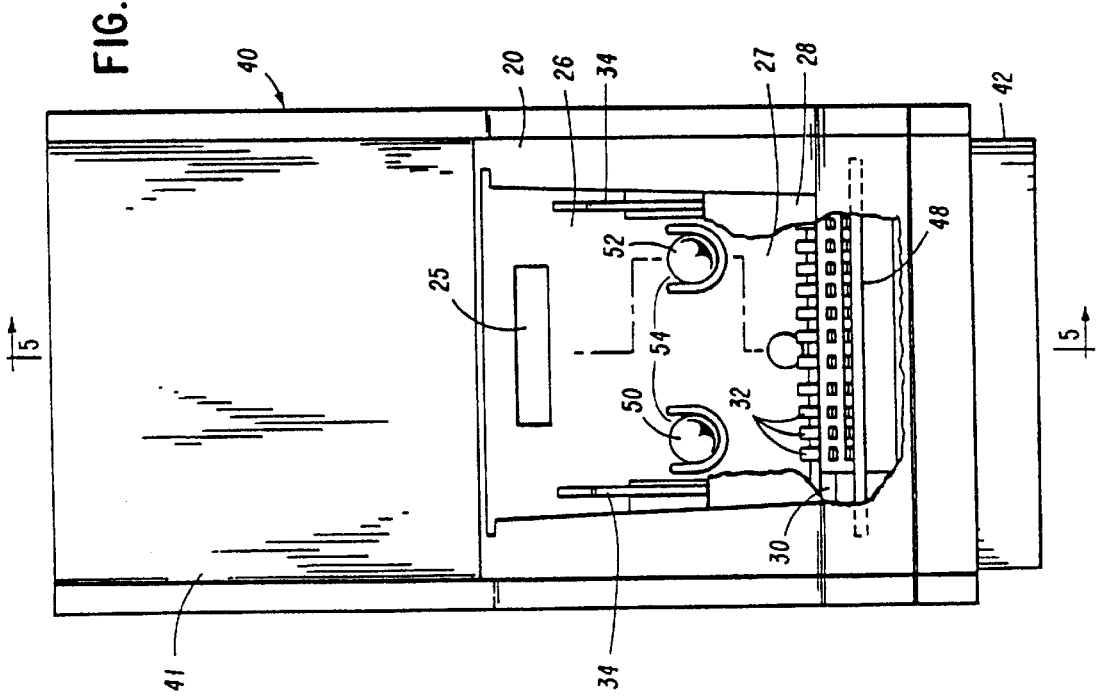

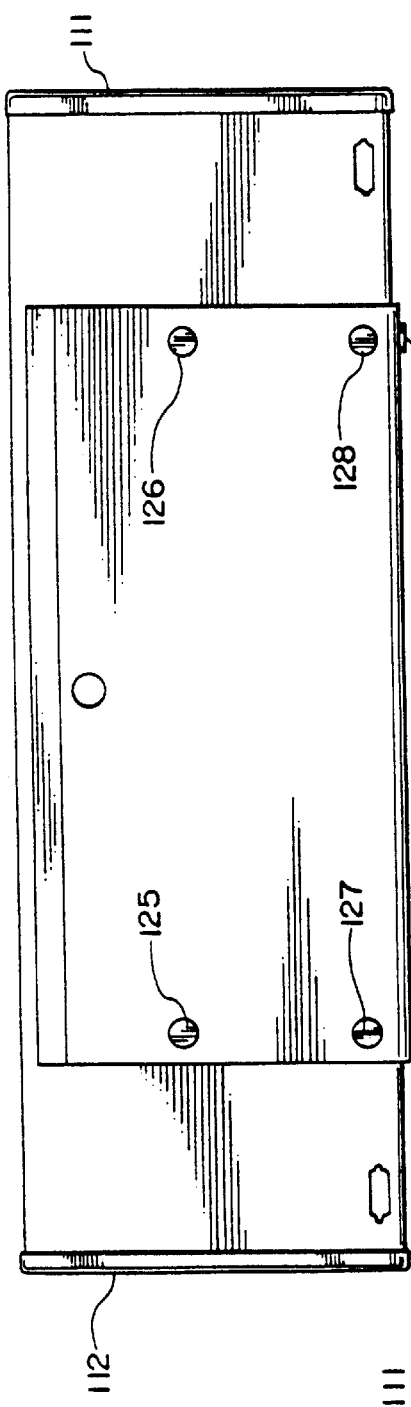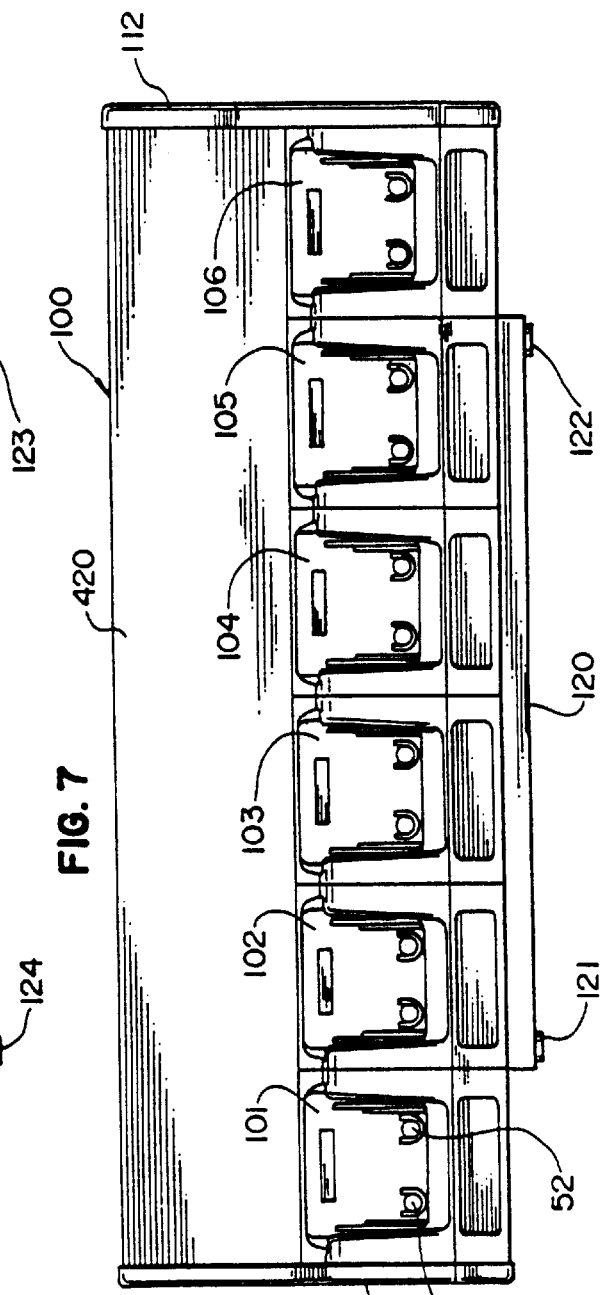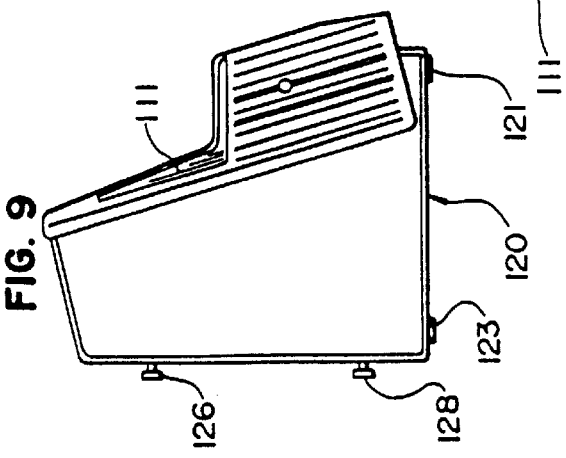

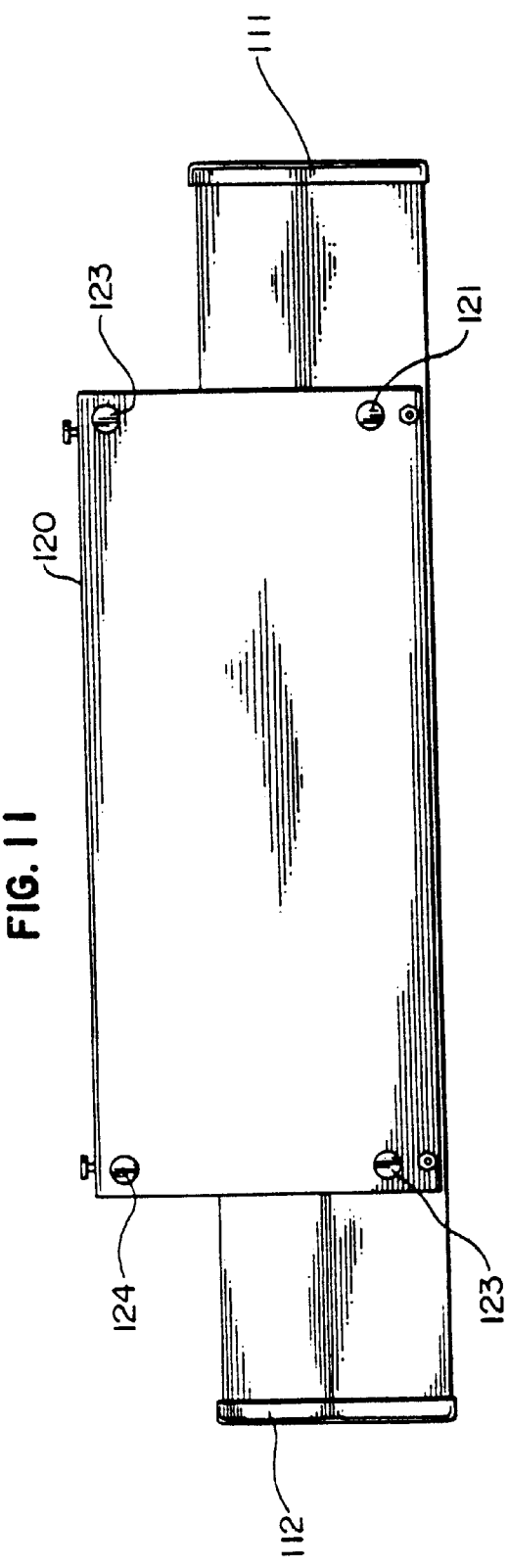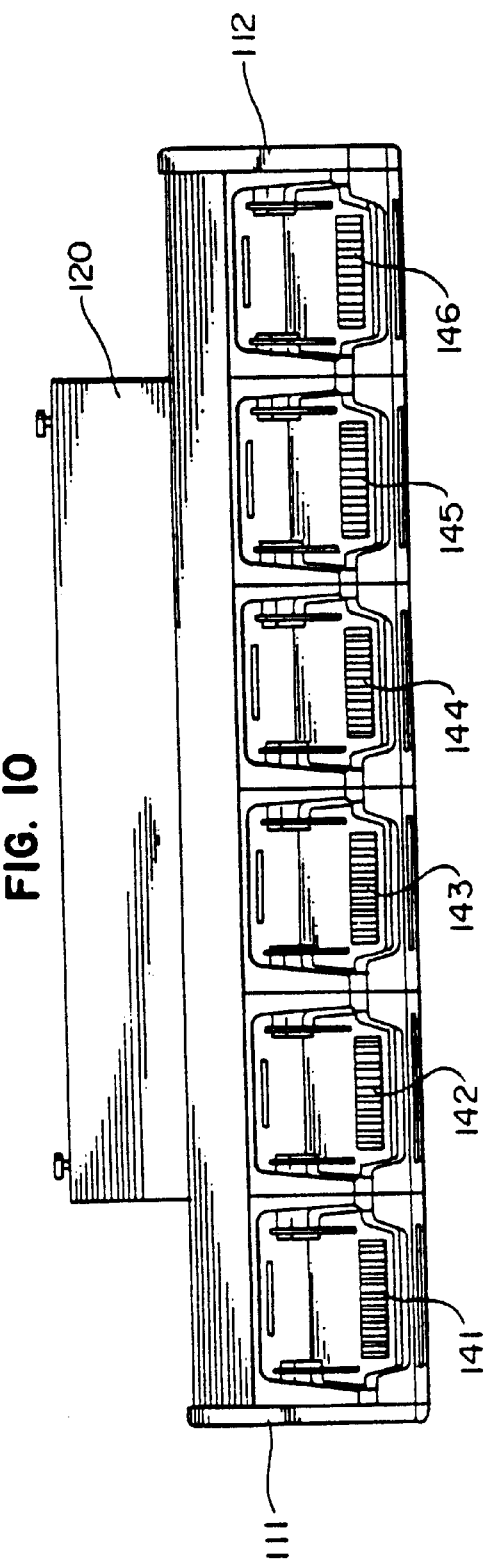

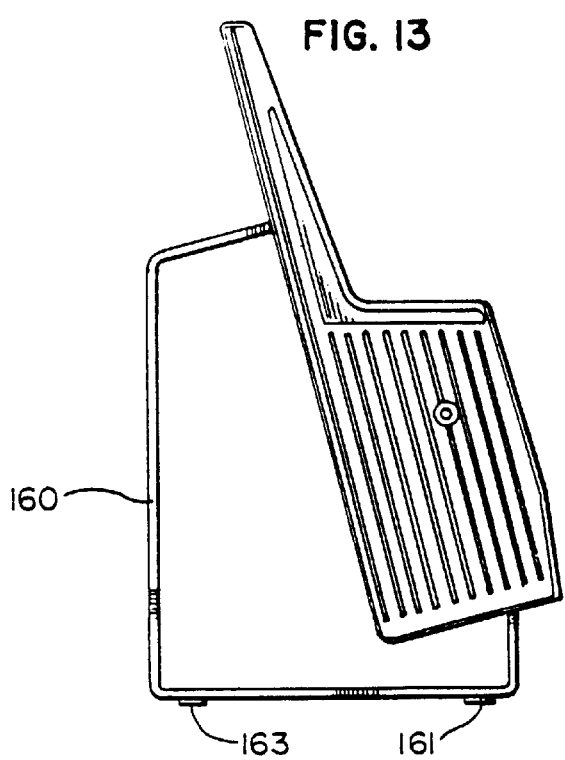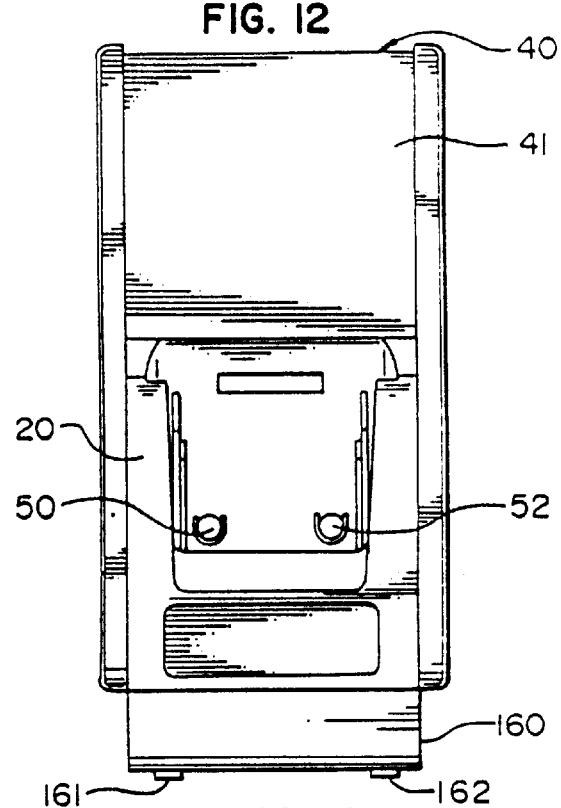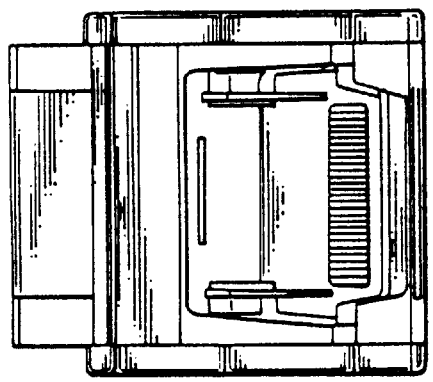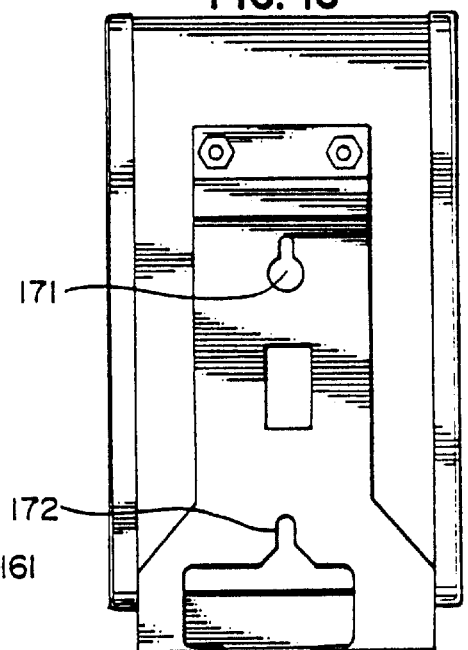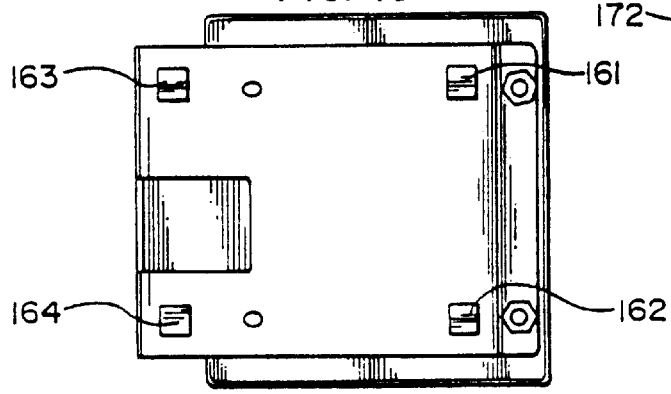

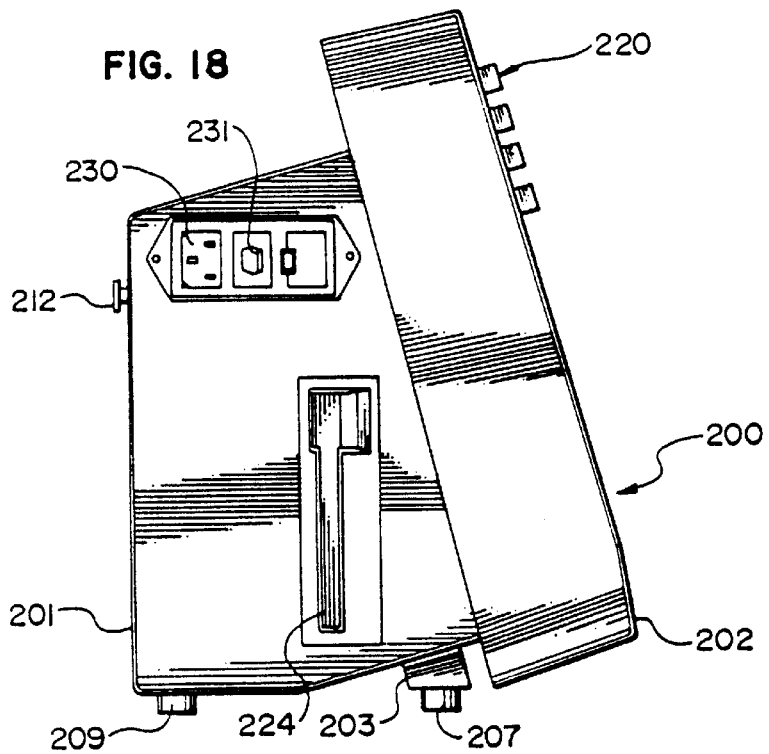
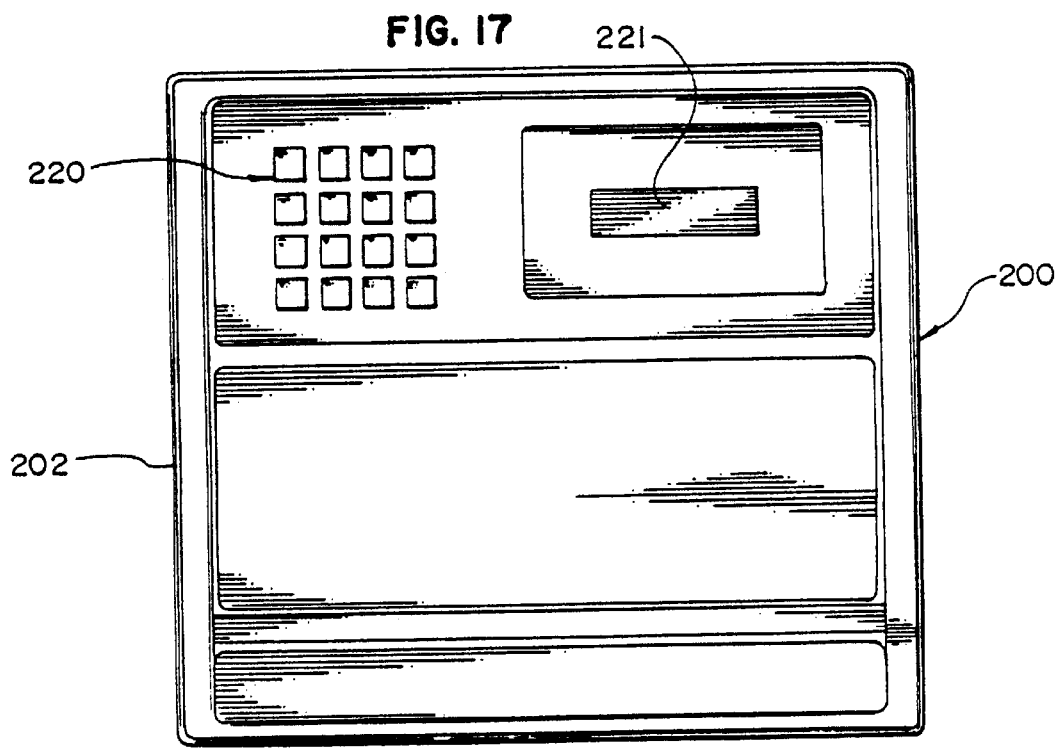

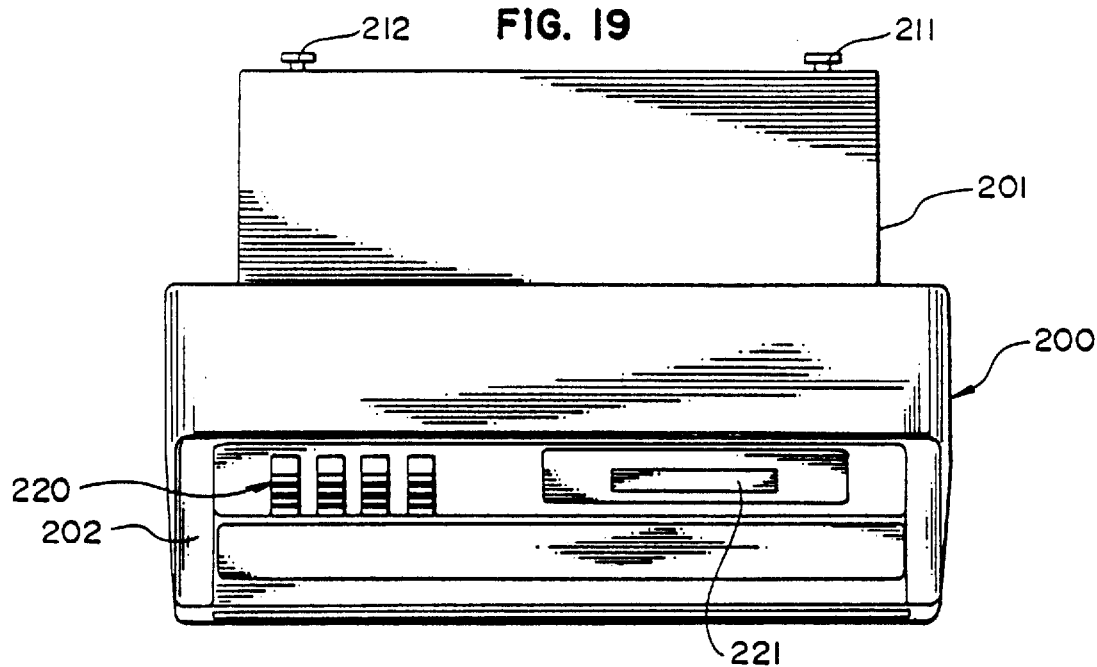
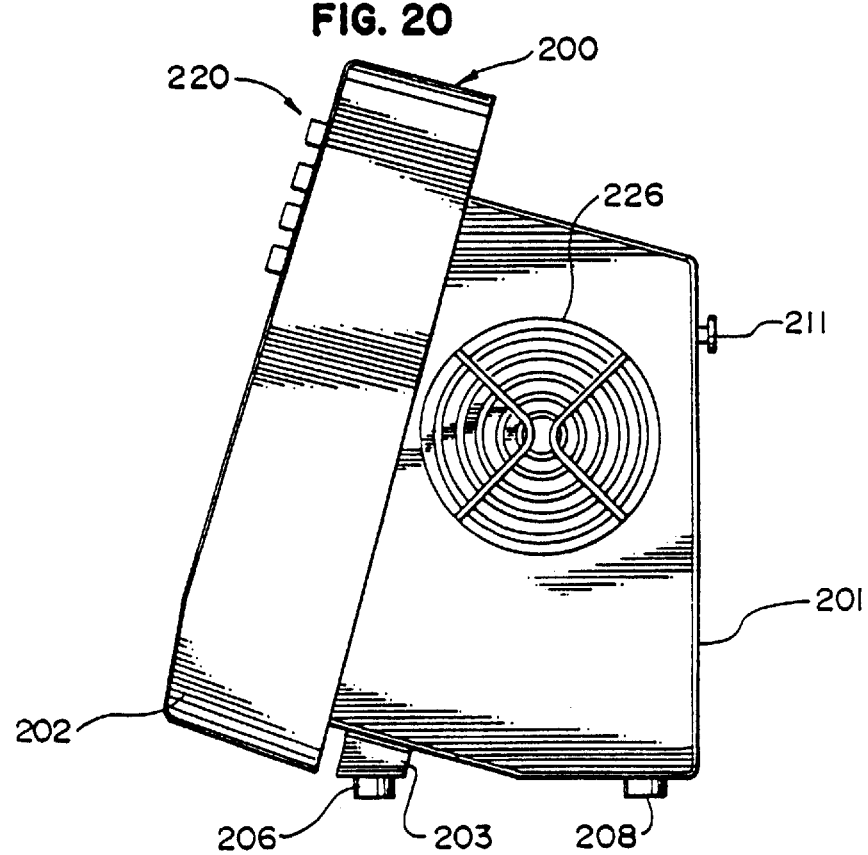

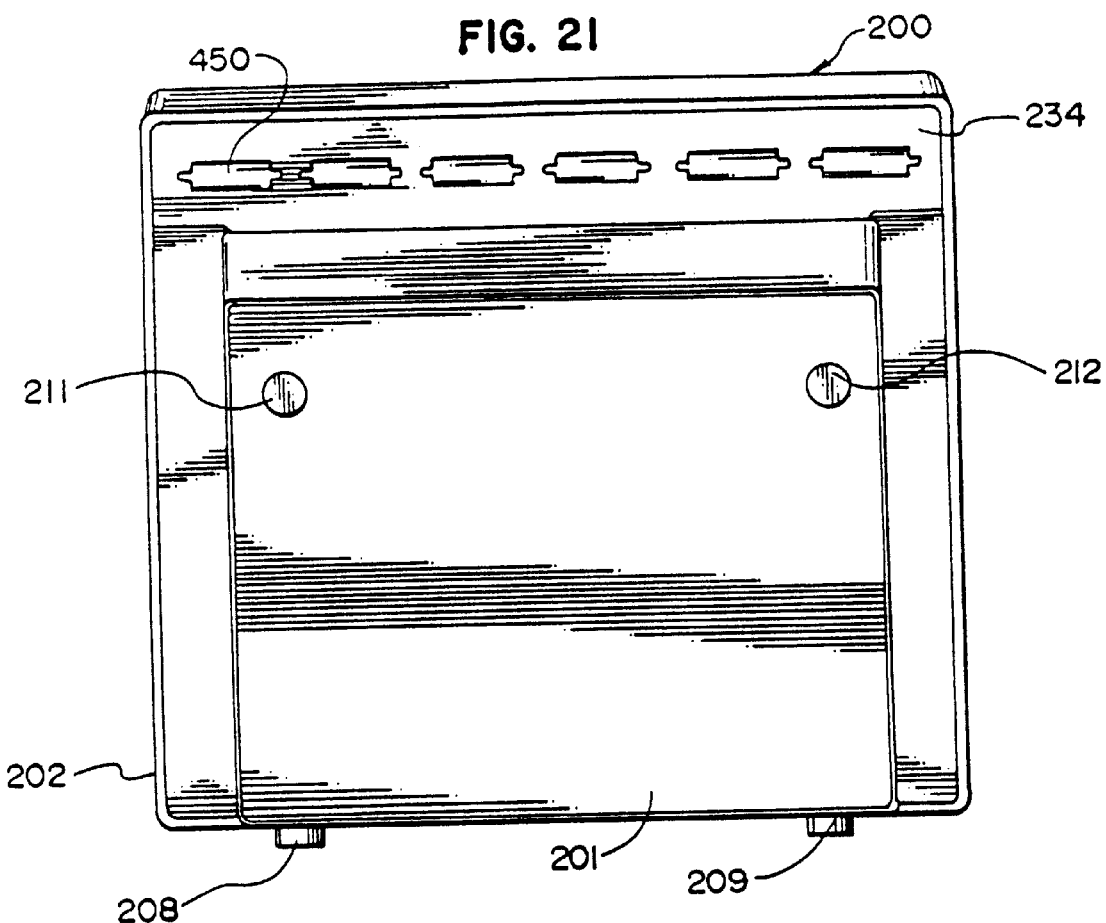
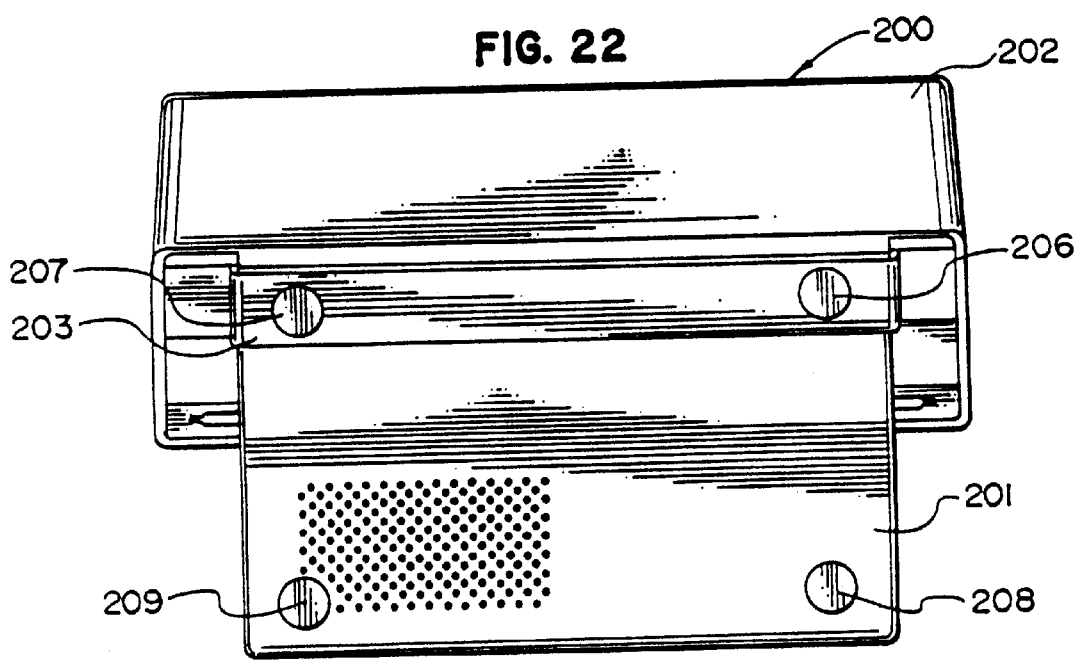

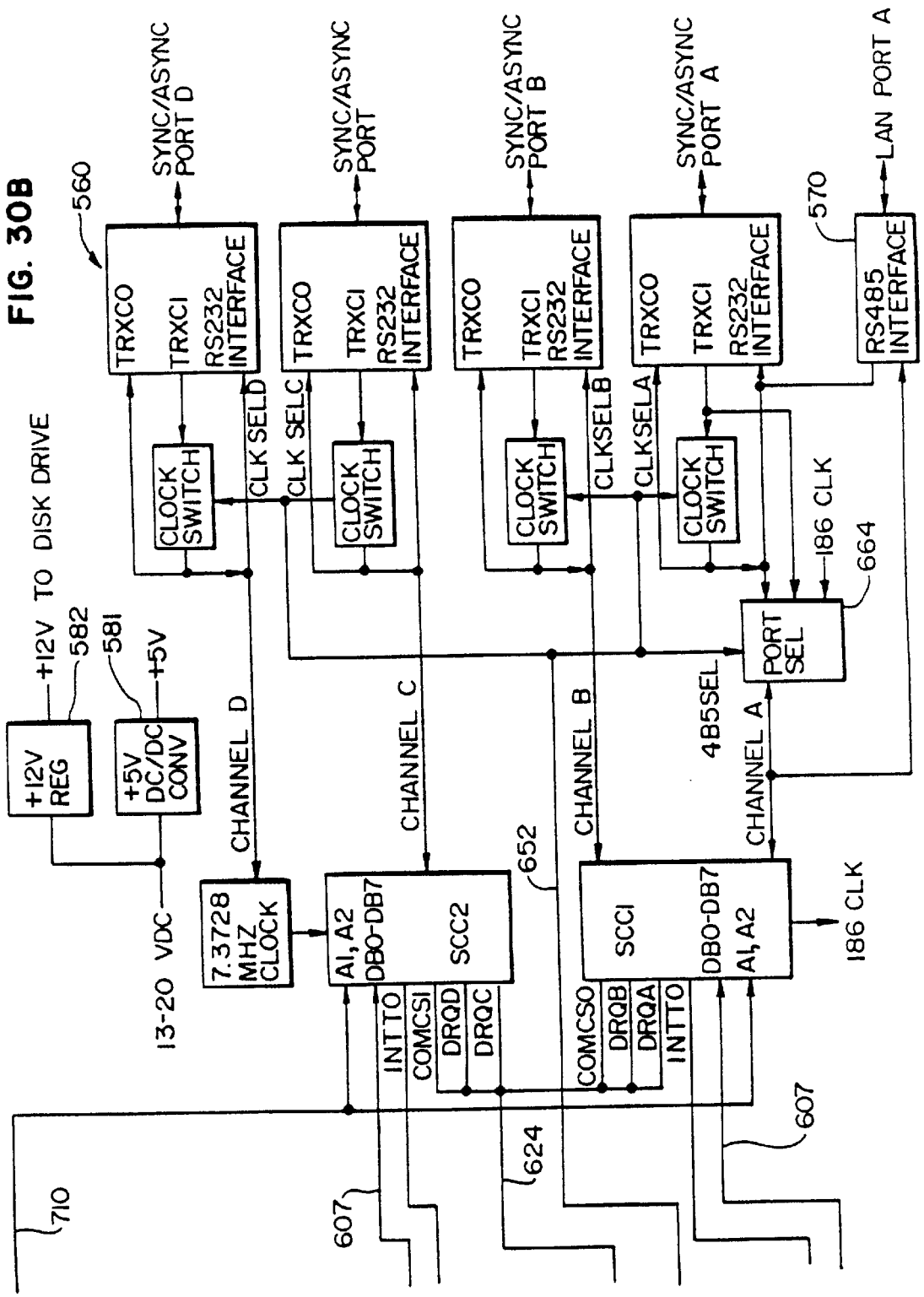

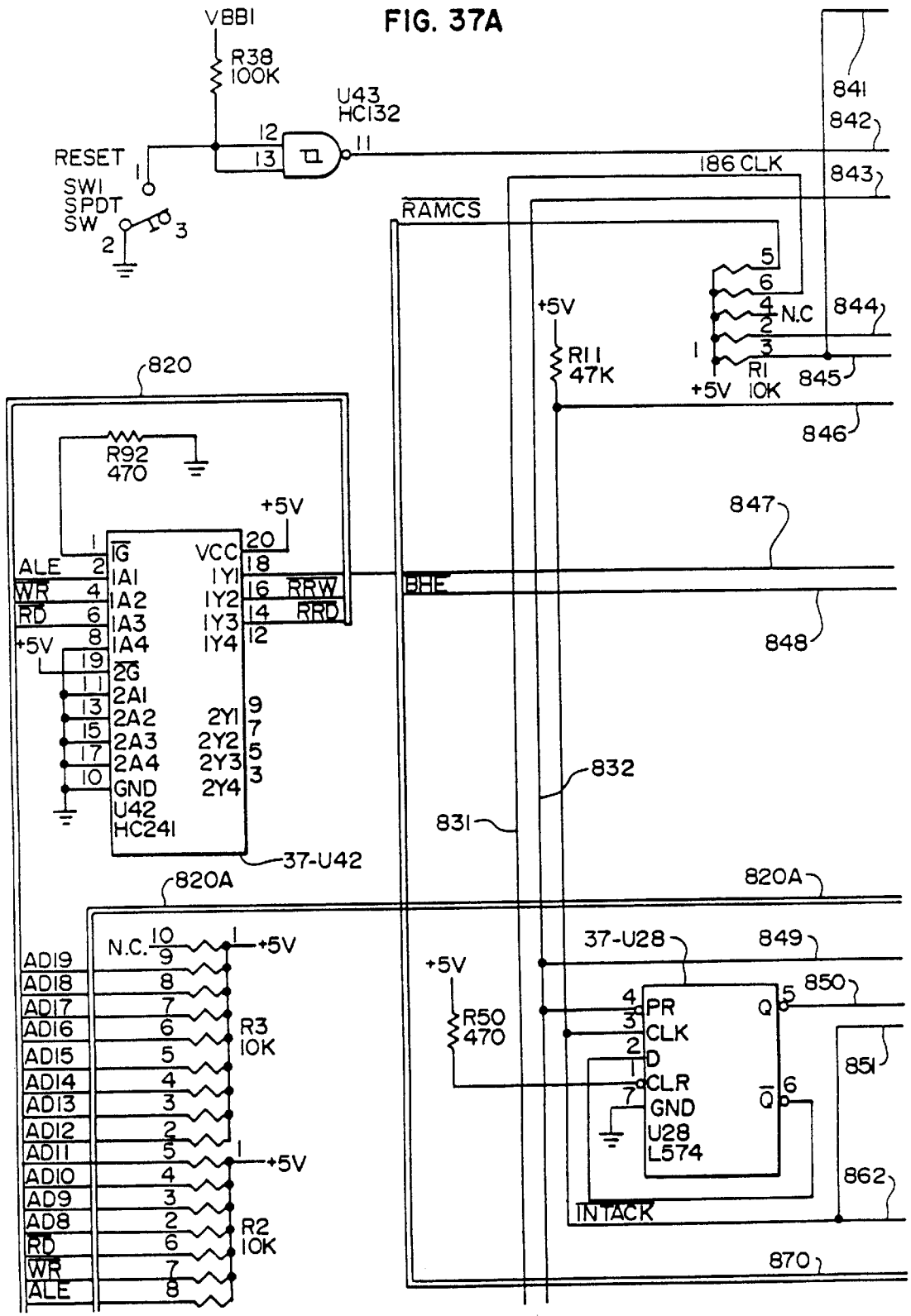

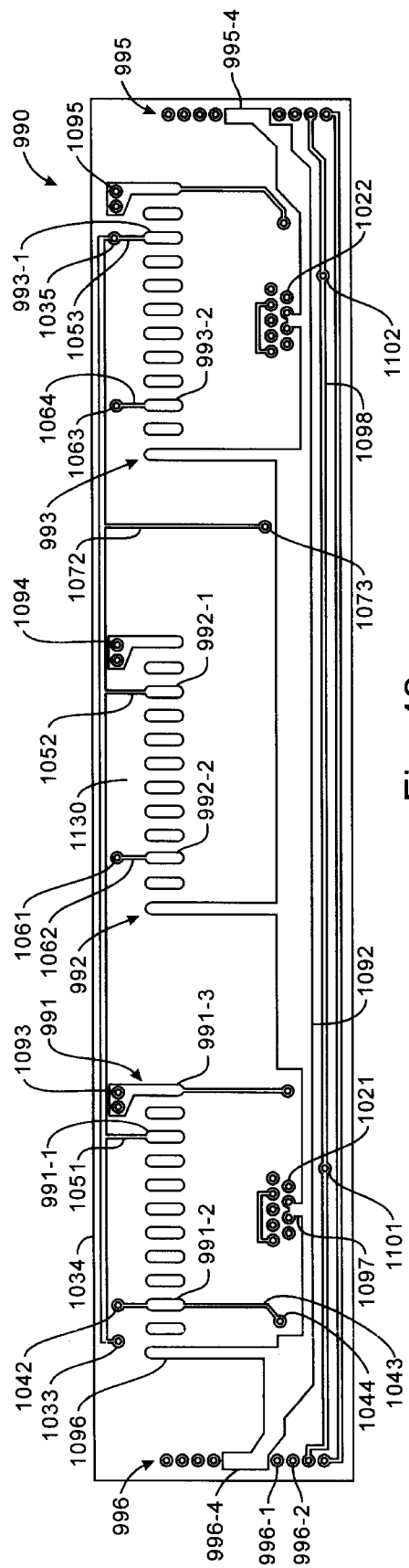

SYSTEM HAVING PLURALITY OF DOCKING UNIT RECEPTACLES FOR TRANSMITTING DATA BETWEEN PLURALITY OF PORTABLE DATA ENTRY TERMINALS IN LOCAL AREA NETWORK WITH A CENTRAL CONTROLLER

CROSS-REFERENCE TO RELATED APPLICATIONS

The present application is a continuation of U.S. patent application Ser. No. 08/250,827 (Attorney Docket No. DN36919XB), filed May 31, 1994, by Robert J. Traeger, abandoned, which is itself a continuation of U.S. patent application Ser. No. 07/921,408, filed Jul. 31, 1992, now U.S. Pat. No. 5,317,691, which itself is a continuation of U.S. patent application Ser. No. 07/759,807 filed Sep. 16, 1991, abandoned, which itself is a continuation of U.S. patent application Ser. No. 07/400,833, filed Aug. 30, 1989, abandoned, which itself is a continuation-in-part of U.S. patent application Ser. No. 07/347,298, filed May 2, 1989, abandoned, and a continuation-in-part of U.S. patent application Ser. No. 07/347,849, filed May 3, 1989, abandoned. The aforementioned applications are hereby incorporated herein by reference in their entirety.

BACKGROUND OF THE INVENTION

In the data capture field, there are many applications where hand-held data terminals should be of rugged construction so as to survive rough handling. Many operators are not inclined toward painstaking or precise manipulations. An example is in the use of RF data capture terminals on forklift trucks in factories and warehouses where items to be transported are identified by bar codes. Other examples are found in the field of route delivery and direct store delivery where many items are handled and the terminal means automates the accounting function. Even in applications where bar code data is transmitted on-line to a central station, it may be desirable for hand-held terminals to be inserted into docking apparatus for the interchange of data signals e.g. the loading of scheduling information or the like into the terminal at the beginning of a working shift. Further where terminal means has memory capacity for accumulating data during a delivery operation or the like, it may be desirable for such data to be transferred to a printer so that a hard copy may be produced. In cases where rechargeable batteries are used, the docking apparatus may provide for the recharging of such batteries at the same time as data communication is taking place.

It is conceived that it would be highly advantageous to provide a data communication system with docking apparatus adaptable to a wide range of terminal means, and which furthermore could be quickly and simply loaded in a relatively foolproof manner, and without requiring attention and care from operators engaged in physically demanding and arduous work routines.

SUMMARY OF THE INVENTION

Accordingly, it is an important object of the present invention to provide a data communication system wherein components can be readily detached for portable operation. A further object resides in the provision of such a data communication system wherein multiple devices may be connected at different locations on a local area network and integrated into a data communication system.

In a presently preferred configuration for communication with portable data capture terminals, a local area network (LAN) has the following characteristics:

(1) The LAN is configured so that multiple devices may be connected simultaneously.
(2) The LAN provides reliable two-way data communication.
(3) The LAN may have a total length up to hundreds of feet.
(4) Any connected device may be inactive or off without having an effect on the other devices.

Power for operation of the portable data terminal is provided by the internal terminal batteries when used portably and by the docking system when the terminal is placed in a terminal receptacle thereof. Further, the terminal batteries may receive charge while the terminal is operating from the system power so that full battery capacity is available when portable operation is again required.

The present invention relates particularly to data communication systems for portable data terminal means which are to be held in one hand during data capture operation; however the invention is also applicable to portable data terminal means which may be mounted e.g. on a belt or e.g. on a vehicle during data capture operation. The data terminal means preferably will be of size and weight to be held in one hand, even though not so held during data capture operation. Also the data terminal means may be provided with batteries so as to be capable of portable operation, and such batteries may be rechargeable.

In a typical case, the portable data terminal means will have user interface means such as a manually operated data input (e.g. a keyboard) and/or a data output (e.g. a liquid crystal display), and will contain data storage means for the storage of programming instructions and/or program data, and/or for the storage of data capture information.

In accordance with an important aspect of the present disclosure, a docking apparatus removably receives portable data terminal means for purposes of data communication e.g. with a host computer and/or for the recharging of rechargeable batteries, and is so configured that the terminal means may have electrical contact pad means generally flush with the exterior of the terminal means. Preferably an abutting type engagement between the terminal contact pad means and cooperating electrical contact means of the docking apparatus is used for each electrical connection which is required at the docking apparatus, and the typical pin and socket type docking connections are entirely avoided.

In accordance with another aspect of the invention the same basic docking structure may be provided with greater or lesser numbers of contact positions. For example, one type of hand-held terminal intended for on-line RF communication with a host computer may have six contact pads for coupling with a local area network, and may have a nine position electrical connector for compatibility with an earlier type of interface system requiring interfitting of pin and socket connectors; another type of hand-held terminal designed for route accounting applications may have e.g. twelve external contact pads and be intended for interfacing only with systems having provision for open abutment type interconnection.

A further object is to provide an expandable docking network which is closely adaptable to changing needs of various customers.

A particular feature resides in the provision of auxiliary units for expanding the local area network of a docking system without requiring a direction control line for the signal communication repeater system.

A further object is to provide a particularly economical and reliable multidocking subsystem which may be quickly and conveniently configured into a larger network as required.

A unique feature resides in a multipoint coupling with a local area network formed directly on a printed circuit board or other rigid electrical pathway of this type. For example, a six unit docking subsystem may be implemented as a single wall-or bench-mounted entity, and one or two printed circuit boards may directly carry the local area network pathways to all six docking points. In a most preferred embodiment both signal and power pathways traverse the subsystem from end to end, and further subsystems may be chained therewith at either end as desired.

Other objects, features and advantages will be apparent from the following detailed description, taken in connection with the accompanying drawings, and from the individual features and relationships of the respective appended claims.

BRIEF DESCRIPTION OF THE DRAWING FIGURES

FIG. 1 is a perspective view of a preferred docking unit for use in the present invention.

FIG. 4 is a front elevation of the embodiment of the docking unit shown in FIG. 1 with portions cut away.

FIG. 5 is a view in section along lines 5—5 of FIG. 4.

FIG. 7 is a frontal elevational view of the multidocking apparatus of FIG. 6.

FIG. 8 is a rear elevational view of the docking apparatus of FIGS. 6 and 7.

FIG. 9 is a left end elevational view of the docking apparatus as seen in FIG. 7.

FIG. 10 is a top plan view of the docking apparatus as shown in FIG. 7.

FIG. 11 is a bottom plan view of the docking apparatus of FIG. 7.

FIG. 12 is a frontal elevational view of a single docking unit such as shown in FIG. 1.

FIG. 13 is a left side elevational view of the docking unit of FIG. 12.

FIG. 14 is a top plan view of the docking unit of FIG. 12.

FIG. 15 is a bottom plan view of the docking unit of FIG. 12.

FIG. 16 is a rear elevational view of the docking unit of FIG. 12.

FIG. 17 is a front elevational view of a network controller unit for communication with the docking units of FIGS. 1 through 16.

FIG. 18 is a left side elevational view of the network controller of FIG. 17.

FIG. 19 is a top plan view of the network controller of FIG. 17.

FIG. 20 is a right side elevational view of the network controller of FIG. 17.

FIG. 21 is a rear elevational view of the network controller of FIG. 17.

FIG. 22 is a bottom plan view of the network controller of FIG. 17.

Figure 26:
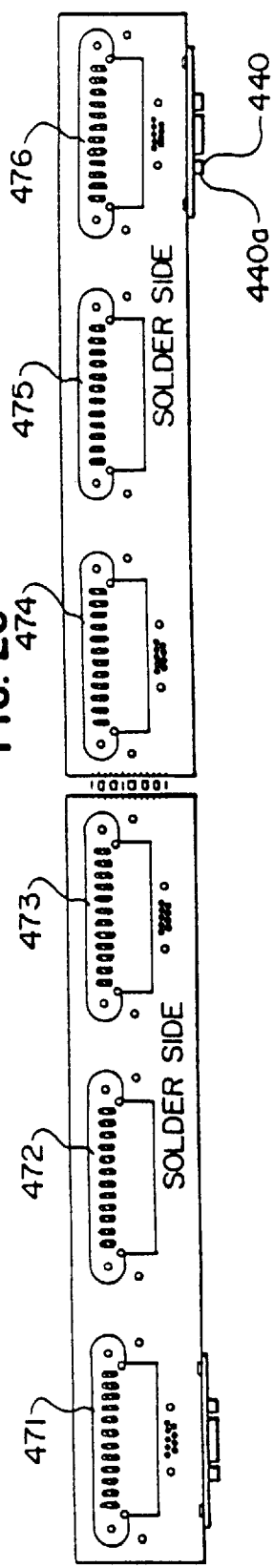
FIG. 26 is a top plan view of the solder sides of the printed circuit boards utilized in the multidocking apparatus of FIG. 23.
Figure 27:
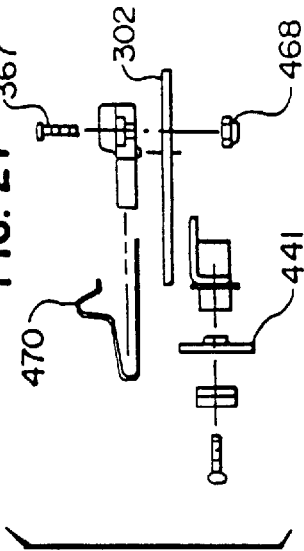
FIG. 27 is a somewhat diagrammatic exploded elevational view for illustrating constructional details associated with the printed circuit board arrangement of FIG. 25.
Figure 28A:
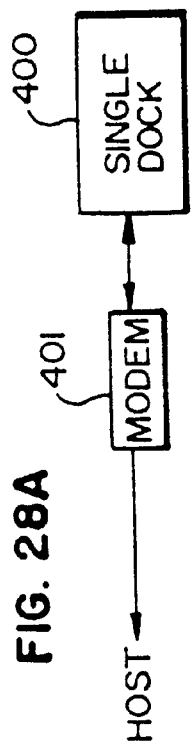
Figure 28:
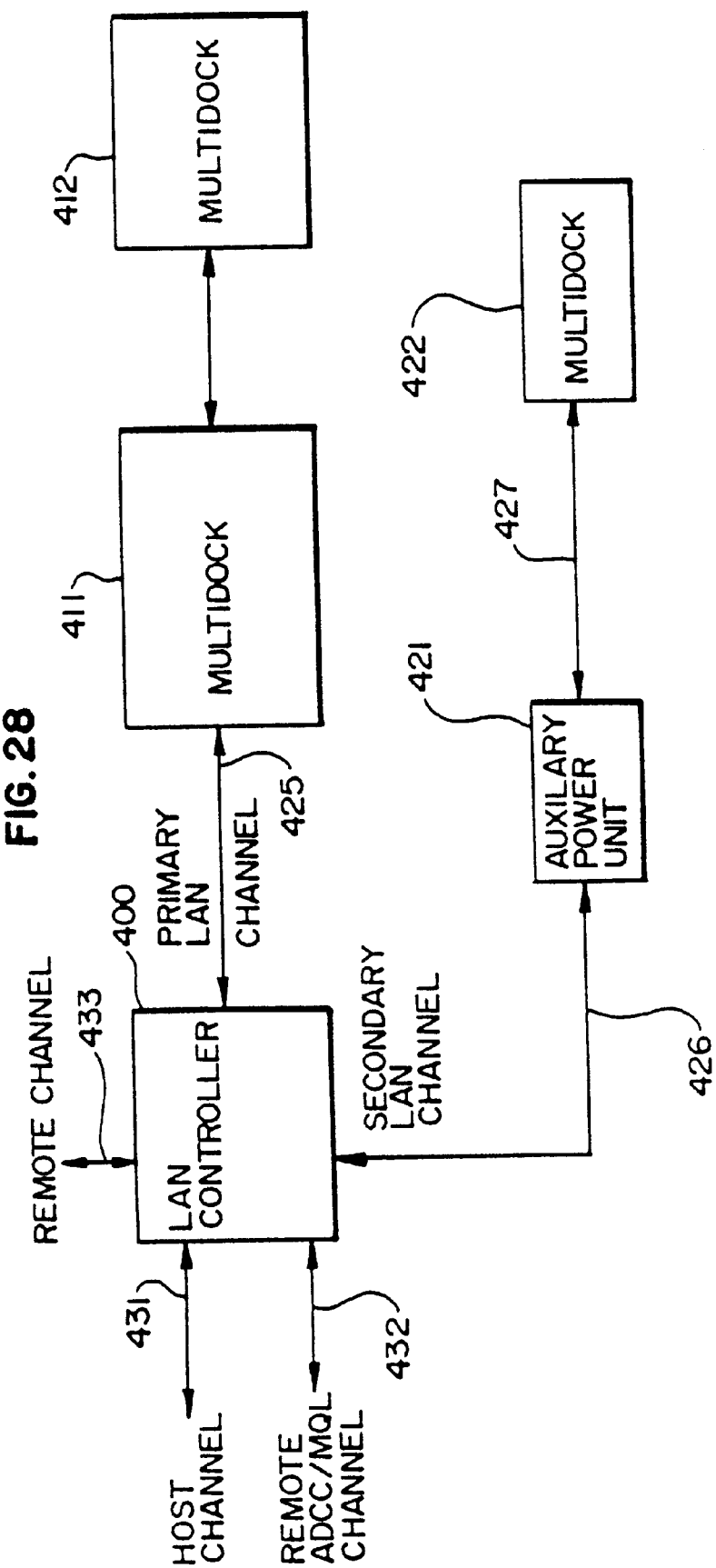

FIG. 28 shows a typical network configuration involving multidock apparatus such as shown in FIGS. 6 through 10 and 23 through 27, and which may utilize a network controller such as illustrated in FIGS. 17 through 22.

FIG. 28A illustrates a communications system relating to a single dock unit such as shown in FIGS. 1 through 5 and 12 through 16.

Figure 29:
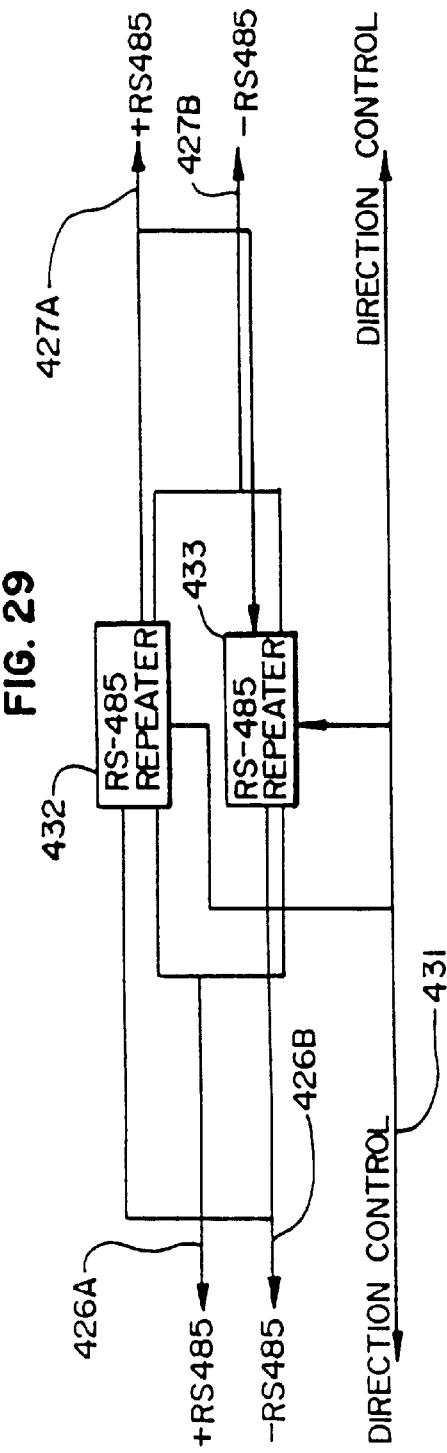
Figure 29A:
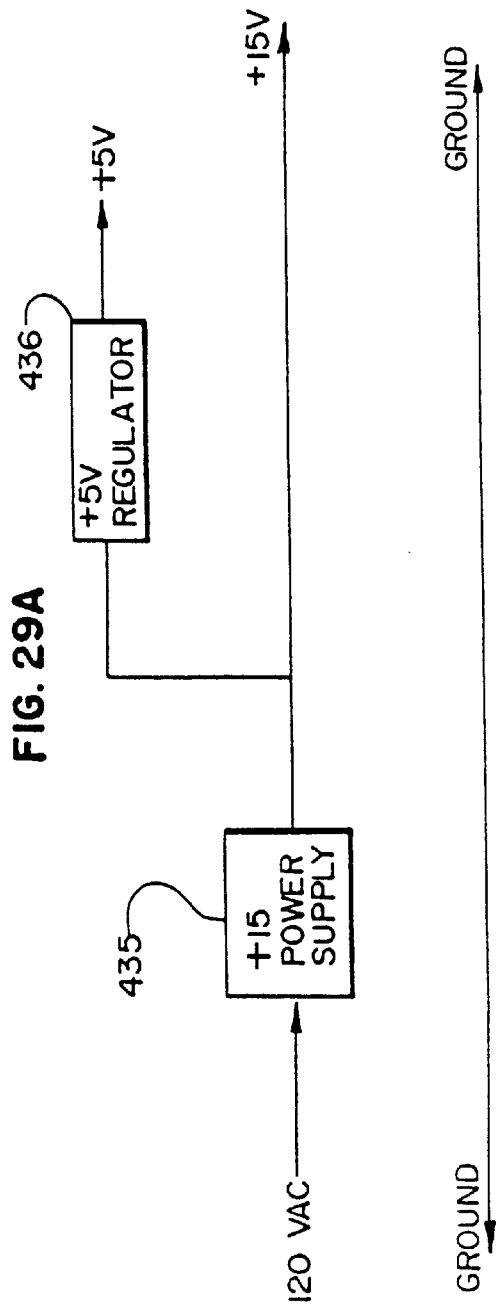

FIGS. 29 and 29A show circuitry for an auxiliary power unit which may be utilized as illustrated in FIG. 28.

Figure 30A:
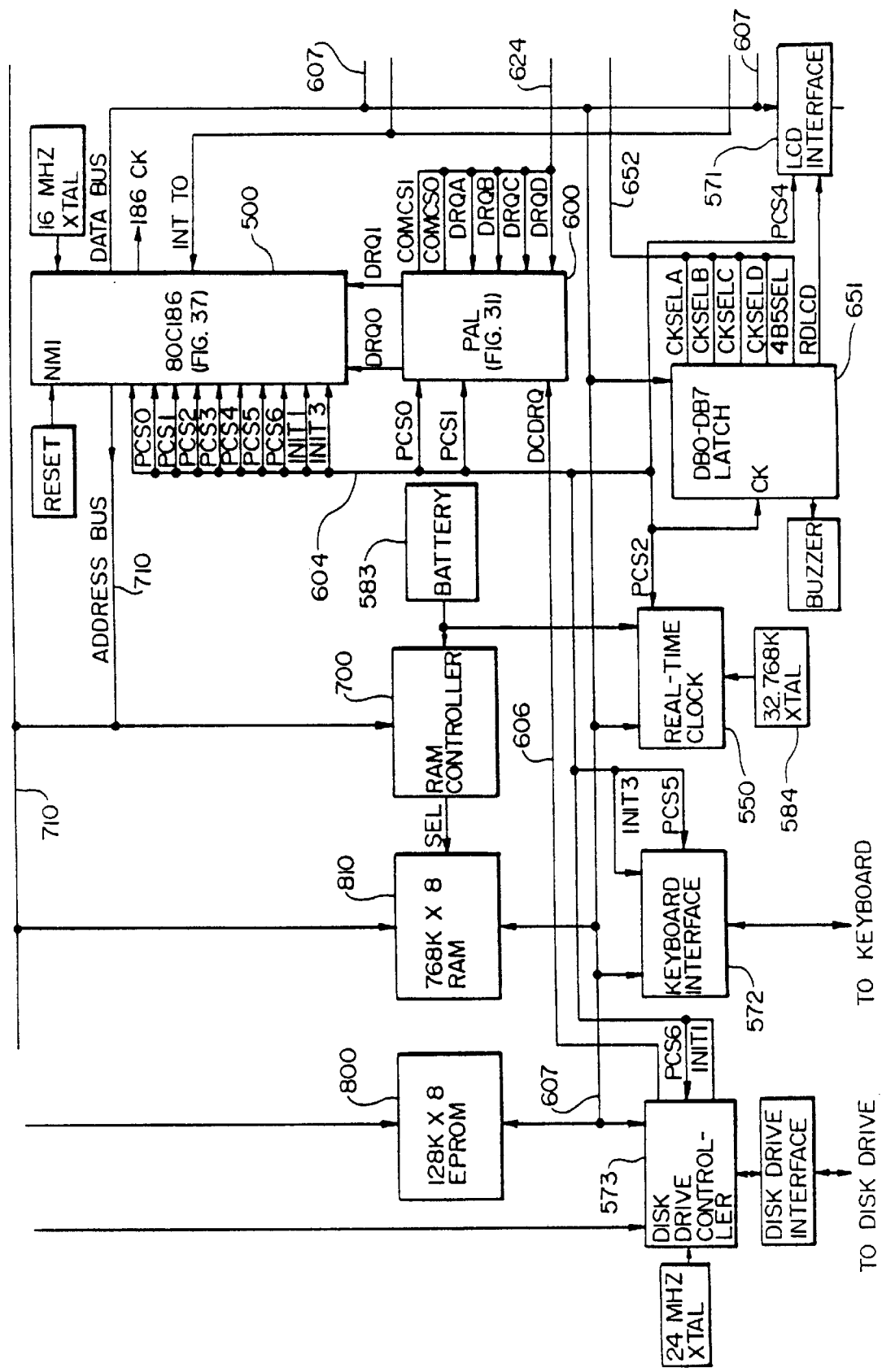

FIGS. 30A and 30B together show a block diagram of a local area network controller such as may be utilized in the network configuration of FIG. 28, FIG. 30B being a continuation of FIG. 30A to the right.

Figure 31:
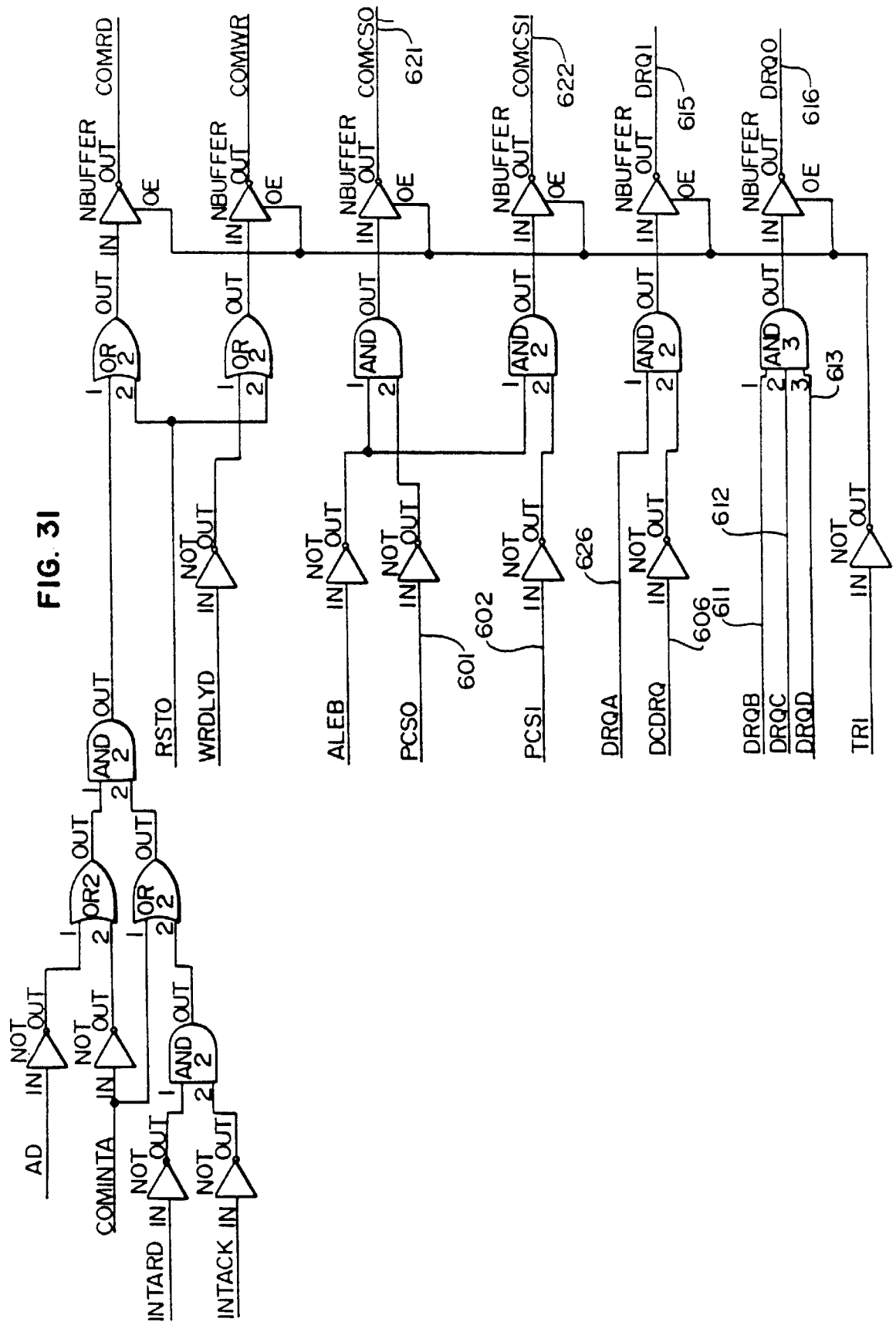

FIG. 31 shows an exemplary implementation for the PAL component of FIG. 30A.

Figure 32A:
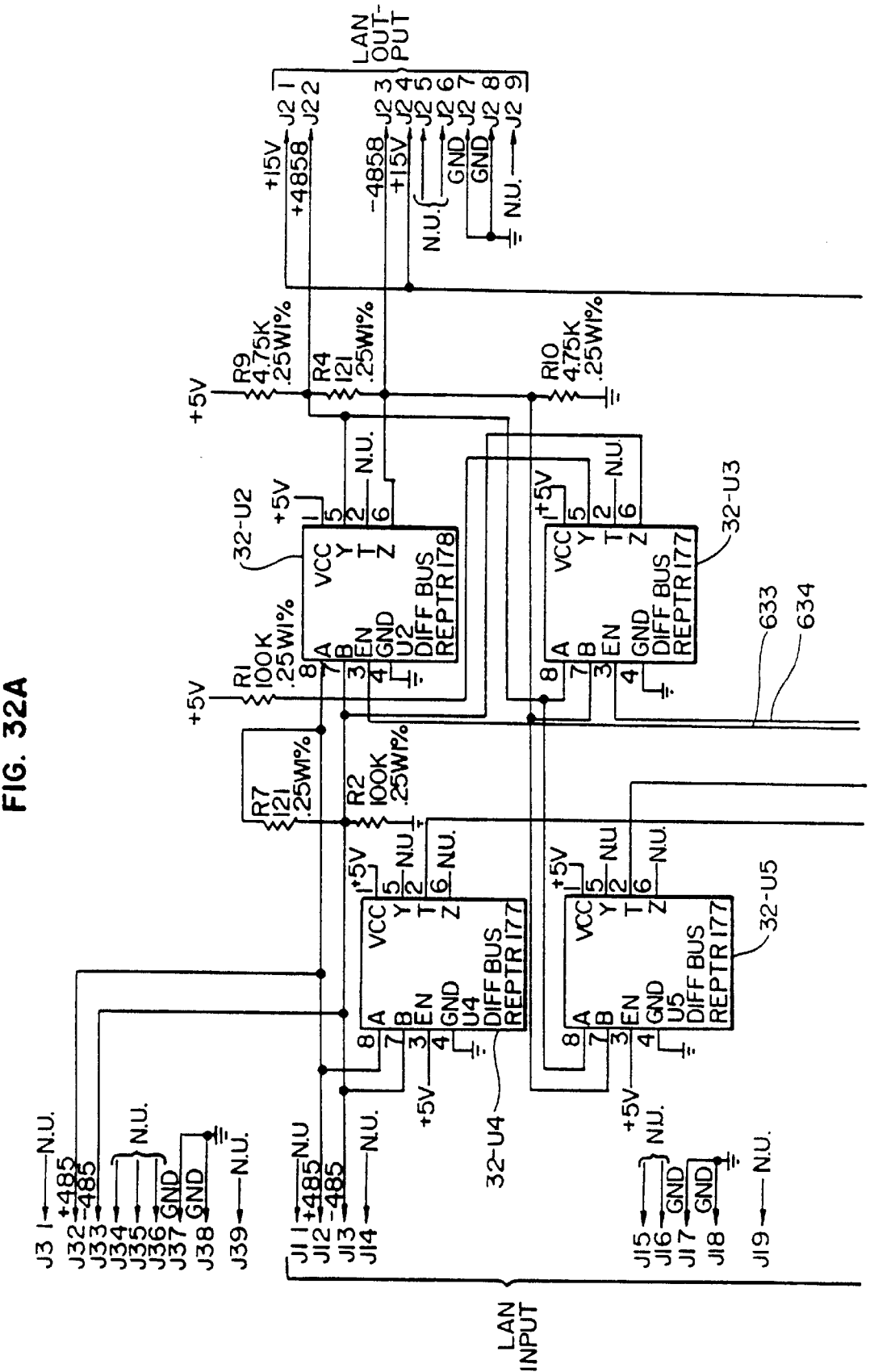
Figure 32B:
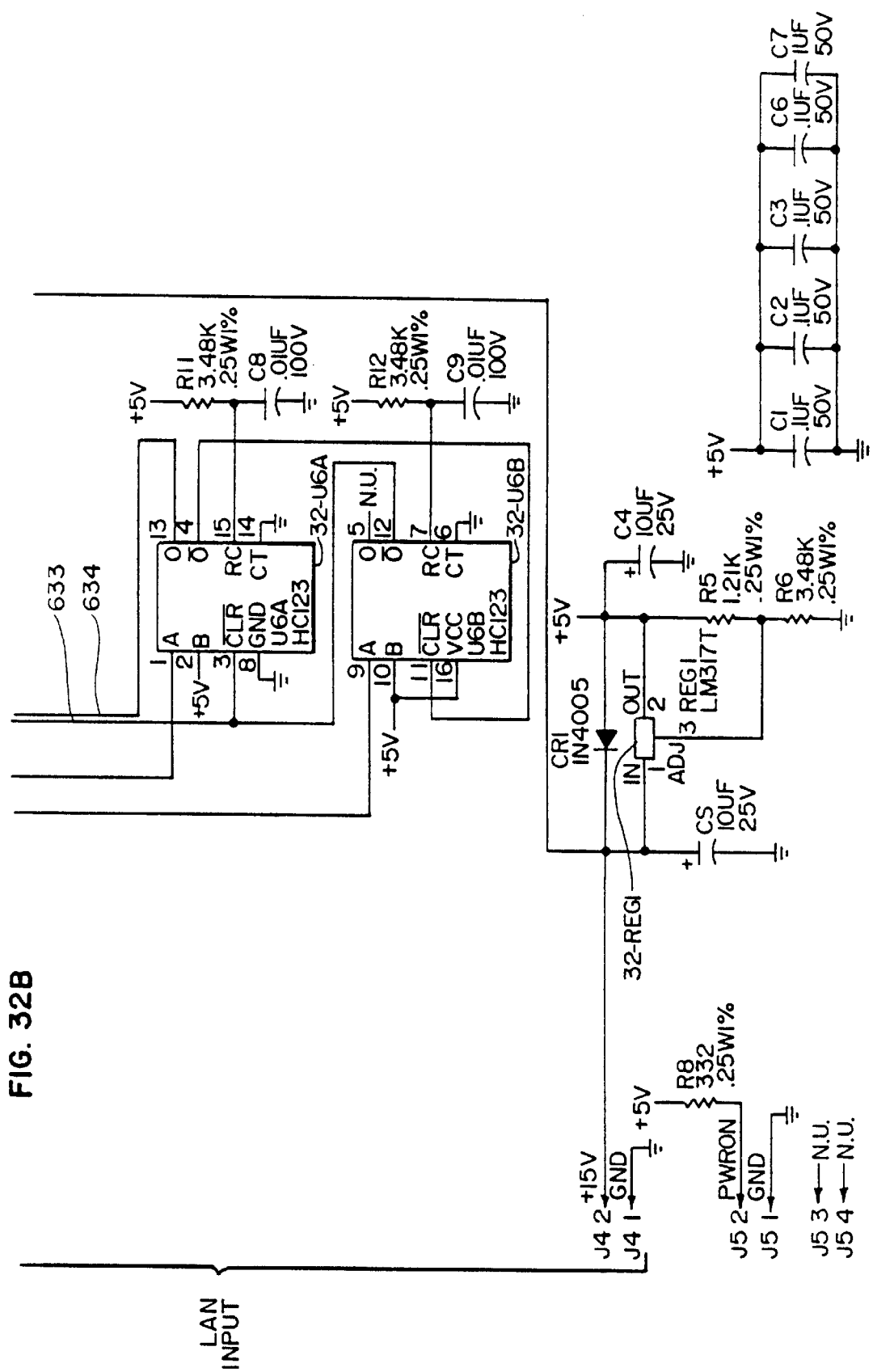

FIGS. 32A and 32B show a preferred implementation for the auxiliary power unit of FIG. 28.

Figure 33:
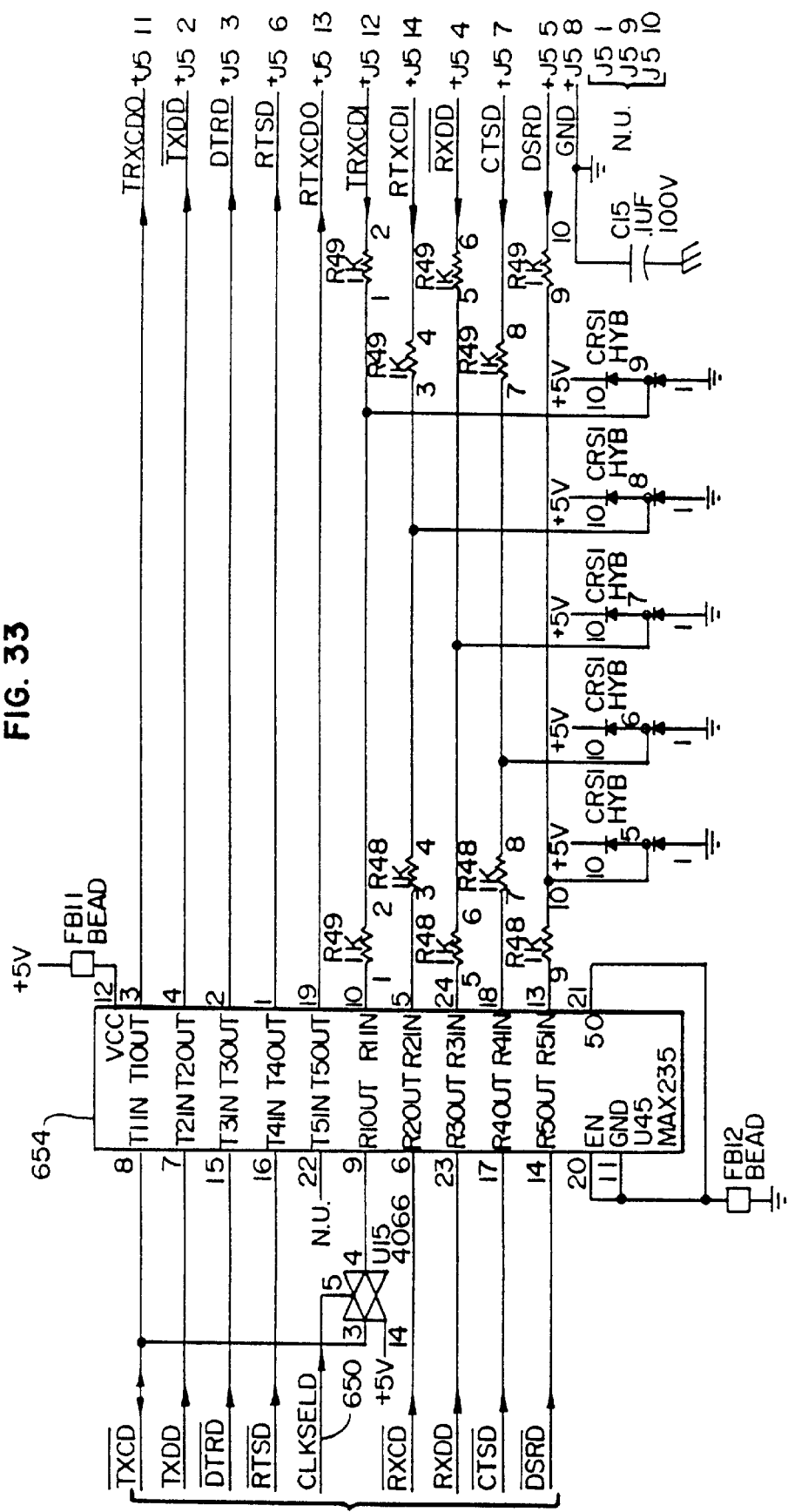

FIG. 33 shows an exemplary implementation for the RS232 interface components of FIG. 30B.

Figure 34A:
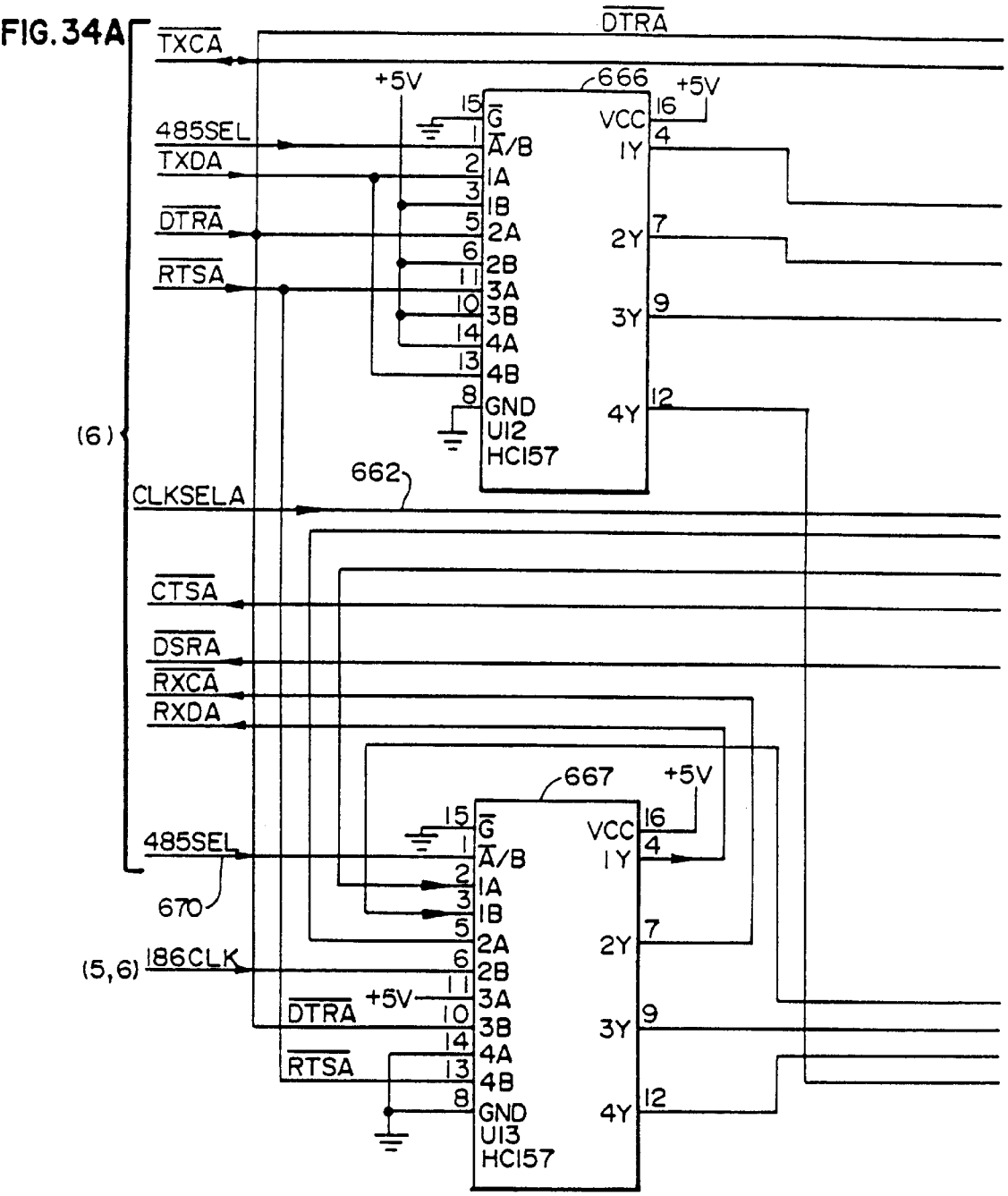
Figure 34B:
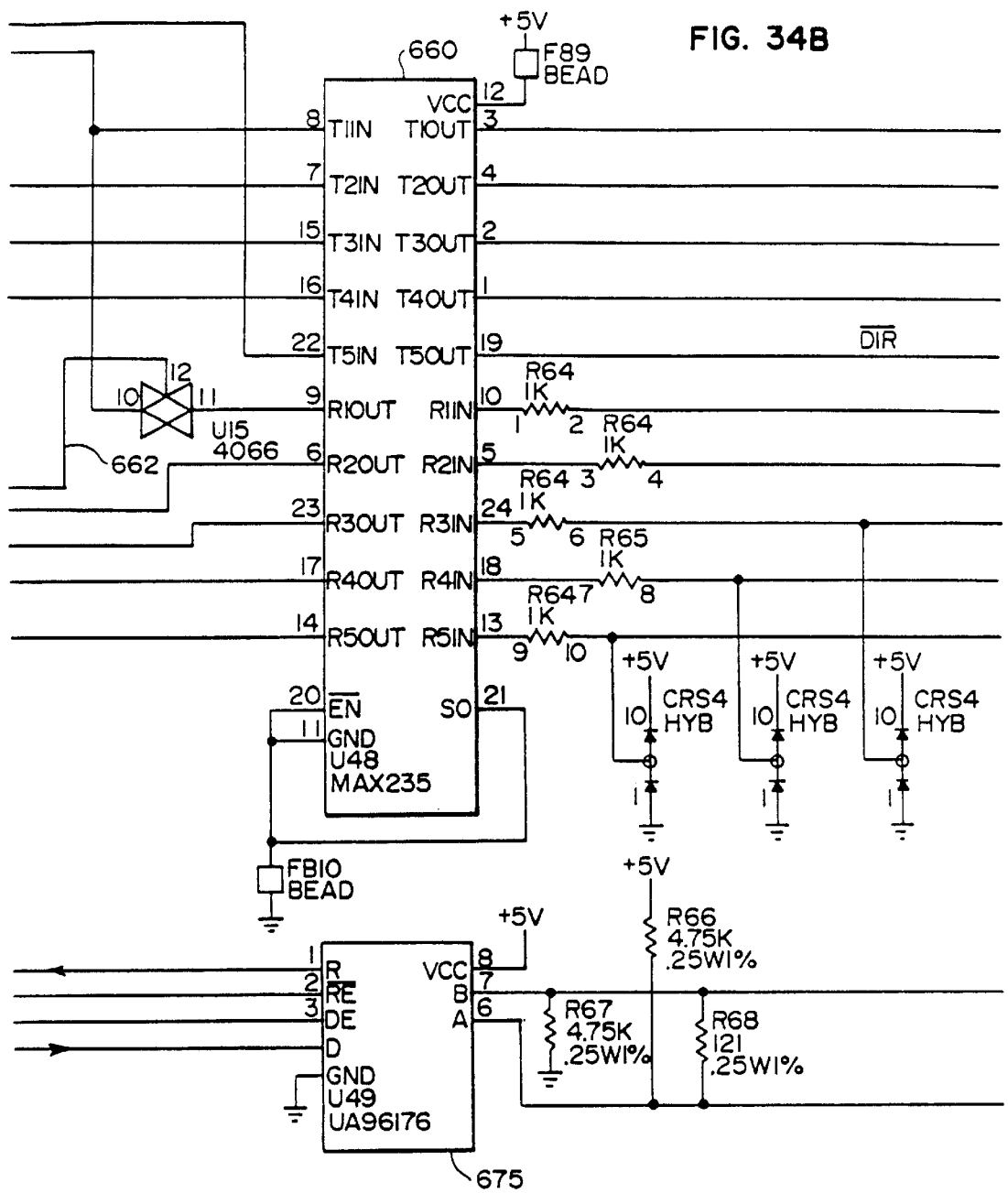
Figure 34C:
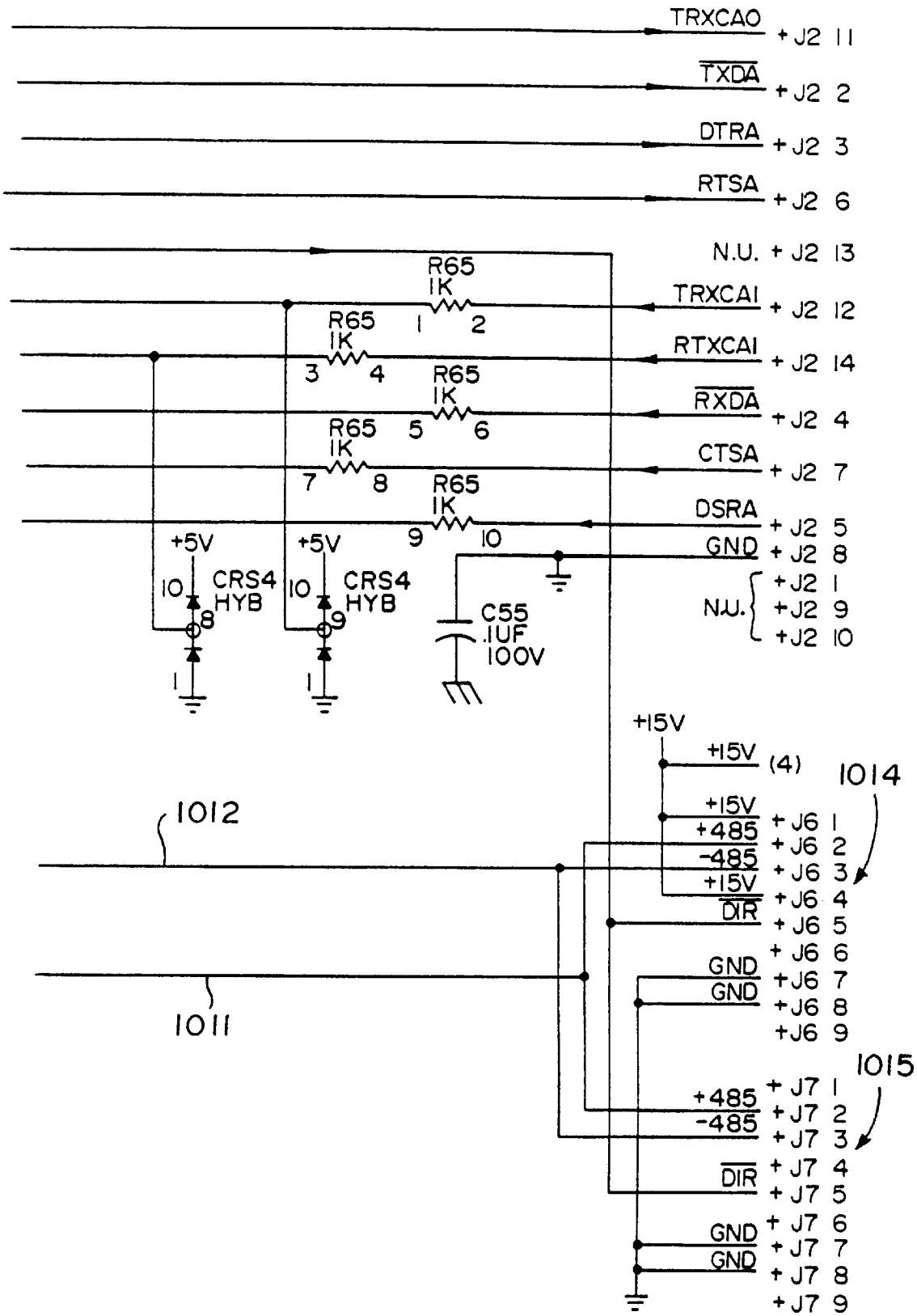

FIGS. 34A, 34B and 34C show an exemplary implementation for the port select and RS485 interface components of FIG. 30B.

Figure 35A:
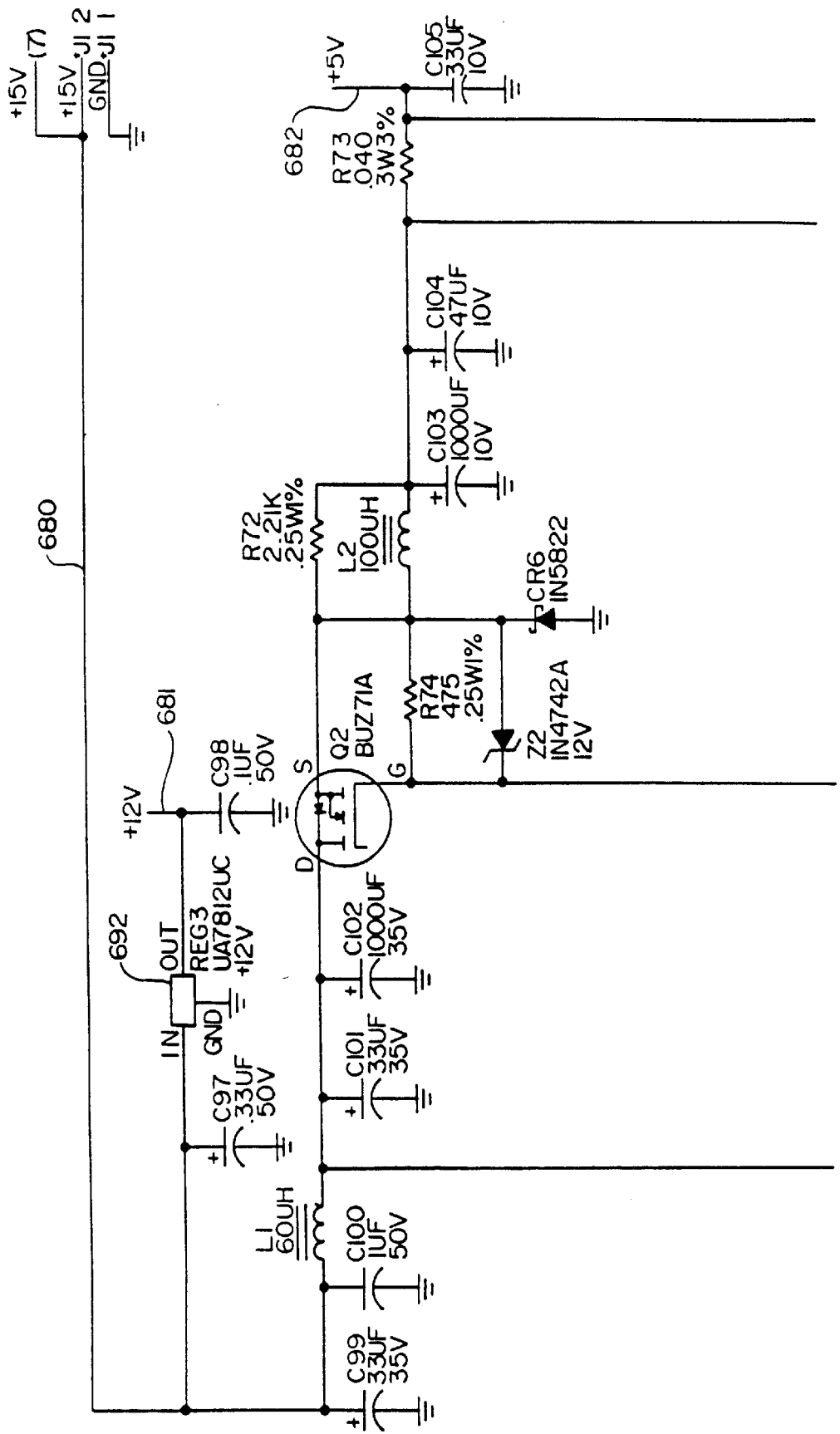
Figure 35B:
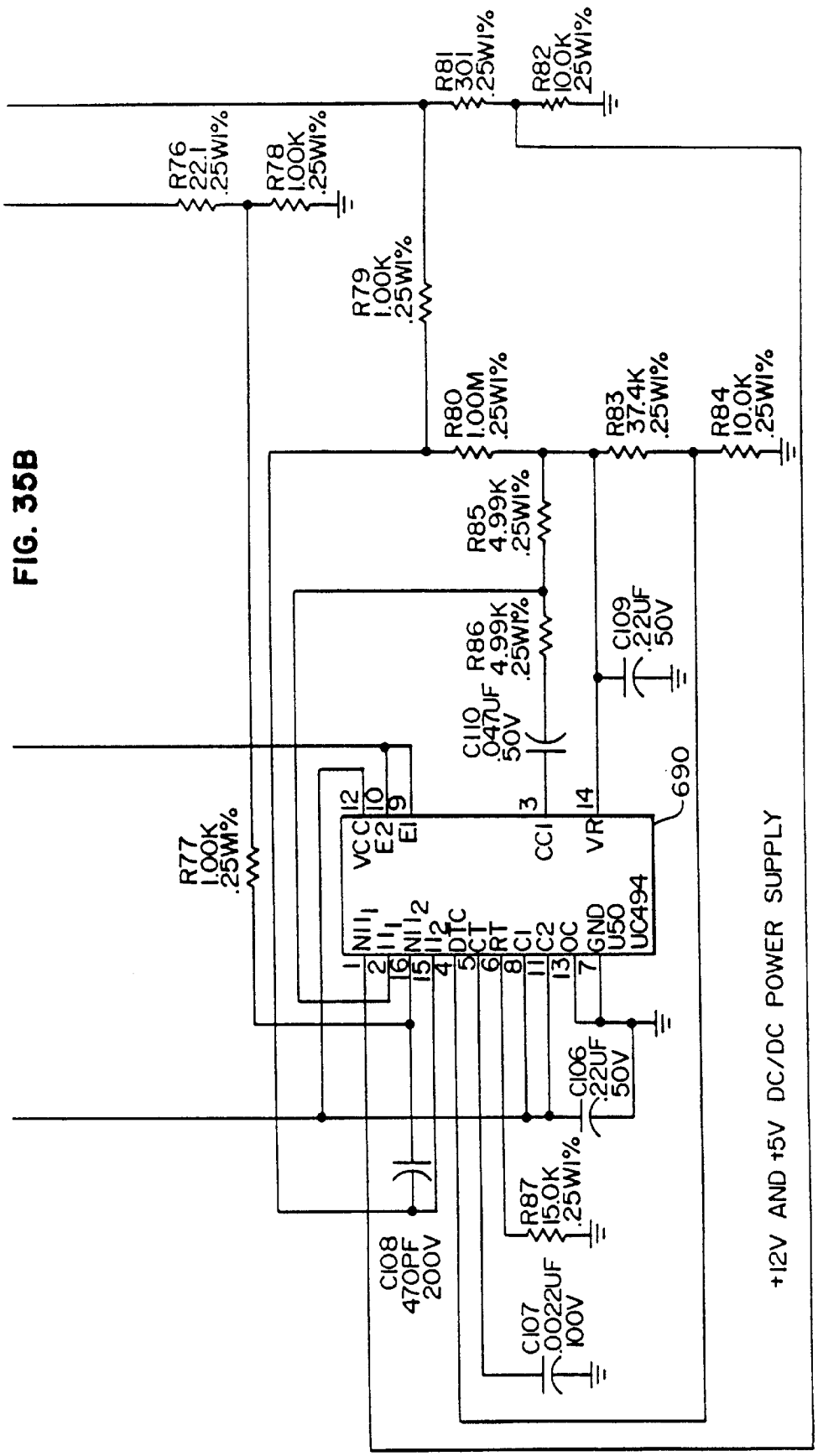

FIGS. 35A and 35B show an exemplary implementation for the plus twelve volt regulator and plus five volt DC/DC converter components of FIG. 30B.

Figure 36A:
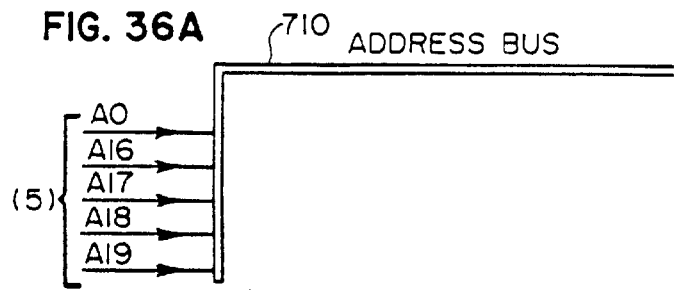
Figure 36C:
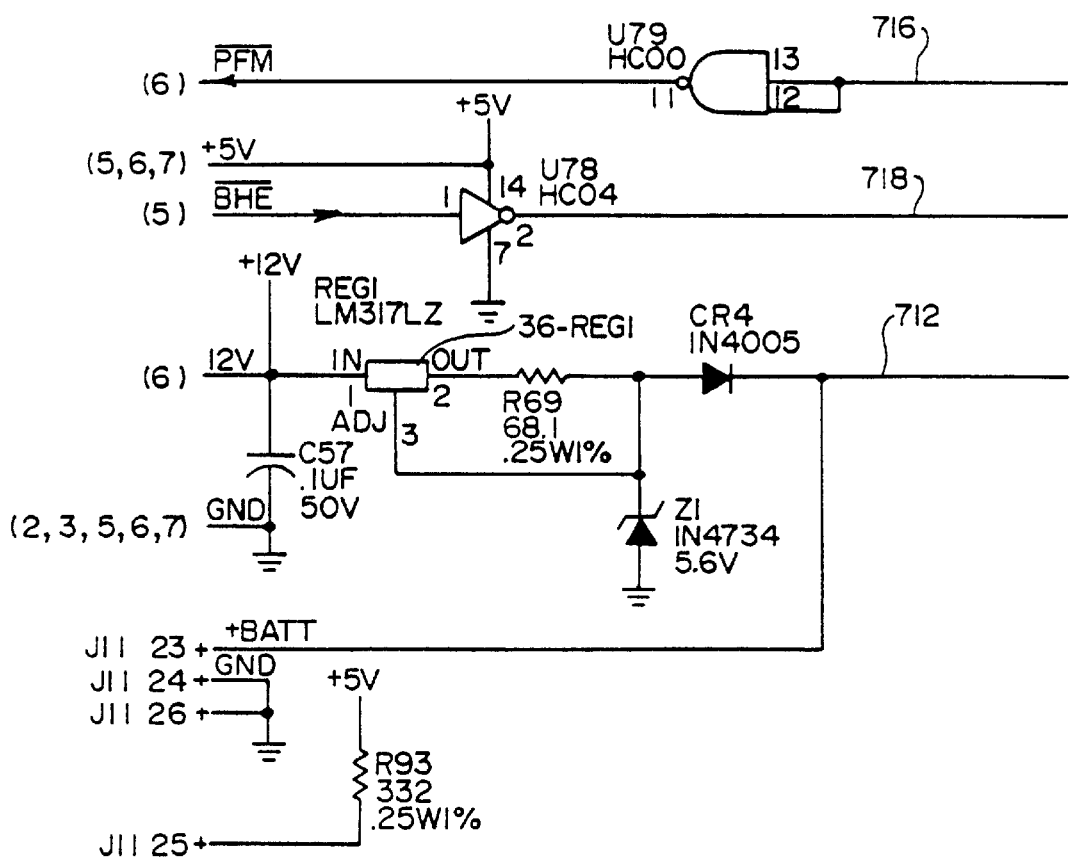
Figure 36B:
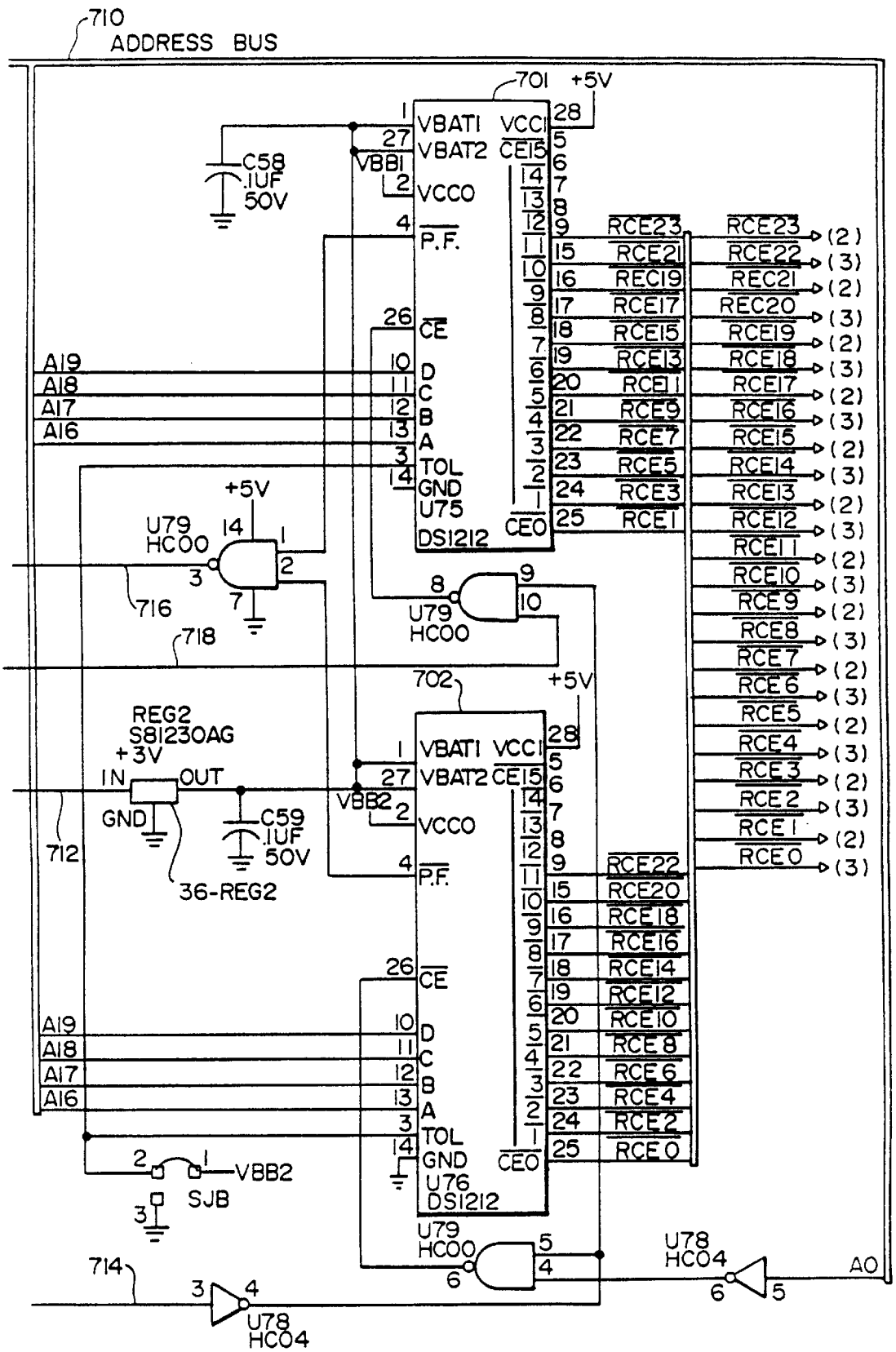

FIGS. 36A, 36B and 36C show an exemplary circuit for the RAM controller component of FIG 30A.

Figure 37B:
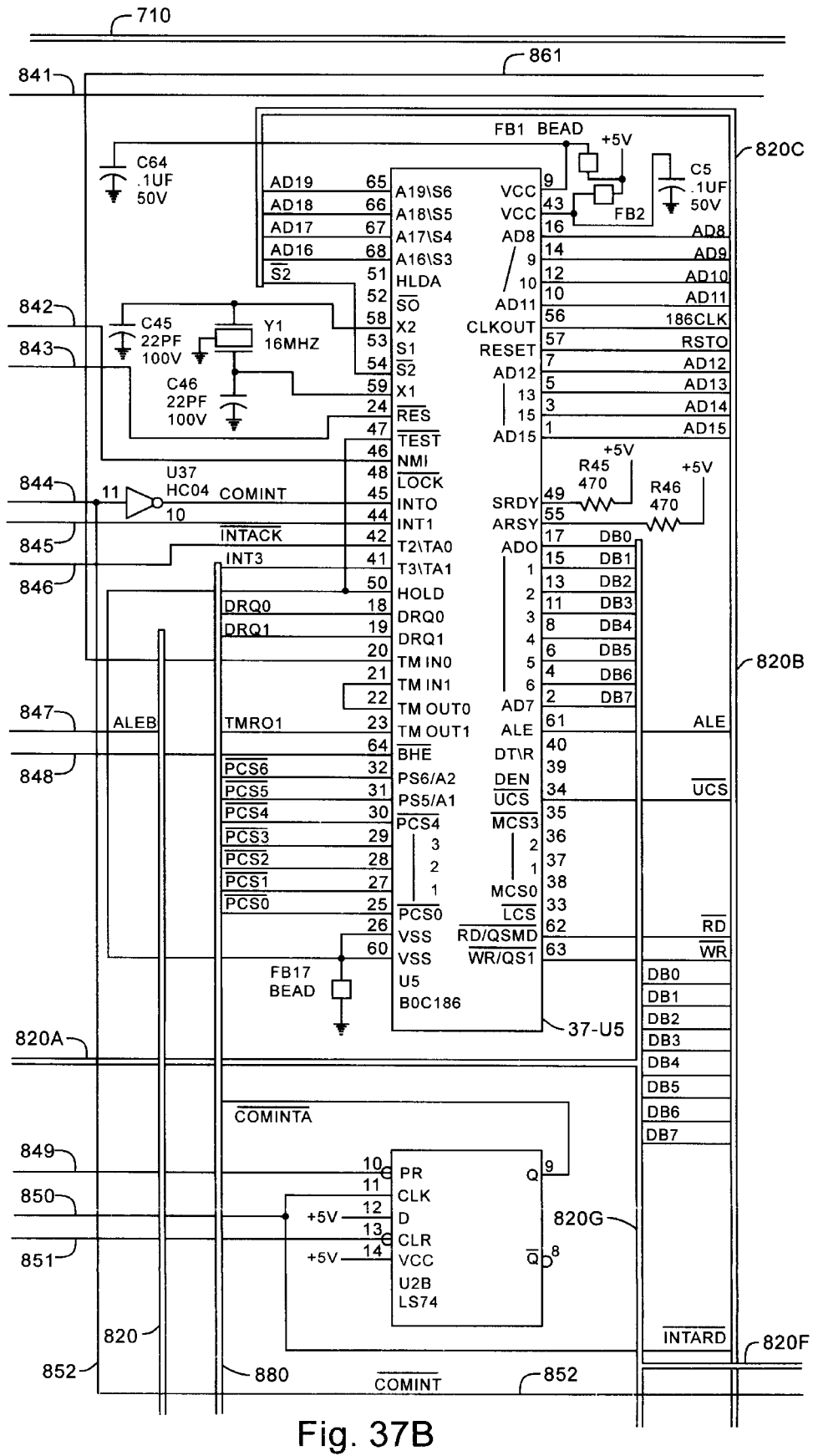
Figure 37C:
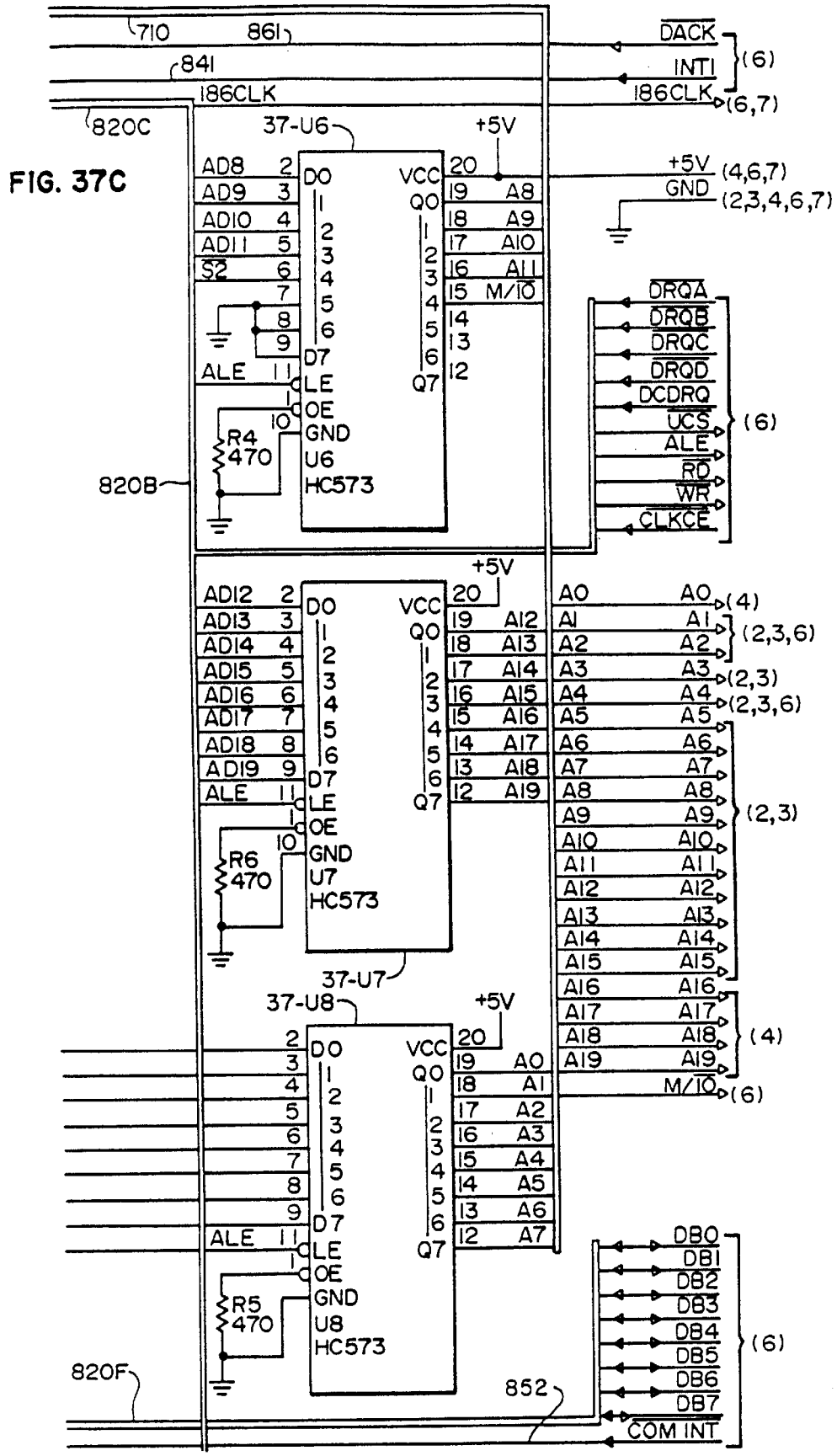
Figure 37D:
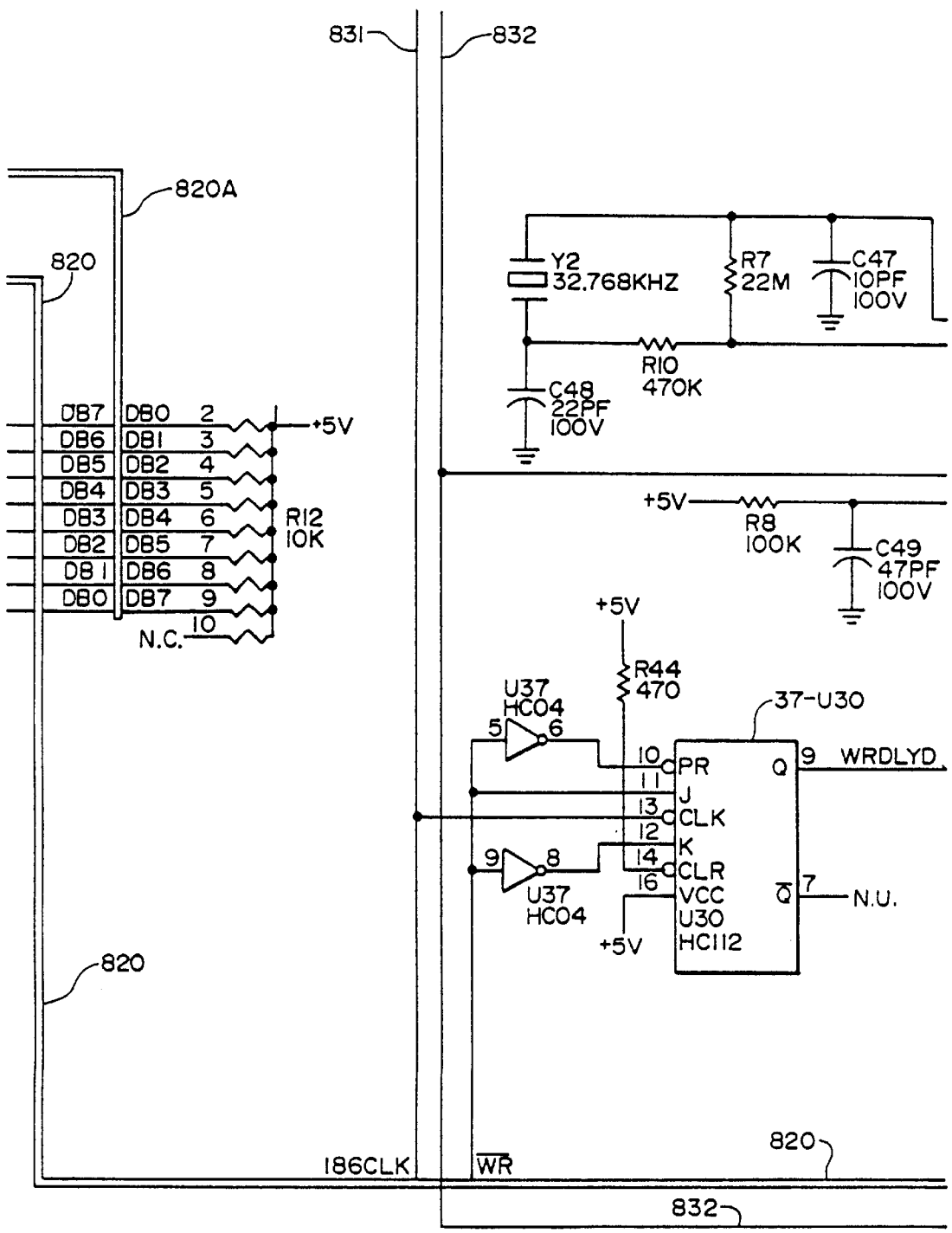
Figure 37E:
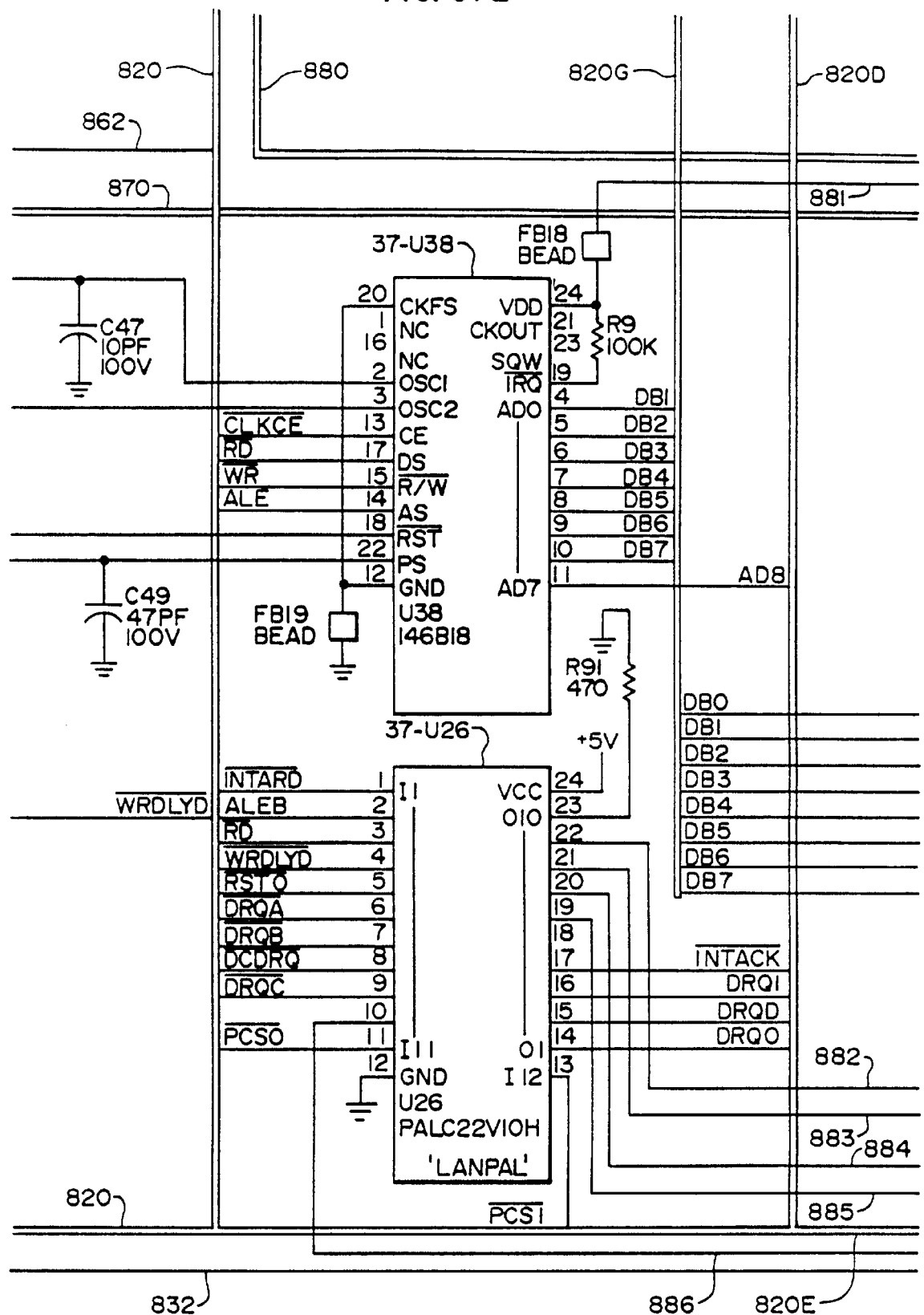
Figure 37F:
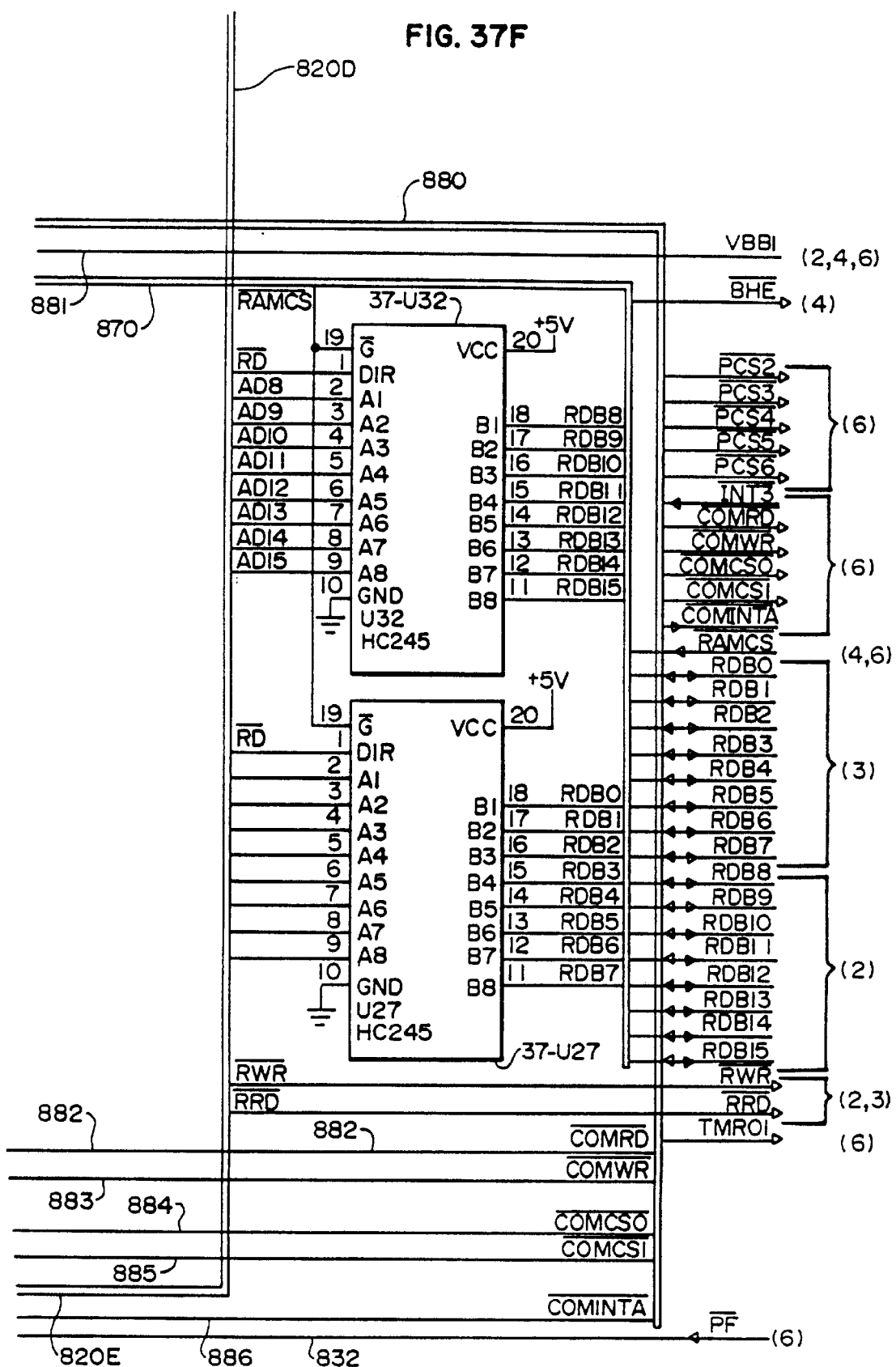

FIGS. 37A through 37F show circuit details related to the EPROM component, the microprocessor component, the latch component and the real time clock of FIG. 30A, and related components, FIG. 37B being a continuation of FIG. 37A to the right, FIG. 37C being a continuation of FIG. 37B to the right and sharing a vertical segment of the control bus therewith, FIG. 37D being a continuation of FIG. 37A in the downward direction, FIG. 37E being a continuation of FIG. 37B in the downward direction and a continuation of FIG. 37D to the right, and FIG. 37F sharing a vertical segment of the control bus with FIG. 37E and thus being a continuation of FIGS. 37B and 37C in the downward direction and a continuation of FIG. 37E to the right.

Figure 38A:
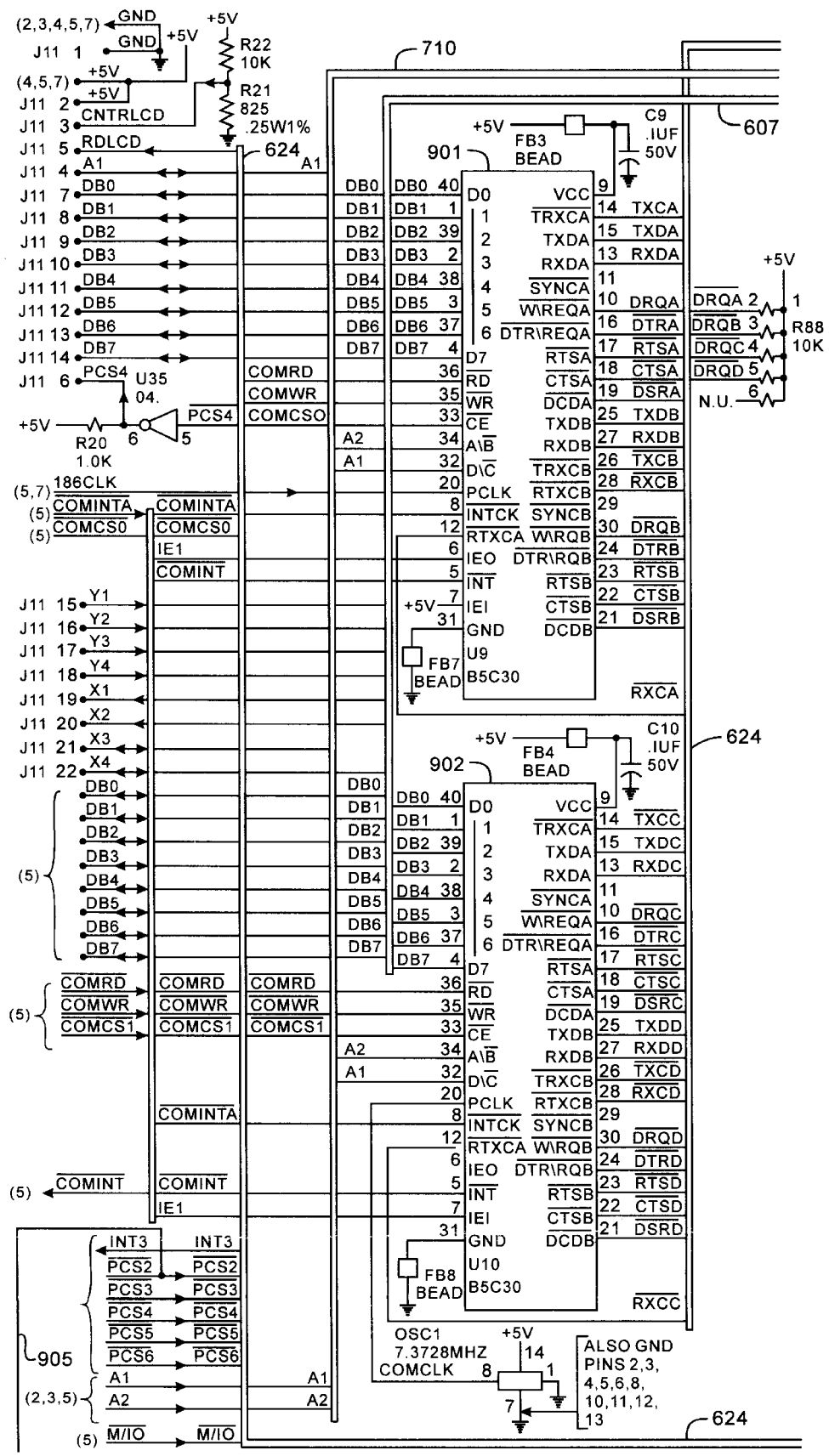
Figure 38B:
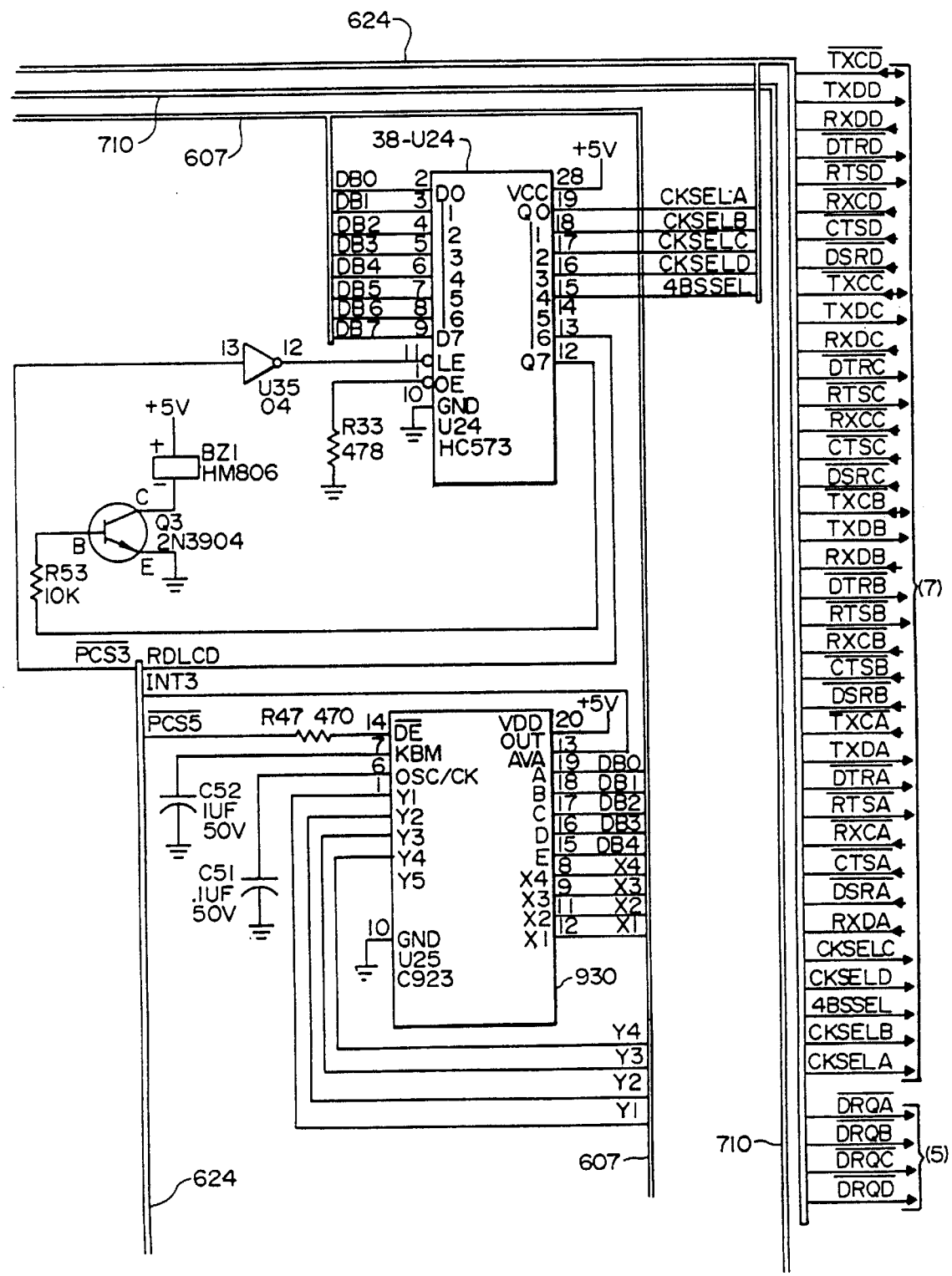
Figure 38C:
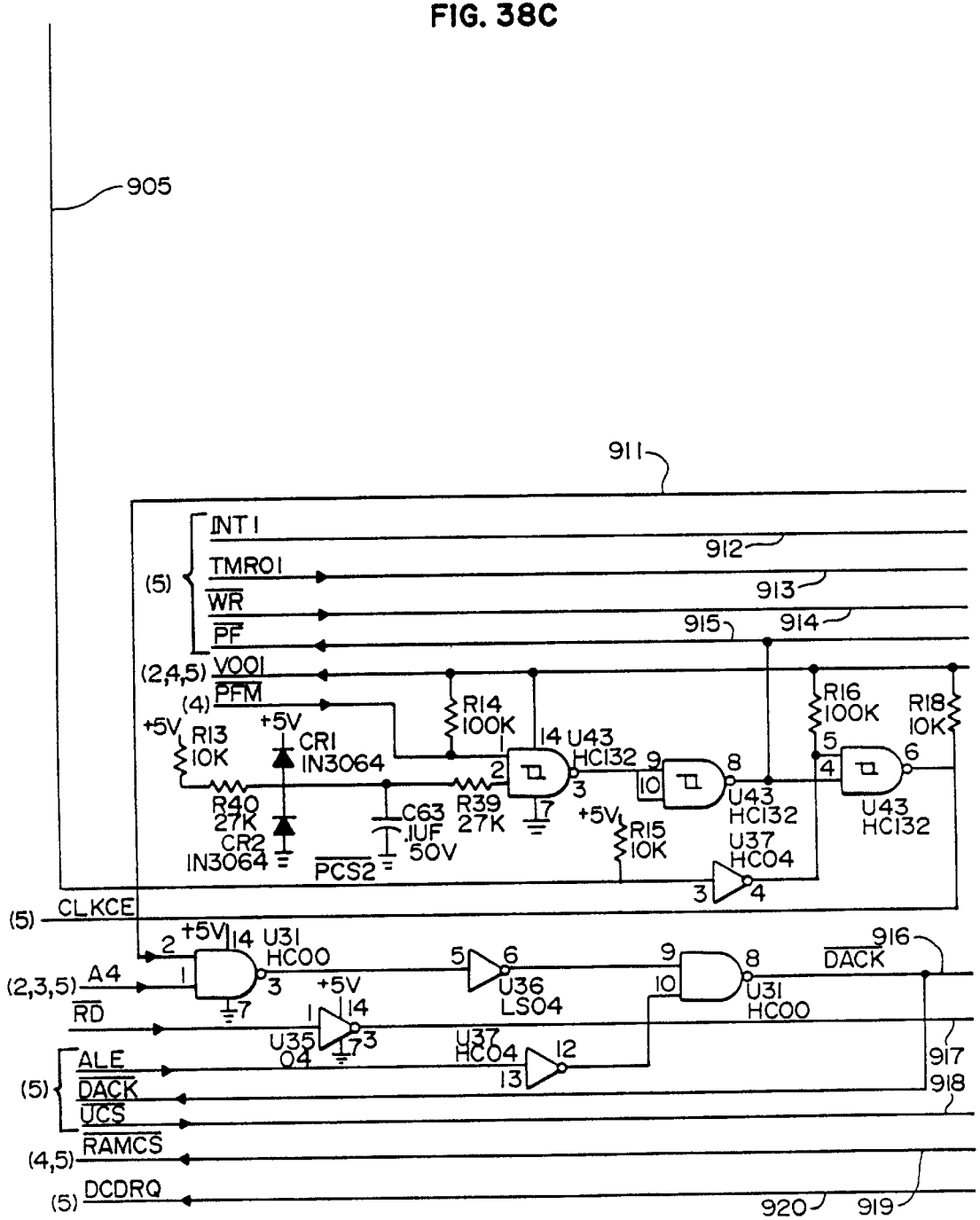
Figure 38D:
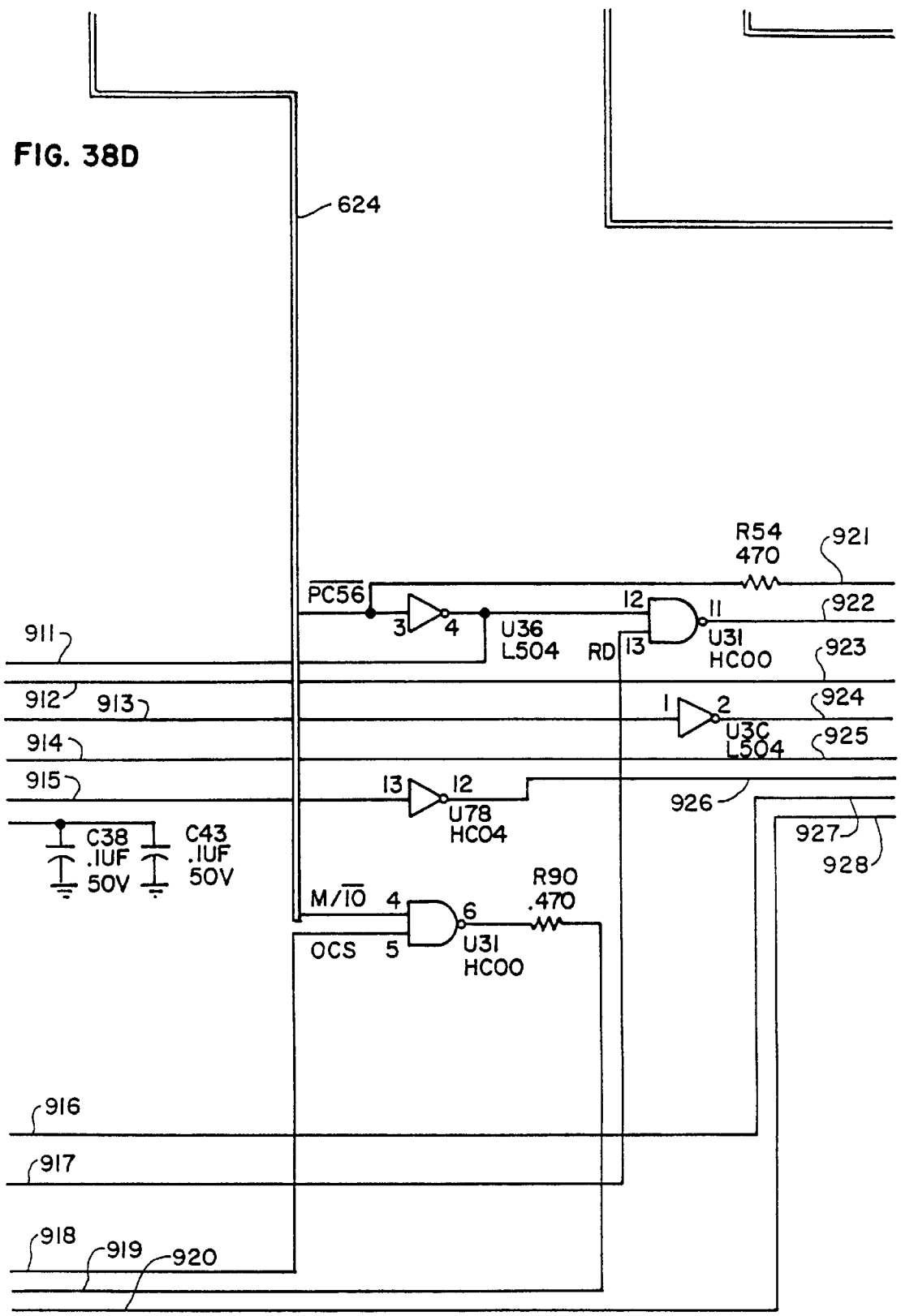
Figure 38E:
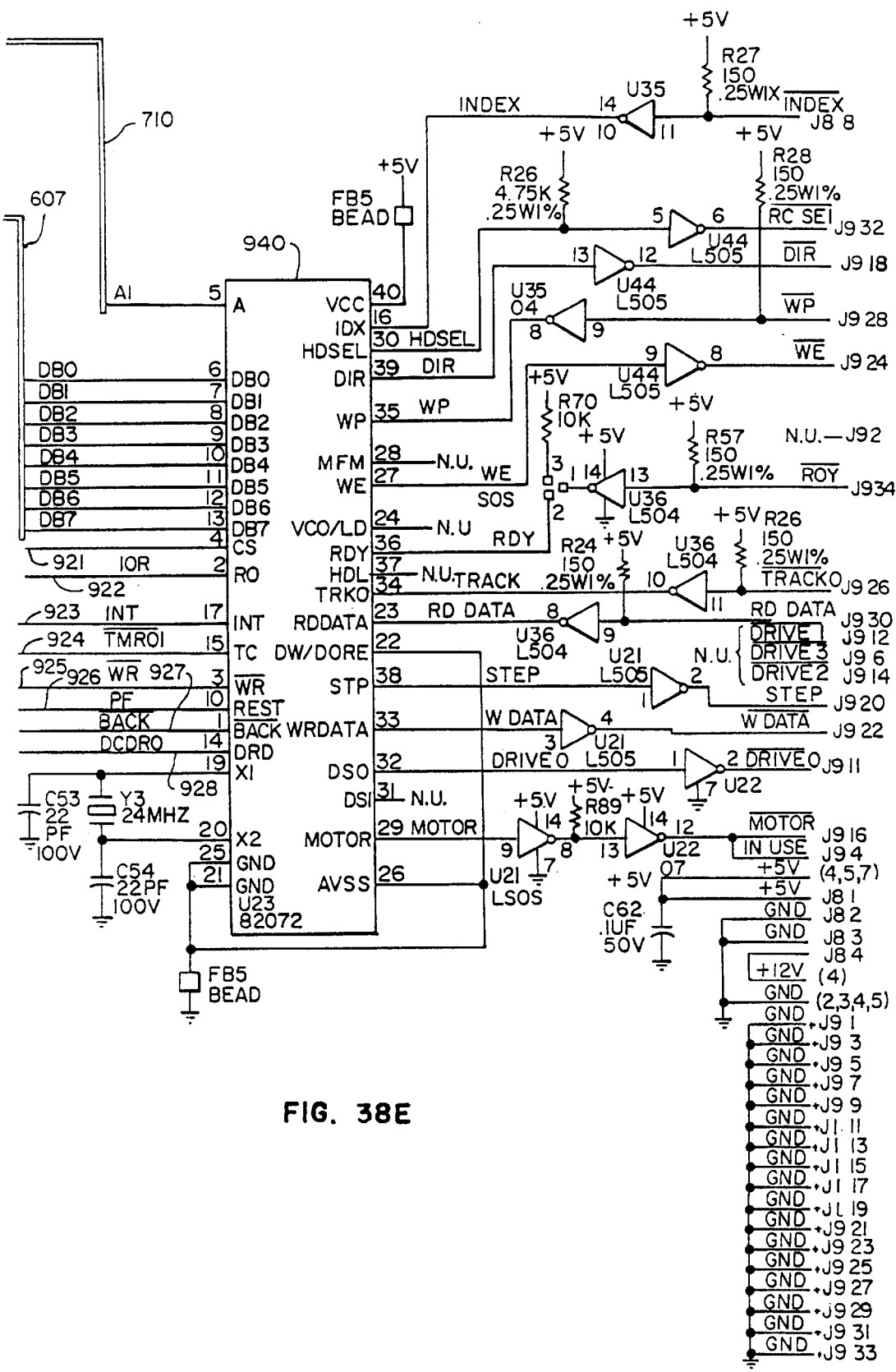

FIGS. 38A through 38E show the serial communications controller components of FIG. 30B in a preferred implementation and show additional circuitry such as the keyboard encoder component and the disk drive controller of FIG. 30A, FIG. 38B being a continuation of FIG. 38A to the right, FIG. 38C being a continuation of FIG. 38A in a downward direction, FIG. 38D being a continuation of FIG. 38B in a downward direction and a continuation of FIG. 38C to the right, and FIG. 38E being a continuation of FIG. 38B in a downward direction and a continuation of FIG. 38D to the right.

Figure 39:
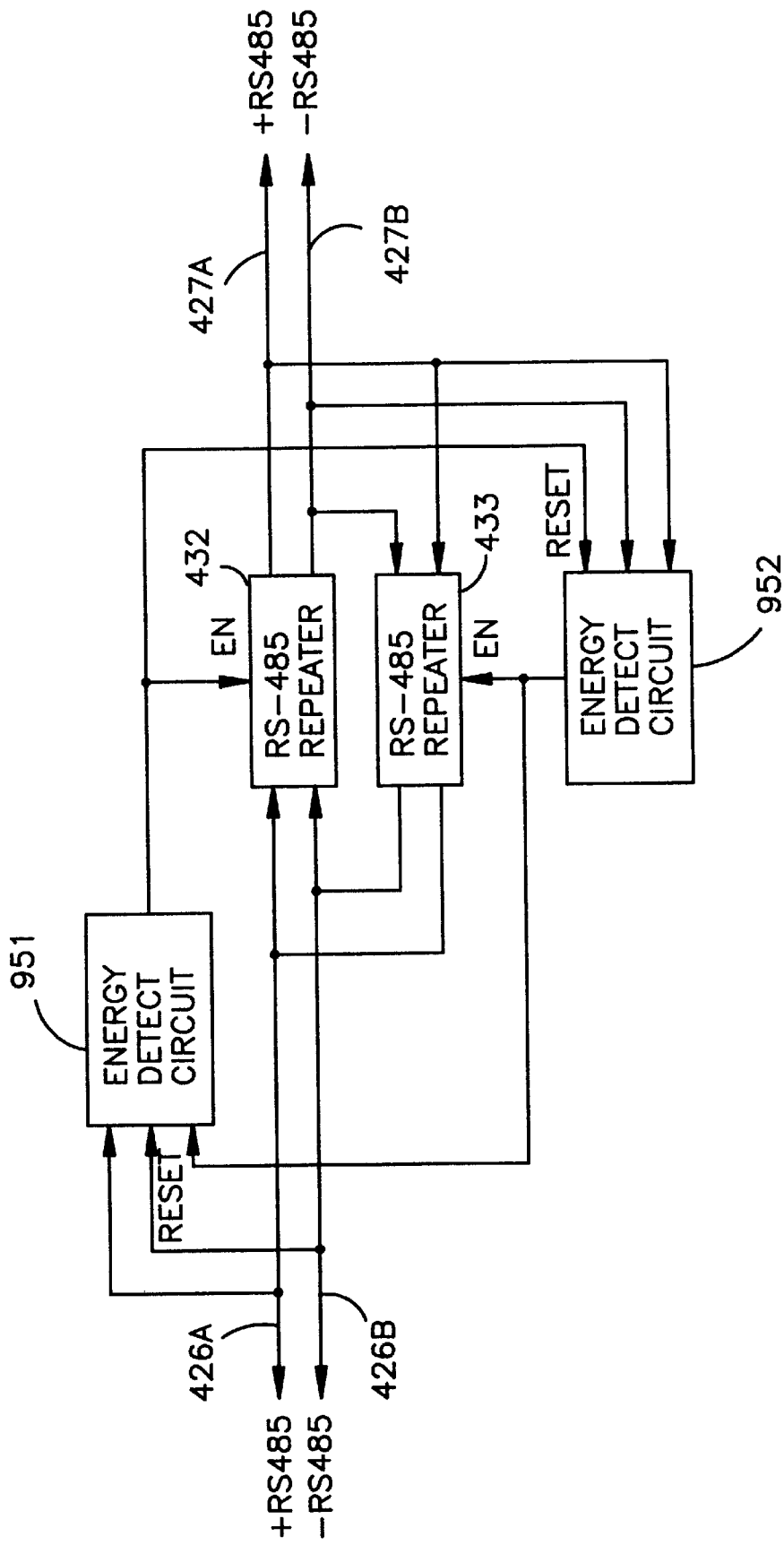

FIG. 39 is a block diagram of a similar type to FIG. 29, but showing a preferred embodiment of the auxiliary power unit whereby the direction control line of FIG. 29 can be eliminated. (FIGS. 32A and 32B show a detailed exemplary implementation of the auxiliary power unit of FIG. 39.)

Figure 40:
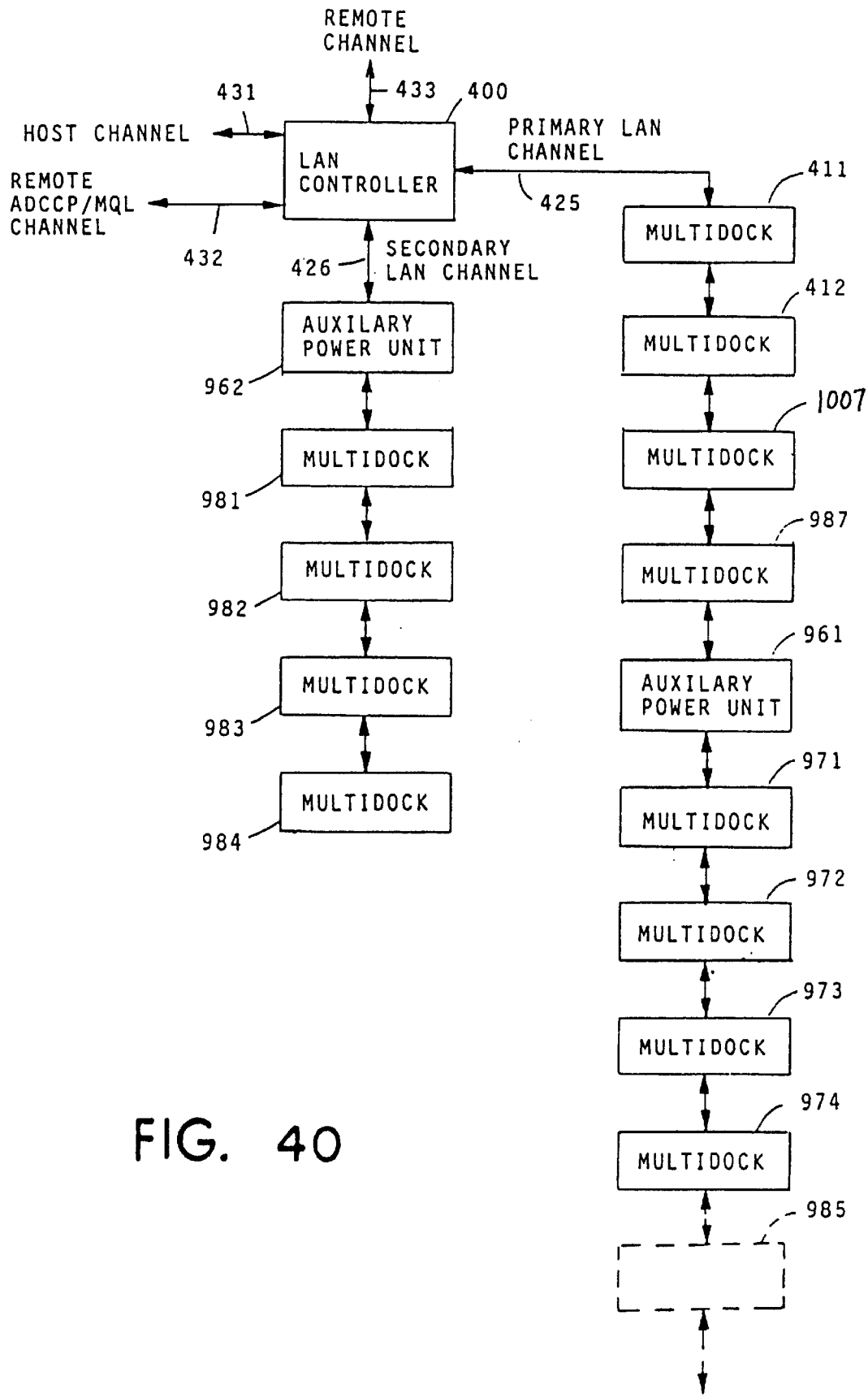

FIG. 40 illustrates the manner in which a preferred docking system can be expanded using auxiliary power units such as shown in FIG. 39.

Figure 25:
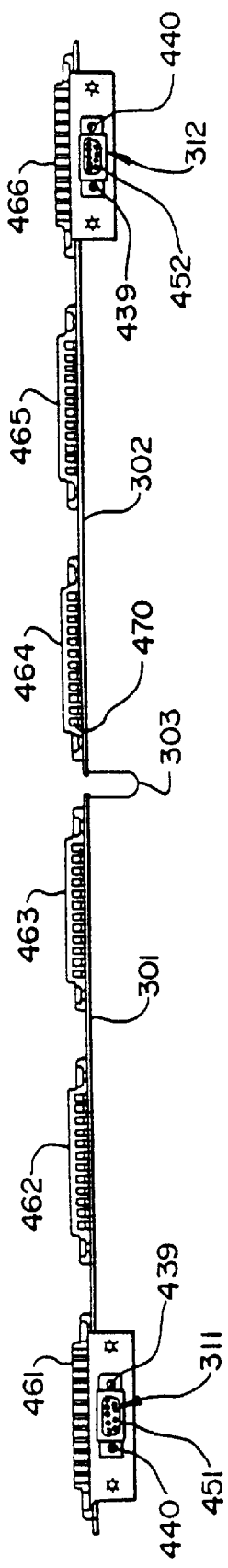
FIG. 25 is a somewhat diagrammatic front elevational view of the printed circuit boards and contact assemblies associated with the multidocking apparatus of FIG. 23.
Figure 41:
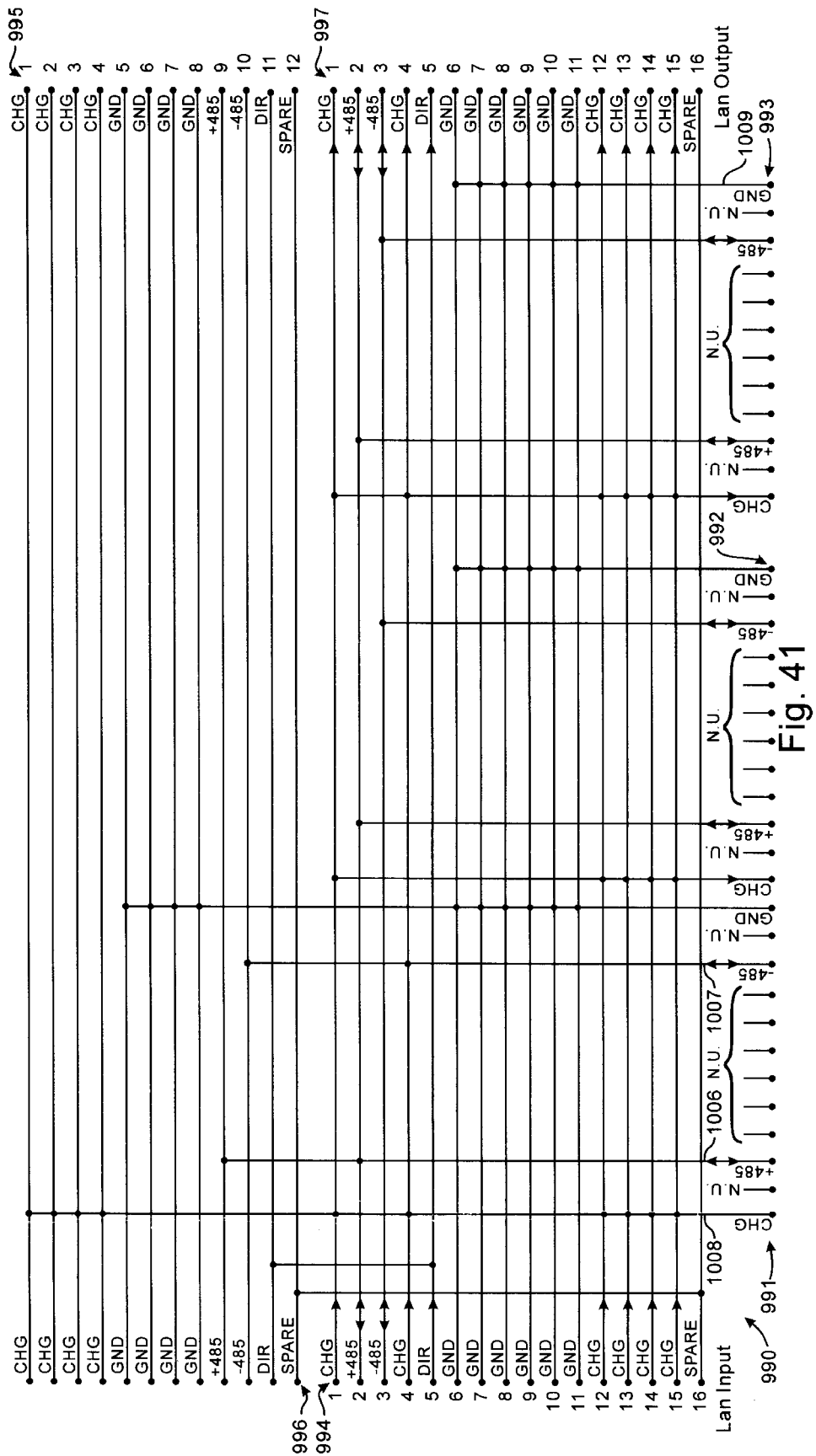

FIG. 41 shows exemplary conductor paths for the case of multidock printed circuit boards as indicated in FIGS. 25 and 26, such printed circuit boards each having three associated docking unit coupling positions.

FIG. 42 is a plan view of the solder side of a printed circuit board implementing the circuitry of FIG. 41.

FIG. 43 is a plan view of the copper side of the printed circuit board of FIG. 42, and showing the printed circuit board of FIG. 42 when inverted end for end.

DETAILED DESCRIPTION

Description of FIGS. 1–6

Referring now to the drawings, FIG. 1 discloses a preferred embodiment of single docking unit 2 in a perspective view, showing a data entry terminal 4 of a type insertable therein. Data entry terminal 4 is provided with an elongated housing 6 having a front wall 8 generally orthogonally positioned to end walls 16 and 18. A keypad 10 and visual display 12 are provided on front wall 8 of housing 6. It is intended that data entry terminal 4 is a portable, preferably hand-held, data collection device which may be carried with the user such that the user may enter data to be collected either by activation of the keys of keypad 10 or by other means, such as through bar code reading accessories, which are not illustrated in the drawings. Data entry terminal 4 may provide data or instructions to the user by way of display 12, and/or display 12 may display to the user the data which is being entered through the keypad or other input means which may be used. Data entry terminal 4 may also be equipped to electromagnetically communicate by transmitted waves with other devices to gather and transmit data.

Devices such as data entry terminal 4 require electrical power to operate, such power generally being provided by rechargeable batteries contained within housing 6. Because such batteries become discharged with use, it is desirable for data entry terminal 4 to be electrically chargeable by external means.

As seen in the preferred embodiment of FIG. 1, docking unit 2 comprises a generally upstanding terminal receptacle means 20 into which data entry terminal 4 is insertable. Receptacle 20 comprises opposing sidewalls 22 and 24 which are interconnected by rear wall 26. Front wall 28 of receptacle 20 is substantially shorter than rear wall 26 thereby avoiding interference with the keypad 10 of data entry terminal 4. A bottom wall 30 of receptacle 20 interconnects with sidewalls 22 and 24 and with front wall 28 and rear wall 26. Contact members 32 project through an aperture in bottom wall 30. Rail 34 (see also FIG. 4) extends inwardly from rear wall 26, so as to engage the back of data entry terminal 4 as it is inserted into a loading channel 36, thereby guiding the data entry terminal 4 into proper position relative to contact members 32. Cooperating frontal terminal guide ribs such as 37, FIG. 1, further serve to define the loading channel 36.

Receptacle 20 may be carried by a supporting framework 40 which in turn may be wall or table mounted by means of a bracket 42.

Bracket 42 is provided with a generally upstanding plate 48 and an integral base 46. Slotted opening 44 is provided in plate 48 to allow hanging of the docking unit upon a vertical surface if desired. Base 46 provides a structure for fastening the docking unit to a horizontal workbench or shelf, if preferred.

Plate 48 of support 42 is provided with opening 49 to receive plug means of a typical telephone wall mounting plate. Slotted opening 44 and slot 47 of plate 48 are disposed to receive large-headed mounting studs typical of telephone wall mounting plates. Thus a user may leave docking unit 2 attached to a wall at a telephone wall plate and may attach telephone cabling through opening 49 to modulator-demodulator means which may interconnect with data entry terminal 4. When data intercommunication with a data collection device, or recharging thereof is desired, the device may be placed within the docking unit 2 as it hangs from a wall, mounted to a telephone wall plate if desired.

Referring now to FIGS. 4 and 5, the structure of a preferred embodiment of docking unit 2 can better be visualized. Contact elements 32 are arranged in spaced apart insulated fashion and are mounted at bottom wall 30 of receptacle 20. Offset part 25 of the rear wall 26 overhangs rear wall 41 of frame 40. Detents 50 and 52 are carried by tabs 54 which are integral with rear wall 26 at sloped region 27 thereof. This construction allows tabs 54 to deflect relative to rear wall 26. Detents 50 and 52 comprise mating elements for indentations formed in the rear of housing 6 of data entry terminal 4 and are positioned on rear wall 26 such that mating engagements with indentations on data entry terminal 4 are achieved when data entry terminal 4 is fully seated within receptacle 20. Electrical connector 76 provides an interconnection junction between circuit board 48 and external means and in the preferred embodiment comprises a pin-containing shell housing well known as a DB-9 connector.

Figure 3:
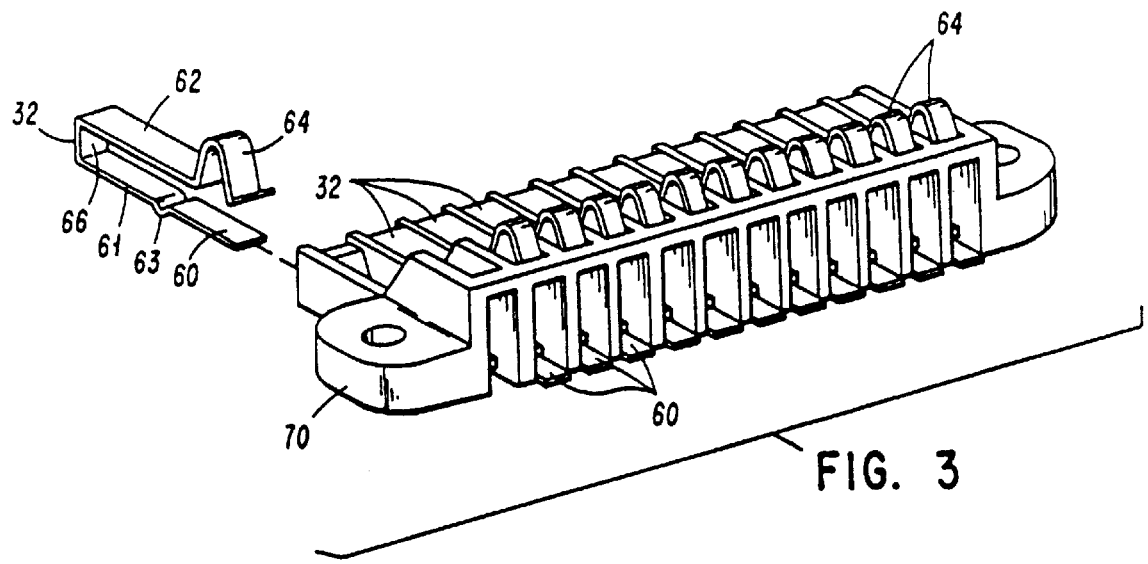
FIG. 3 is an enlarged view of the multiple contact subassembly forming part of the terminal receptacle means of FIG. 1.

Referring to FIG. 3, a plurality of contact elements 32 are deployed within a contact block 70 of insulating material. In FIG. 3, one contact element 32 is displaced from its position on block 70 for illustration of detail. Each contact element 32 comprises a formed conductive strip having a first leg 60 and a second leg 62. Leg 62 is provided with a generally U-shaped area 64 therealong. First leg 60 and second leg 62 are formed in generally parallel relationship separated by a reverse bend 66. Contact elements 32 are constructed of electrically conductive material with sufficient resilience such that the second leg 62 will return to its generally parallel relationship to first leg 60 when not subjected to deflective force.

Each contact element 32 is fitted into contact receiving block 70 such that contact elements 32 are spaced apart in generally parallel insulated relationship with U-shaped sections 64 projecting upwardly. The second legs 62 including U-shaped sections 64 are free to be deflected somewhat downward when contact elements 32 are positioned within contact receiving block 70. First leg 60 of contact element 32 is provided with a protrusion 63 projecting below lower surface 61 thereof, said protrusion 63 establishing electrical contact with a conductive area upon circuit board 48, FIG. 5, to which contact receiving block 70 is mounted.

Referring now in particular to FIG. 5, it can be seen that contact receiving block 70 is stationed below bottom wall 30 of receptacle 20, with the U-shaped sections 64 of contact elements 32 normally projecting through opening 72 of bottom wall 30.

Frame 40 carries receptacle 20, being secured thereto by screw 74. Bracket 42 is secured to frame 40 at angle pieces 43 and 45 and is shaped to afford a convenient recline to frame 40. It can be seen that bracket 42 may be mounted by appropriate means to a vertical structure, or to a horizontal structure at its base 46.

Figure 2:
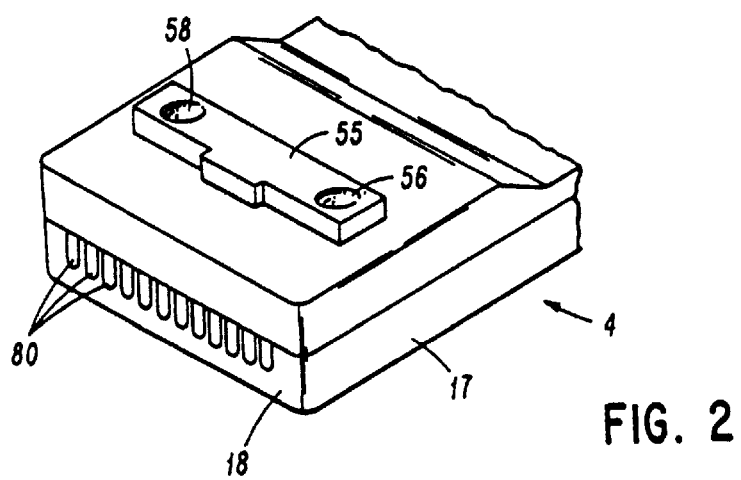
FIG. 2 is a partial enlarged perspective view of the contact end of a hand-held device of the type shown in FIG. 1.

FIG. 2 discloses, from the rear, the lower end 17 of the hand-held data entry terminal 4 of FIG. 1. Indentations 56 and 58 are provided on a wear plate 55 at the back of data entry terminal 4 and are disposed to receive detents 50 and 52 respectively when data entry terminal 4 is inserted in receptacle 20 and seated upon bottom wall 30 thereof. A plurality of contact pads 80 are positioned upon end wall 18 of data entry terminal 4. When data entry terminal 4 is properly positioned in receptacle 20, contact pads 80 of data entry terminal 4 engage contact elements 32 at U-shaped sections 64 thereof in abutting pressure engagement. The engagement of contact pads 80 with contact elements 32 provides a substantial deflection of the legs 62 of the contact elements relative to legs 60, and results in substantial contact pressure between each U-shaped section 64 and the associated contact pad 80. The deflection of legs 62 is limited by stop 82, which can be best seen in FIG. 5.

The employment of detents 50 and 52 in cooperation with indentations 56 and 58 permits receptacle 20 to be disposed in other than generally vertical orientation while still allowing secure retention of data entry terminal 4 in frame 20 with reliable interengagement of contact pads 80 of data entry terminal 4 with contact elements 32 of the receptacle.

Figure 6:
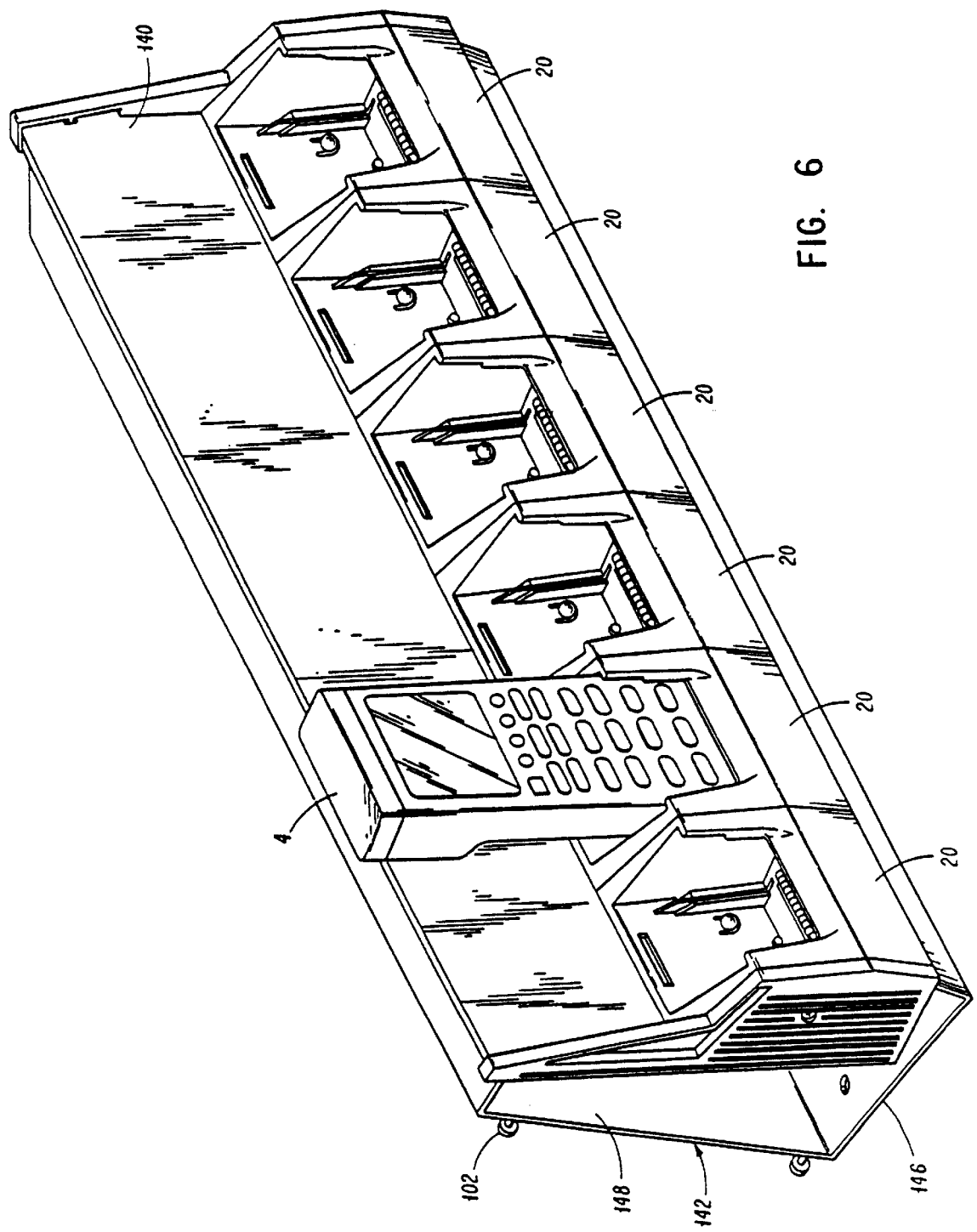
FIG. 6 is a perspective view of a multidocking apparatus for use in an embodiment of the invention, with a hand-held device in one of the terminal receptacles.

FIG. 6 discloses a multidocking unit wherein a plurality of receptacles 20 are mounted within an elongated frame 140. In the embodiment shown there are six receptacles 20. A data entry terminal 4 may be placed in each of the receptacles 20 of the unit of FIG. 6, such that six data entry terminal units may be recharged and/or integrated with a data collection system at one time. Each data entry terminal 4 may be selectively positioned in any of the receptacles 20 independently of any placement of other data entry terminals in any other receptacle 20. Frame 140 is supported at a slight recline by a bracket 142 which comprises base 146 and upstanding wall 148. Mounting means 102 is optionally available to secure bracket 142 to a vertical structure, if desired.

OPERATION OF THE EMBODIMENT OF FIGS. 1–5

As the need arises to recharge the internal batteries of one or more data entry terminal 4, or to feed data to or collect data, from said data entry terminal 4, the data entry terminal 4 may be placed in a receptacle 20 such that the contact pads 80 of data entry terminal 4 engage and depress the resilient legs 62 of contact elements 32 of receptacle 20. Since contact pads 80 and contact elements 32 are electrically conductive, the engagement of a contact pad 80 with a contact element 32 provides a completed electrical pathway such that electrical charging and electrical communication between the docking system 2 and data entry terminal 4 may be accomplished.

Detents 50 and 52 of rear wall 26 of receptacle 20 engage mating indentations 56 and 58 on the rear of data entry terminal 4 such that sufficient mechanical rigidity is achieved between data entry terminal 4 and receptacle 20 to maintain firm pressure engagement between contact pads 80 of data entry terminal 4 and contact elements 32 of receptacle 20.

Bracket 42 of docket unit 2 may be mounted to a vertical wall over a telephone mounting bracket having vertically spaced apart studs and a telephone jack which remains accessible through opening 49 of plate 48 of bracket 42.

Once insertion of data entry terminal 4 is completed within receptacle 20, recharging of batteries and intercommunication of the data entry terminal with outside computing facilities may be achieved.

Reference is made to a copending application of Patrick H. Davis, U.S. Ser. No. 07/327,660 filed Mar. 23, 1989, Attorneys Docket No. 36504X, which contains description and claims relating to FIGS. 1 to 6, and the entire disclosure of this copending application including the drawings is hereby incorporated herein by reference.

Description of FIGS. 7–11

FIGS. 7 to 11 correspond generally with figures one to five of a pending design patent application U.S. Ser. No. 07/303,557 filed Jan. 27, 1989, Attorneys Docket No. 36504 now abandoned, and the entire disclosure including the drawings of U.S. Ser. No. 07/303,557 is incorporated herein by reference.

FIG. 7 shows a multidock system 100 with a series of receptacle modules 101–106 corresponding to the receptacles 20 of FIGS. 1 and 6. Each receptacle may be identical to the receptacle 20 of FIG. 1, and be provided with detents 50, 52 as in FIGS. 4–5.

FIG. 9 shows a left end cap 111 for the system 100, and right hand end cap 112, FIG. 7 may be a mirror image of left end cap 111.

As seen in FIGS. 8 and 9, the system 100 may be provided with a mounting bracket 120, with feet such as 121, 122, FIG. 7, and 123, 124, FIG. 8, for facilitating mounting of an horizontal support surface of a bench or the like. For wall mounting, shoulder rivets 125–128, FIG. 8, are provided.

FIG. 10 shows the sets of spring fingers, 141–146, corresponding to contacts 32, FIG. 3, for the respective receptacle modules 101–106.

Since each of the receptacle modules is designed to function the same as the receptacle 20 of FIG. 1, a further description of FIGS. 7 to 11 would be superfluous. A major advantage of the multidock system is that it may be formed of parts identical to parts of the receptacle 20 shown in FIGS. 1–5.

Description of FIGS. 12–16

FIGS. 12 to 16 show the general subject matter of figures six to ten of the incorporated design patent application U.S. Ser. No. 07/303,557.

FIGS. 12 to 16 may illustrate a single dock assembly which is identical to that of FIGS. 1 to 5 and accordingly the same reference numerals have been applied. End caps 111', 112' may be of the same construction as parts 111, 112, FIGS. 7–9. FIGS. 12 to 16 further show a single dock stand 160, which may have feet 161–164 for accommodating mounting of the single dock on a horizontal surface, e.g. of a desk or table. Slots 171, 172, FIG. 16, accommodate wall mounting of the assembly.

Description of FIGS. 17–22

FIGS. 17 to 22 show a network controller unit 200 which may be associated with the multidock assembly 100, FIGS. 7 to 11, for furnishing charging potential to the terminals in the respective receptacle modules such as 101–106. The controller 200 may also, for example, control communication between the respective terminals and a host computer system.

The controller 200 is shown as comprising a base 201 and cover 202 forming a housing for the electrical components. A feet bracket 203 has front feet 206, FIG. 20, and 207, FIG. 18, while the base 201 directly mounts rear feet 208, 209. Wall mounting is accommodated by shouldered rivets 211, 212. The cover has a keyboard 220 and a display 221 at the front thereof. A loading slot 224, FIG. 18, may be at the left side for receiving a floppy disk. A cooling fan outlet 226 is shown in FIG. 20.

A power receptacle 230 and a power control switch 231 are indicated in FIG. 18. FIG. 21 shows a bracket 234 for mounting six D-sub type connectors.

The internal structure and operation of the controller 200 will be described in detail hereinafter.

Description of FIGS. 23–27

FIGS. 23 to 27 show a preferred electrical configuration for the multidock arrangement of FIGS. 6 and 7 to 11.

Figure 23:
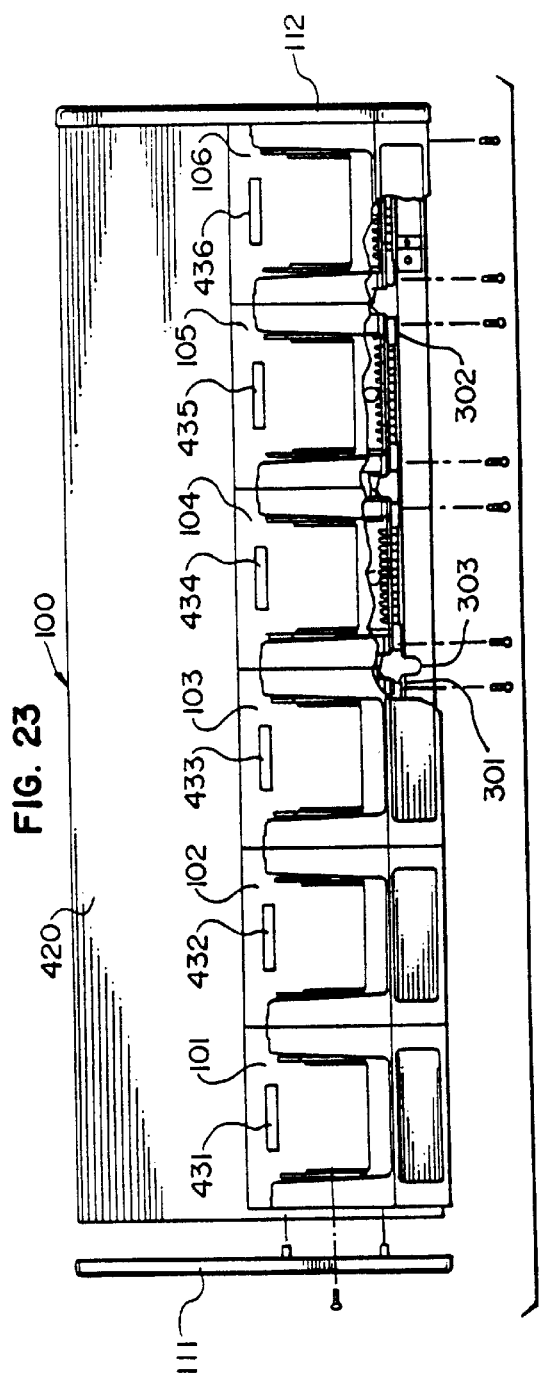
FIG. 23 is a somewhat diagrammatic partially exploded frontal elevational view showing multidocking apparatus according to FIGS. 6 and 7, but with certain parts broken away to illustrate significant features of internal construction.

As shown in FIG. 23, printed circuit boards 301, 302 may each extend continuously through a set of three receptacle modules, i.e. board 301 extends through modules 101–103 and board 302 is associated with modules 104–106. The two boards 301, 302 may be interconnected by a flex cable 303. The set of six modules of a multidock unit may be coupled with the controller unit 200 by means of one of two end connector receptacles 311, 312, FIG. 25. The other end connector receptacle may connect the system to a further multidocking unit, for example.

Figure 24:
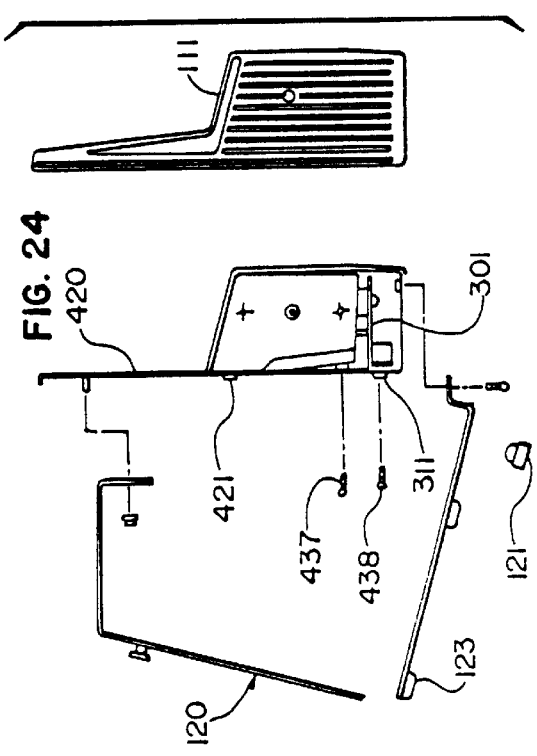
FIG. 24 is a somewhat diagrammatic left side elevational view of the structure of FIG. 23 with parts separated from each other to indicate details of internal construction and assembly.

In the embodiment of FIGS. 23–27, a single continuous receptacle support plate 420 may have the receptacle modules 101–106 secured therewith by means of respective hooks such as 421, FIG. 24, which are formed integrally with the rear walls of the modules by offsetting the metal from slots 431–436, FIG. 23. Each receptacle module is then fixed in place by means of a screw such as 437, FIG. 24, and a thread lock adhesive. While the support plate 420 is common to the six receptacle modules 101–106, the multidock base 120 extends only over the area of the central four receptacle units so that connector means 311, 312, FIG. 25, are accessible from behind modules 101 and 106.

Further screws 438 secure the connectors 311, 312 to the receptacle support plate 420.

Screws 439, FIG. 25, secure latch blocks 440, FIG. 27, and bracket 441 to form the connectors such as 312. As seen in FIG. 26, latch blocks 440 have notches 440a for securing mating connectors therewith.

For example, a cable may have a connector at one end engaged with a D-sub connector at position 450, FIG. 21, and a connector at the opposite end engaged with nine position D-sub connector part 451 or 452 of connector 311 or 312, FIG. 25.

FIG. 27 illustrates how docking connectors 461–466 are fastened to printed circuit boards 301, 302 by screws 467 and nuts 468 so as to clamp the spring contacts 470 to respective contact means 471–476, FIG. 26, of the printed circuit boards. The sets of spring fingers 141–146, FIG. 10, formed by contacts 470 project through openings in the bottom of the receptacle modules 101–106 so as to engage external contacts of hand-held data terminals inserted into the respective docking modules the same as explained in reference to FIGS. 1 through 6.

EXEMPLARY NETWORK CONFIGURATION, FIG. 28

A preferred network configuration would comprise a primary and multiple secondary devices, where a controller module such as 200, FIGS. 21–26, is the primary device, and hand-held data terminals, printers and optional interfaces and bridge products are the secondary devices. Hand-held data terminals also may operate in a network without a controller. In a preferred configuration, communication in the network is via a RS-485 bus. The controller 200 in addition to its data communication function may provide a power system for charging of the terminals in the docking modules such as 101–106, FIG. 23, and in some cases may also supply system power to the secondary devices. Where the capacity of the controller 200 is exceeded, an auxiliary power unit (APU) may connect with one of the receptacles 450, FIG. 21 to receive communication from the controller 200, and may itself contain a power system for associated terminals for other secondary devices. The network is thus preferably a local area network (LAN), with physical connectivity to the network provided by multidock units such as shown in FIGS. 7–11 and single dock units such as indicated in FIGS. 12–16. These devices may be connected together using connection receptacles such as shown at 451, 452, FIG. 25, using simple twisted pair cabling. FIG. 28 shows a block diagram of an exemplary network configuration, and a brief description of each network module is as follows:

Single Dock, (FIGS. 1–5, 12–16 and 28A)

The single dock is a passive device for electrical connection to a communications network and power system. Charging voltage may be provided through a LAN interface and a separate connector e.g. 76, FIG. 5. The dock establishes proper alignment and retention for a hand-held data terminal so as to enable host communications. A RS-232 port allows communication between a single dock as represented at 400, FIG. 28A, and a modem 401, or alternatively allows a direct connection between the single dock 400 and a host.

Multidock, (FIGS. 6–11 and 23–28)

A desired number of hand-held data terminals are connected to the local area network with one or more multidocks as represented at 411 and 412, FIG. 28. Six single terminal modules are integrated into one enclosure as illustrated in FIG. 23. Quick release connectors such as 311, 312, FIG. 25, located at each end, allow connectivity to additional terminal interfaces and other devices. Individual optional locking devices are available for providing security (preventing removal of a terminal from its docking receptacle without a key or the like).

Auxiliary Power Unit, (FIGS. 28 and 29, 29A)

An auxiliary power unit such as represented at 421, FIG. 28, may develop charging voltage and operating power for up to twenty-four hand-held data terminals, e.g. associated with four multidocks such as 422. In a particular system a controller 400 may be capable of charging only twenty-four hand-held data terminals on its primary LAN channel indicated at 425. The auxiliary power unit 421 may be used on a secondary LAN channel 426 or used to extend beyond the original twenty-four terminals on the primary LAN channel 425. A repeater reshapes the RS-485 signal so that it may drive an additional twenty-four logical units. Each functional block of the auxiliary power unit 421 is shown in FIG. 29.

In FIG. 29, the secondary LAN channel may comprise conductors 426A and 426B, while output channel 427 from the auxiliary power unit to the multidock 422, FIG. 28, may comprise conductors 427A and 427B. The connection between controller 400 and auxiliary power unit 421 may additionally include a direction control line 431, for controlling repeater components 432 and 433. As represented in FIG. 29A, a plus fifteen volt power supply component 435 and a five volt regulator component 436 may also be included in the auxiliary power unit, and may receive a conventional commercial one hundred and twenty volt alternating current via a receptacle essentially corresponding to receptacle 230, FIG. 18.

Controller, (400, FIG. 28)

The network controller 400 may be a multipurpose communications controller designed to provide a flexible interface for communications between a customer's host computer and hand-held data terminals and the like. Data ports may comprise a host port leading to a host channel 431, and one to three terminal ports such as associated with a channels 425, 426 and 432 in FIG. 28. An optional LAN port may be selected through software which precludes the use of the third terminal port associated with channel 432 in FIG. 28. The second LAN port and secondary channel 426 is connected in parallel with the primary LAN port associated with channel 425, for added configuration capabilities.

Flexibility allows the controller 400 to be used as a communication gateway at a host location or as a LAN interface device in remote depots where a multiplicity of hand-held data terminals are to be downloaded, have their batteries recharged and so on. Port expansion is possible by chaining additional controllers together via the communications ports.

The mechanical design allows the controller 400 to connect to multidocks such as 411 with quick-connect cables for easy configuration and serviceability. The exemplary controller 200 of FIG. 21 may have six connectors leading to channels such as indicated at 425, 426, 431, 432 and 433.

In the example of RS-485 LAN, all devices which interface to the LAN connect to a single wire pair using a balanced transceiver. This standard is advantageous since it allows for multiple drivers and receivers, high noise immunity over relatively long lines, operation with wide common mode voltages, and the provision by the drivers of self protection against contention.

The RS-232 interface does not directly affect the architecture of the controller 400. Under normal system configurations, this interface will be used to communicate with various modems and non-LAN products.

The controller 400 may be configured as a communications controller. Four sync/async RS-232 ports are software configured for host and remote communication channels. A RS-232 port will enable host communications using the most common asynchronous and synchronous protocols. These include Bisync, two-way TTY and ADCCP. During system configuration, the target protocol is specific and soft-loaded from a removable disk inserted in the disk receptacle slot 224, FIG. 18, so as to be loaded in executable RAM.

The dimensions of the controller 200 are generally as follows: Height—9.5 inches max., width 13.0 inches max., depth—7.5 inches. The weight is five pounds maximum. As previously described, the controller will have the option to be rigidly attached to a surface or wall. The mounting technique allows access to all cables and power connections, and removal of adjacent multidocks without removing the controller from its mounting surface.

Connectors

The RS-485 LAN may comprise one primary part and one secondary port. The ports may use nine pine D-sub connectors. Signal definition is identified below.

| Pin Number | Signal Name |
| --- | --- |
| Primary Port (J6) | |
| 1 | V+ |
| 2 | +RS-485 |
| 3 | −RS-485 |
| 4 | V+ |
| 5 | Direction |
| 6 | N.C. |
| 7 | GND |
| 8 | GND |
| 9 | N.C. |
| Secondary Port (J7) | |
| 1 | N.C. |
| 2 | +RS-485 |
| 3 | −RS-485 |
| 4 | N.C. |
| 5 | Direction |
| 6 | N.C. |
| 7 | GND |
| 8 | GND |
| 9 | N.C. |

Each of the RS-232 ports are fifteen pin D-sub male connectors, with pin assignments as follows:

| Pin Number | Signal Name |
| --- | --- |
| 1 | N.C. |
| 2 | −TXD |
| 3 | DTR |
| 4 | −RXD |
| 5 | DSR |
| 6 | RTS |
| 7 | CTS |
| 8 | GND |
| 9 | N.C. |
| 10 | N.C. |
| 11 | TRXCO |
| 12 | TRXCI |
| 13 | RTXCO |
| 14 | RTXCI |
| 15 | N.C. |

The LCD display 221 may be a two line by sixteen character format. The keyboard may be a sixteen position four row by four column matrix. Depression of the keys may result in positive tactile feel. Environmentally the assembly may resist exposure to moisture.

The AC line cord my be removable from receptacle 230.

The disc drive associated with loading slot 224 may comprise a 3.5 inch half-height unit capable of an unformatted capacity of one megabyte per disk (720 KB formatted). An optional two megabyte per disk drive is available.

Exemplary Controller Circuit, (FIG. 30)

A discussion of the functional blocks of the exemplary controller circuit of FIG. 30 is presented in the following paragraphs.

Microcomputer 500, (FIG. 30)

The microcomputer 500 may be a type 80C186, some applicable features being as follows:

— 16 bit external bus
— Clock generator
— Two independent DMA channels
— Programmable interrupt controller
— Three programmable 16-bit timers
— Programmable memory and peripheral chip select logic
— Programmable wait-state generator
— Local bus controller Additional detailed information is available in the Intel 80C186 user's manual.

The microcontroller memory map of TABLE A on the following page gives the general organization of various functions within the memory space by way of example.

TABLE A

Controller Memory Map

| MEMORY ADDRESSING | | | | PERIPHERAL ADDRESSING | |
|---|---|---|---|---|---|
| FFFFFF | OXS1400 ROM | | | | |
| F0000 | | | | | |
| E0000 | VRTX ROM | | | | |
| D0000 | NOT USED | | | | |
| C0000 | | | | | |
| B0000 | | | | | |
| A0000 | | | | | |
| 90000 | | | | | |
| 80000 | | | | | |
| 70000 | | | | | |
| 60000 | | | 00300 | DISK DRIVE | |
| 50000 | | | 00200 | KEYBOARD | |
| 40000 | | | 00200 | LCD | |
| 30000 | | | 00100 | HIGH BUZZER LOW BUZZER, LCDRD | |
| 20000 | | | | REAL TIME CLOCK | |
| 10000 | | | 00100 | COMMUNICATIONS CONTROLLER 1 | |
| 00000 | | | 00000 | COMMUNICATIONS CONTROLLER 0 | |

Since the application software may reside in RAM component 501 and in removable disk storage, board level EPROM component 502 may only provide boot functions and diagnostics. This approach allows a stable well tested EPROM to be released with the system without future updates. A socket is preferably provided for easy access.

All application programs execute from RAM (e.g. 501, FIG. 30A). This memory space is a maximum of 786 K (see memory map in TABLE A). All application programs are retained on the removable 3.5 inch disks and are booted to RAM on power up. This allows RAM to be volatile, eliminating the need for optional battery back-up in some cases.

Two 85C30 SCC's, SCC1 and SCC2, FIG. 30B, may be used for host and terminal communications. The four channels may be configured as synchronous or asynchronous, RS-232 ports. One of the four communication ports may be software configured for RS-485 LAN communications.

Real-time clock component 550 may be a Motorola type MC146818. This device is power backed-up to maintain accurate time during power interruptions of various durations depending on the backup options. When an external battery is not used, a capacitor maintains memory and time for up to two weeks. The battery option may extend clock operation for more than three months.

Along with internal registers for time, date and other data, the MC146818 provides fifty bytes of general purpose battery backed-up RAM.

SYNC/ASYNC interface component 560, FIG. 30B, may comprise ports A, B, C and D as shown at the right in FIG. 30B. For synchronous protocols, transmit and receive clock lines are available. The controller or connecting device may generate the clocks and is selected by a direction signal from the microprocessor and use of one of two possible cables between the host and controller.

Autoanswer modems may be connected to this port, and autodial may be initiated using Hayes commands.

The LAN interface component 570, FIG. 30B, may consist of primary and secondary channels. Each channel is driven by an RS-485 transceiver. The primary channel can drive twenty-four logical units or transceivers. Multidocks connect directly to the controller using the primary channel with the use of cables. The secondary RS-485 channel connects to additional multidocks using cables and an APU (FIGS. 29–29A) for charging.

The RS-485 or the fourth RS-232 port is selectable through software (485SEL). This allows communication with four RS-232 devices (e.g. host and three modems) and also devices directly connected to the RS-485 LAN.

A LCD interface 571 may be a self contained module with data lines, read/write strobe and two control lines for enabling the module (PCS4) and controlling power to the device.

Keyboard interface 572 may strobe the four columns of the 4×4 matrix and detect corresponding key closures on one of the four rows. Keyboard activity may be interrupt driven using INIT3. Debounce key rollover will be handled in the firmware keyboard driver. Once the interrupt is detected the key code may be read from the keyboard interface. The chip enable signal may be PCS5.

The 3.5 inch disk drive controller 573 may be an Intel type 82072 high integration floppy disk controller with built-in analog data separator. This provides the interface requirements to the 3.5 inch disk drive of network controller 200.

Five DMA sources may be logically "ORed" to the two available DMA request inputs of the DMA controller of microcomputer 500. The software may keep track of the active device within each group "ORed" to the specific DMA channel. A list of the DMA sources and their respective grouping is listed below.
SCC Port A (LAN)=DRQ0
Disk Controller=DRQ1

The interrupt source and type of interrupt to the processor 500 may be as listed below.

| Source | Interrupt Type |
|---|---|
| Manual Reset | NMI |
| SCC Channels A,B,C,D | INIT0 |
| Disk Drive Controller | INIT1 |
| Keyboard | INIT3 |

A DC/DC converter 581, FIG. 30B, may provide logic power. It may be designed to operate over a wide input voltage range of thirteen to twenty volts. The converter is board resident and allows the use of a relatively inexpensive single output power supply used also for charge voltage to the multidocks on the primary channel.

A linear regulator 582 may be powered by the plus fifteen volt power supply and provide plus twelve volts to the disk drive.

A back-up battery is indicated at 583 and may consist of a 3.6 volt, three-cell nicad battery pack with a 500 amp-hour capacity.

A self oscillating buzzer 584 may be enabled under microprocessor control.

Charge voltage and input power to the controller board may be provided by a single output power supply. Output voltage may be in the range from not less than fifteen volts to not greater than twenty volts. The supply may be capable of sourcing 7.0 amperes and may current limit before 8.0 amperes.

Software Discussion

The Network Controller 400, FIG. 28, may provide high-speed LAN communications for directly connected hand-held terminals via a communications protocol known by the initials NPCP (Norand Portable Communication Protocol).

The Network Controller may provide both synchronous and asynchronous communications support for devices which are remote to the host site. This support may include auto-dial and auto-answer capabilities.

The Network Controller may provide communications support for existing TTY and ADCCP devices of Norand Corporation.

The Network Controller may support an existing file transfer protocol for hand-held computers of Norand Corporation which consists of a single upload session followed by a single download session.

The Network Controller may provide a migration path to a file transfer protocol which may require multiple uploads and downloads.

The file transfer system implemented by the Network Controller may provide a migration path for full-duplex Network Controller to Network Controller communications.

A mechanism may be provided to chain Network Controllers, either directly or over switched lines. The chaining mechanism may be used to provide additional RS-232 ports at a host site or to establish a session with a controller at a remote site.

The Network Controller may provide the host with a method for initiating a communications session with a specific terminal (not necessarily a hand-held data terminal).

The Network Controller may provide a method for "broadcasting" a file or files to multiple terminals.

The Network Controller may provide a method for storing user files on the system.

The Network Controller may provide a method for downloading files requested by hand-held data terminals, independently of a host computer.

The Network Controller may provide a method for downloading files to hand-held data terminals under the direction of a host computer. The origination of the file may be transparent to the hand-held terminal.

Communication ports on the Network Controller may be software configurable.

The Network Controller may provide the user with an easy-to-use interface for changing configuration parameters.

System Configuration

The Network Controller may be configured through a menu driven program using the keyboard and display.

The following examples represent some possible system configurations.

(A) Host to local Network Controller configurations:

1.

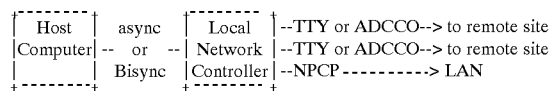

2.

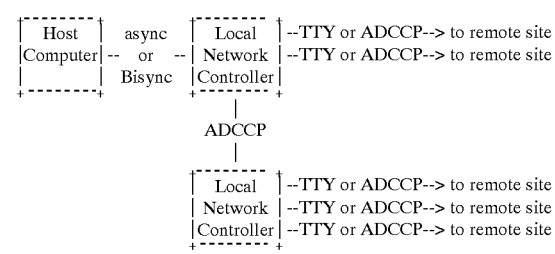

3.

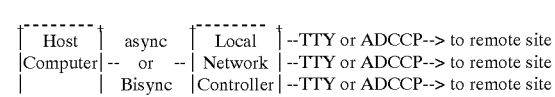

Network Controllers at the host site may be configured with four RS232 ports, or with three RS232 ports and one RS485 port. The RS485 port is used if hand-held computers are in a LAN at the host site. One of the RS232 ports is used for communication with the host, and the remaining RS232 ports are used for remote communications. Currently, the host port data-link protocol must be transparent point-to-point bisynchronous or asynchronous with (optional) parity checking. The host port may be configured at speeds up to 19,200 bps.

Local Network Controller to remote Network Controller configurations:

1.

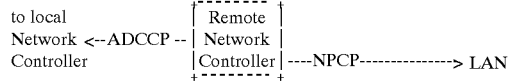

2.

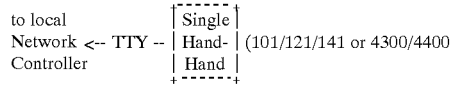

-continued

3.

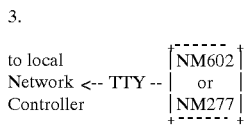
to local
Network <-- TTY --
Controller

4.

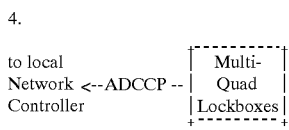
to local
Network <--ADCCP --
Controller

Several options are provided for support of remote sites. Network Controllers at remote sites have one RS232 "host" port, for communications with a "host" Network Controller, and one LAN port. The communications link to the host controller can be manually configured to use either ADCCP or a TTY extension as the data-link protocol. ADCCP ports on a host controller may communicate with either remote controllers configured for ADCCP or with ADCCP terminals in Multi-quad Lockboxes. TTY ports on a host controller may communicate with 4300/4400 terminals, 101/121/141 terminals or other TTY devices of Norand Corporation. The host controller determines if a remote device is a Network Controller or an ADCCP/TTY device, when the connection is made. The host may dynamically configure RS232 ports on a Network Controller as either ADCCP or TTY ports when the port is activated. This facilitates the use of a single port for synchronous communications to remote Network Controllers and asynchronous communications to TTY devices.

Information on 4300/4400 terminals which may operate on the network of FIGS. 28, 39 and 40, for example, and other exemplary details are found in the following pending applications:

(1) Cargin, Jr., Kelly, Fischer, Gibbs, Boatwright and Durbin application for patent entitled "HAND-HELD COMPUTER TERMINAL" U.S. Ser. No. 07/339,330 filed Apr. 14, 1989, Attorney Docket No. 6808.

(2) Miller, Koenck, Walter, Kubler, Cargin, Jr., Hanson, Davis and Schultz applications for patent entitled "DATA CAPTURE SYSTEM WITH COMMUNICATING AND RECHARGING DOCKING APPARATUS, AND MODULAR PRINTER AND HAND-HELD DATA TERMINAL MEANS COOPERABLE THEREWITH"

(2a) U.S. Ser. No. 07/346,771 filed May 2, 1989, Attorney Docket No. 6649-Y, Express Mail Label No. LB 168 165 327.

(2b) U.S. Ser. No. 07/347,602 filed May 3, 1989, Attorney Docket No. 6649XX, Express Mail Label No. NB 430 240 943

(3) Miller, Traeger, Kubler, Cargin, Jr., Hanson, Davis and Schultz applications for patent entitled: "DATA COMMUNICATION SYSTEM WITH COMMUNICATING AND RECHARGING DOCKING APPARATUS FOR HAND-HELD DATA TERMINAL"

(3a) U.S. Ser. No. 07/347,298 filed May 2, 1989, Attorney Docket No. 36504Y, Express Mail Label No. LB 168 165 305

(3b) U.S. Ser. No. 07/347,849 filed May 3, 1989, Attorney Docket No. 6504XX, Express Mail Label No. NB 430 240 954

The entire disclosure of each of these pending applications including the drawings and Appendices is hereby incorporated herein by reference in its entirety.

Software Interface

The Network Controller maintains sessions between the host computer and hand-held computers of Norand Corporation (or other devices) on logical channels. As used here, "channel" consistently refers to a logical data channel and "port" refers to the physical link, which may contain one or more logical channels. Data from the Network Controller to the host is identified by channel number and record type. With the possible exception of an initialization record, data from the host is sent in response to a "channel request" from the Network Controller and is identified by record type only. (Record types "0" to "5" are, for the most part, compatible with NI315/NI311 record types).

Logical Channels—Data transfers to/from the host computer are on logical channels. The logical channel identifier field, which precedes data to the host, consists of a 1-byte "controller channel" followed by a 1-byte "terminal channel". Controller channels may contain terminal channels ranging from "1" to "9". Controller channels range from "0" to "9". New controller channels are opened each time a secondary controller—with multiple "terminal" ports—connects to the "host" controller. An identification record is sent to the host when a new controller channel is opened. The identification record contains a location identifier for the new controller, port information, and a channel number for the controller.

Note: Only one controller channel is required, to the host, if no secondary controllers have multiple terminal ports. Data transfers for secondary controllers can occur on the primary controller channel (e.g: "0"). In this case, the host could treat the 2-byte channel identifier as a single field and avoid double indexing, or, optionally, the channel identifier could be reduced to a 1-byte field.

Records from the Network Controller to the host computer.

Records from the Network Controller are always preceded by a channel identifier, followed by a 1-byte record type. Network controller record types are:

0—UPLOAD DATA—Upload data records contain "upload" data from hand-held terminals. The host is guaranteed that the data from (or to) a terminal is contiguous on a logical channel.

1—END-OF-SESSION—End-of-session records are sent after each hand-held session completes, to indicate the status of the communications session.

2—DATA REQUEST—Data request records are used to request data from the host computer. The host may respond with a data record, a file directive or an end-of-data record.

3—INACTIVE STATUS—Active/Inactive status records are sent by the controller when the host port is inactive. An inactive status record indicates that no terminals are currently active on the channel.

4—ACTIVE STATUS—Active/Inactive status records are sent by the controller when the host port is inactive. An active status record indicates that a terminal(s) is currently active on the channel.

5—ACTIVATE REQUEST—Activate request records are used to obtain the information from the host which is necessary to activate the specified channel. Activate requests are sent for a physical port whenever the port is disconnected and include the status of the previous activate request for the port. The host may respond with an auto-dial activation record, an auto-answer activation record, or with a deactivate record. Auto-answer activation records may include a "timeout period" specified in minutes. If the timeout period expires, the port will be deactivated and a new activation request will be generated for the port. This feature will allow a port to be toggled between auto-answer and auto-dial.

Note: Modem configuration information is only required for modem types not supported by Norand. Note: The activate request record replaces the NI311/NI315 phone request record.

6—SPECIAL REQUESTS—Special requests are used to prompt the host with an extended set of Network Controller requests. The host must examine a "subtype" filed to determine the type of special request. Currently, two subtypes of special requests are required:

1—FILE REQUEST—File requests are sent to the host computer each time a Network Controller is brought-on-line. The host may respond to a file request with a one of several possible file directives or with an end-of-data record. File requests/directives can be used to load and maintain files stored on the Network Controller diskette and in RAM. The controller will send file requests to the host until the host responds with an end-of-data record. The file request option may be turned on or off with a flag in the initialization record.

2—CONNECTION REQUEST—Connection requests are sent to the host to allow the host to establish a communications session with a specific device or terminal. The connection request includes a field to identify the location of the Network Controller which generated the request. The host may respond with a device identifier (terminal ID) to establish a session or may respond with an end-of-data record. The connection request option is enabled with a flag in the initialization or activation record. If the option is turned on, the host will be prompted with a connection request: 1) at the beginning of a session with a Network Controller, 2) after each end-of-session record is sent, and 3) after a fixed time period expires with no activity on a channel. An end-of-session always follows a connect request, either after the request fails or after the terminal session completes.

Note: Inactive status records will not be sent to channels with connection requests enabled.

7—DIRECTIVE STATUS—Directive status records are sent to the host computer to supply the host with completion status information for an outstanding host directive. The directive type is included in the status record.

8—IDENTIFICATION RECORD—A Network Controller may be configured with the keyboard to send a location identifier to the host computer or host Network Controller. If the identification record is enabled it will be the first record sent in a communications session. The identification record is required for remote Network Controllers. The identification record includes a location ID, port information, the number of non-host "terminal" ports on the controller. If this number is greater than one: 1) another "controller channel" will be opened to the host, 2) the identification record will be forwarded to the host on the new channel, 3) an initialization record will be expected, from the host, on the channel.

Records from the host to the Network Controller.

Records are sent from the host to the Network Controller in response to channel requests from the controller, with the exception of the first initialization record. Host record types are:

0—DOWNLOAD DATA—Download data records are sent from the host to the controller in response to download requests, and connection requests.

1—END-OF-DATA—End-of-data records may be sent from the host to the controller in response to data requests and special requests. The end-of-data record indicates that no data exists for the type of request specified.

2—INITIALIZATION RECORD—The initialization record is used to configure the host/Network Controller communications session. The initialization record is sent at the beginning of a communications session with a controller. For remote controllers, the initialization record is sent in response to an identification record.

3—AUTO-ANSWER ACTIVATION RECORD—Auto-answer activation records are sent in response to an activation request and may include optional modem and port configuration parameters. An auto-answer activation record may also include an optional timeout parameter, which contains the maximum number of minutes that the controller should wait for a connection on the port. After the timeout has expired, the port will be deactivated and another activation request will be sent to the host.

Note: The auto-answer activation record replaces the NI311/NI315 "cancel-auto-dial" record.

4—AUTO-DIAL ACTIVATION RECORD—Auto-dial activation records are sent in response to an activation request and include a phone number and may include optional modem and port configuration parameters.

Note: The host can use activation records to dynamically change port type (e.g. ADCCP to TTY).

5—DEACTIVATE (for one minute)—Deactivate records may be sent by the host computer to deactivate a channel requesting activation, for one minute.

6—HOST DIRECTIVE—A host directive may be sent by the host in response to a special (file or connect) request or data request from the Network Controller. The host directive contains a "subtype" field. The host will receive a status after the directive has completed, either normally or abnormally. Currently, five subtypes of host directives are required:

1—FILE UPLOAD DIRECTIVE—An upload request can be used to upload a user file stored on the disk of the controller which generated the file request. For example, this feature can be used to obtain the directory of user files on the controller disk. After the requested file is uploaded the controller will sent another file request to the host.

2—LOAD DIRECTIVE—A load directive may be sent in response to a file request, to download a file to the controller which generated the file request. The load directive must include a directory entry which specifies the file name, date, size, etc. After the load directive has been sent, the controller will send data requests for file data until the host responds with an end-of-data record. The data will be written to a file on disk, with the name specified. Existing files with the same name will be overwritten and excess space will be recovered. After the file has been successfully written, a status field will be set to indicate that the file is in a defined state and is available for use.

3—DELETE DIRECTIVE—A delete directive may be sent in response to a file request to delete a data file on the Network Controller. A delete directive will fail if the file is in use.

4—DOWNLOAD DIRECTIVE—A download directive may be sent in response to a data request and is used to download a file which exists on a controller's disk to a terminal on the attached LAN. The terminal which receives the download data should not be able to distinguish between "download directive data" and data from the host.

5—CONNECT DIRECTIVE—A connect directive may be sent in response to a "connect request" from the Network Controller to enable the host to connect to a specific terminal on the LAN. The connect directive must contain a terminal identifier.

Remote Network Controller Interface

"Remote controllers" can be configured for connection to a "host controller", through any of the four ports, over either a switched or non-switched line. The connection will be synchronous and will use ADCCP for data-link control. The controller will acknowledge an ADCCP poll (SNRM) directed to its destination address. The remote controller will then send an identification record which will include the logical location of the controller (for customer use) and a control byte with a device identifier.

Remote Network Controller record types are identical to the record types for a local Network Controller. If the remote controller is configured for multiple terminal ports, the host controller will open a new channel for the remote controller and will simply pass all data through, to the customer's host computer. If the remote controller is configured for a single LAN port, the host controller can, optionally, intercept identification and activation records, and can pass data through on existing channels to the host.

Remote controllers will default to auto-answer mode.

Auto-dialing with a remote controller:

Controllers in a remote "depot" can be configured to auto-dial a phone number(s) at the host site. A primary and alternate phone number may be entered with the keyboard, along with an associated dial time, number of retries, retry wait time, failure threshold, modem type, and minimum number of terminals. The primary phone number will first be dialed after the dial time is reached and the minimum number of terminals are connected. The minimum number of terminals will default to one, and must be non-zero. If the dial time is zero, the primary number will be dialed as soon as the minimum number of terminals are connected. The controller will retry the primary number after the wait time has expired and at least one terminal is connected. Retries will continue until the retry count is exceeded or the failure threshold is reached. If the failure threshold is reached the alternate phone number will be used for the next call.

Remote controllers will default to auto-answer mode.

ESTABLISHING COMMUNICATIONS SESSIONS WITH TERMINALS OF NORAND CORPORATION

A. NON-LAN TERMINALS. This category of terminals includes existing TTY and ADCCP terminals of Norand Corporation, and 4330/4400 terminals on an RS232 interface. Non-LAN terminals may respond to a poll from the host (or host controller) with one or more upload data blocks, and then receive zero or more download blocks from the host. The host, typically, identifies the terminal by an identifier in the upload data and associates download data with the identifier.

Note: Support for booting 3X/4X terminals in a non-LAN environment is currently undefined.

B. LAN TERMINALS. LAN terminals are attached to a high-speed RS485 multi-drop link on the Network Controller. The Network Controller determines what logical terminals are attached to the network, and is responsible for maintaining a current terminal table. The terminal table must include a LAN address and an associated terminal name, which does not need to be unique and can be a "wild card" name. The name of a terminal can be fixed or can be set by a customer. For example, the terminal name can be a function of a bakery route ID, or can be hard-coded in the firmware of the device supporting the terminal.

1. HOST-TO-TERMINAL SESSIONS. Host-to-terminal sessions can be initiated in one of two ways:
   a) LISTEN-ANY (MYID, YOURID)—In this mode a controller application identifies itself and will listen to any terminal trying to connect to "myid". After a successful connection, a terminal name is returned in "yourid". "Myid" could be hard-coded in the software/firmware of the controller and terminal.
   b) OPEN-SPECIFIC (MYID, YOURID)—In this mode a controller application will attempt to connect to a terminal specified by "yourid". Open-specific requests are generated when the host responds to a connect-request with a terminal ID. The host and terminal must agree on the terminal ID (e.g. "yourid") used to make the connection.

After a terminal connects, the controller simply provides a link between the host and the terminal. In a single session, the terminal can send zero or more upload records to the host, and then the host may send zero or more download records to the terminal. Nothing prevents a terminal on the LAN from having additional uploads and downloads or from establishing multiple sessions.

2. CONTROLLER-TO-TERMINAL SESSIONS—The Network Controller will provide a continuous application which will attempt to communicate to devices on the LAN, whether or not the host is connected. The application will be provided for the purpose of downloading data files from the system disk to terminals on the LAN. This facility could be used to load HHC's with operating system files or a kernel program, for example. The application will issue a listen-any (myid, yourid) and will establish sessions with terminals attempting to connect to "myid". The terminal can optionally send a list of the names of files to download. If the terminal does not send a list of download files, the controller application will scan a data file directory for "boot" files and will download those files to the terminal. The host computer will be provided with facilities to maintain data files kept on the controller. In addition, a facility will be provided through the controller keyboard and display which allows the user to load data files from a 3½ inch MS-DOS diskette. The host will receive no status information for controller-to-terminal sessions. Using this option while the host is in session may result in contention for a file.

STORE-AND-FORWARD FILE TRANSFER SUPPORT

The Network Controller will provide the host computer with the facilities to maintain data files on the Network Controller. (Refer to the section describing file requests and host directives.) In addition, a facility will be provided to allow the user to load data files from a 3½ inch diskette. All data files will be written to the Network Controller system diskette, and will be read into RAM during the controller's boot cycle. An entry for each data file will exist in a data directory file. The fields in the directory entries are primarily under host control and are intended for version control. The directory entry will include a type field, which may be used to connect the file to a specific application (i.e. a boot application). Data files which do not have an entry in the directory file will be deleted during the boot cycle.

Host file maintenance will occur after the host session has been established, and before communications begin on any of the other Network Controller ports. The host is responsible for examining the data file directory, via a "directory file request", and ensuring that all data files are current. After normal communications begin, the host may direct that any data file be sent to a terminal requesting a download, by sending a download directive which contains directory information for the file.

A task will run continuously on the Network Controller and will open two types of NPCP "listen" sessions. The first type will simply send "boot type" files to LAN terminals which connect to it. The second session will read a list of files from terminals which connect to it and then attempt to download those files to the terminal. The user is responsible for ensuring that any necessary files are in a defined state on the Network Controller.

EXAMPLE TELECOM SESSION—The following example is a step-by-step representation of a host to Network Controller communications session. It is important to remember that any logical sequence of steps will proceed in a "single-file" order on a logical channel, but that steps from different logical channels can be interspersed on the host port.

1. The host opens the communications port to the Network Controller.
2. The Network Controller sends an (optional) identification record to the host.
3. The host sends an initialization record to the Network Controller. The initialization record configures the controller and enables file requests.
4. The controller sends a file request to the host.
5. The host responds by sending an upload directive to the controller to upload the directory file.
6. The controller sends a directory of the data files on disk to the host, followed by the directive status.
7. The controller sends another file request to the host.
8. The host responds by sending a file "load" directive to the controller.
9. The controller determines that the load directive is acceptable, opens the respective file, and sends a data request to the host.
10. The host sends a data record to the controller.
11. The controller sends a data request to the host.
12. Steps 10 and 11 may be repeated any number of times.
13. The host sends an end-of-data record to the controller.
14. The controller closes the file, updates the status of the file in the file directory, and sends a directive status to the host.
15. The controller sends another file request to the host.
16. The host sends an end-of-data record to the controller.
17. The controller sends an activation request for the LAN port and each of the remote ports (ports 2 and 3).
18. The host responds with an auto-answer activation record for the LAN port and port 2, and an auto-dial activation record for port 3. Port 2 is configured to be asynchronous and port 3 is configured to be synchronous. Connection requests are enabled for the LAN port.
20. A connection is established with a remote controller on port 3.
21. The remote controller sends an identification record to the host (via the local controller).
22. The host sends an initialization record to the remote controller, which enables file request processing.
23. The remote controller sends a file request record to the host, and file request processing proceeds as with the local controller.
24. The remote controller sends an activation request, for its LAN port, to the host.
25. The host responds by sending an auto-answer activation record to the remote controller.
26. The remote controller sends an upload data record, from a terminal on its LAN port, to the host.
27. Step 26 can be repeated any number of times.
28. The remote controller sends a download data request to the host.
29. The host responds with an end-of-data record.
30. The remote controller sends a session status record from the terminal to the host.
31. Activity switches to the local LAN, and the local Network Controller sends a connect request record to the host.
32. The host responds with a connect directive to establish a session with a specific terminal.
33. The terminal is located and a directive status is sent to host which indicates that a session is established.
34. The local controller sends an upload data record, from the terminal to the host.
35. Step 34 can be repeated any number of times.
36. The local controller sends a data request record to the host.
37. The host responds by sending a "download file directive" to the controller.
38. The controller opens the specified file, and downloads the entire file from the controller (RAM) disk to the terminal active on the LAN channel.
39. The controller sends a "directive status" record to the host to indicate that the file was downloaded successfully.
40. The controller sends the next data request record, for the channel, to the host.
41. The host responds by sending a download data record.
42. Steps 40 and 41 or steps 40, 37, 38 and 39 may be repeated any number of times, until the host sends an end-of-data record.
43. The host sends an end-of-data record for the channel.
44. The controller sends an end-of-session record, from the terminal active on the channel, to the host.
45. The controller sends another connection request to the host.
46. The host responds by sending an end-of-data record to the controller.
47. The controller randomly establishes a session with another terminal on the LAN.
48. A communications session proceeds on the channel as in steps 34 through 44.
49. The controller determines that no terminals are available on the remote auto-dial port (port 3), deactivates the port and sends an activation request record, for the port, to the host. The activation request contains a status field which indicates why the port was deactivated.
50. The host responds by sending an auto-answer activation record to the controller, which re-configures port 3 as an auto-answer, asynchronous port. The port is now capable of answering calls from single 4300/4400 terminals (not in a LAN) and existing TTY devices.
51. The controller receives an upload data record from a 4300/4400 terminal on port 2.
52. The controller transfers the data to a host channel and sends the data on to the host.
53. Steps 51 and 52 may be repeated any number of times until the 4300/4400 has finished uploading data.
54. The controller sends a download data request, for the 4300/4400 terminal, to the host.
55. The host responds by sending a data record.
56. Steps 55 and 56 may be repeated 0 or more times.
57. The host sends an end-of-data record for the 4300/4400 terminal.

58. The controller sends the end-of-session record from the terminal to the host.

\* Once set, activation parameters remain in effect until they are specifically reset. Default activation parameters are contained in a configuration file on the controller's disk.

\*\* Enabling connection requests will probably be the exception, rather than the norm. If connection requests are not enabled, connection requests will not be generated and terminal sessions will be established in a way similar to that used in Norand's existing protocol converters (e.g. The controller will accept upload data from any terminal, and pass the data on to the host. The host will use information in the upload data to associate download data with the terminal).

Description of FIG. 31

FIG. 31 illustrates exemplary logic for component 600, FIG. 30A. Inputs PCS0 and PCS1 are identified at 601 and 602 in FIG. 31, and corresponding inputs are apparent in FIG. 30A, which emanate from bus 604. Input DCDRQ designated 606 in FIG. 31 will be seen to originate at the disk drive controller 573, FIG. 30A. Inputs 611, 612 and 613 of FIG. 31, designated DRQB, DBQC, DBQD, are apparent at the right of component 600, FIG. 30A. Output signal lines 615 and 616, FIG. 31, are shown to be connected to the microcomputer 500, FIG. 30A. Outputs 621 and 622, FIG. 31, are seen in FIGS. 30A and 30B to be associated with bus 624 and to lead to the respective serial communications controllers SCC1 and SCC2, FIG. 30B. Input 626, FIG. 31, is seen in FIGS. 30B and 30A to originate at serial controller SCC1.

Description of FIGS. 32A and 32B

FIGS. 32A and 32B show a preferred implementation of the auxiliary power unit (APU) shown at 421 in FIG. 28, and an earlier implementation being shown in FIG. 29. In accordance with the present invention, the auxiliary power unit of FIGS. 32A and 32B enables the expansion of the LAN system beyond the initial twenty-four docking units. The device provides power for an additional twenty-four hand-held computer terminals, so that the batteries may be recharged during the communication process. The APU circuitry of FIGS. 32A and 32B also provides for a bi-directional repeater for the RS-485 communication signals. A commercially available LAN configuration can be expanded to a maximum of seventy-two docking units utilizing one network controller 400, FIG. 28, twelve multi-dock systems such as illustrated in FIGS. 23–27 and two auxiliary power units as represented in FIGS. 32A, 32B.

The connector arrangement as shown at 450, FIG. 21, on the back panel of the network controller and corresponding connectors at the back of the APU unit 421, FIG. 28, simplify the configuration of systems and allow flexibility in routing of external interconnecting cables.

The APU circuitry of FIGS. 32A and 32B is unique because the repeater circuit is bi-directional and does not require an external signal to determine the direction of data (such as provided by direction control line 431, FIG. 29). An energy detection circuit comprised of components 32-U6A and 32-U6B, FIG. 32B, automatically determines which side of the repeater circuitry of FIG. 32A is receiving the data, and enables the repeater circuit for that direction. The enable control lines are indicated at 633, 634, FIGS. 32A, 32B. At that time, the repeater circuit for the opposite direction is disabled. Once data activity stops, both repeater circuits are disabled. The energy detect circuit of FIG. 32B then monitors both sides of the APU repeater circuit for data activity and reactivates one or the other of the two repeaters as required.

By way of example, the respective components of FIGS. 32A and 32B may be of the following types:

| | |
|---|---|
| 32-U6A, 32-U6B, FIG. 32B | Multivibrator e.g. 74HC123 |
| 32-U2, FIG. 32A | Bus Repeater e.g. Type 75178B |
| 32-U3, 32-U4, 32-U5, FIG. 32A | Bus Repeater e.g. Type 75177B |
| 32-REG1, FIG. 32B | Regulator e.g. LM317T |

Description of FIG. 33

FIG. 33 illustrates the circuitry for the RS232 interface components 560 for ports B, C and D of FIG. 30B. FIG. 33 specifically shows the interface for port D wherein the signal CLKSELD shown at input 650 at the left in FIG. 33 originates from a latch 651, FIG. 30A, and is transmitted via bus 652, FIGS. 30A and 30B. Component 654, FIG. 33, may be a driver/receiver, for example MAX 235.

Description of FIGS. 34A, 34B and 34C

In FIGS. 34B and 34C, the RS232 interface component for port A, FIG. 30B, is indicated at 660 and corresponds with the other interface components such as 654, FIG. 33. Thus, bus 652, FIGS. 30A and 30B, supplies the signal CLKSELA at input 662, FIG. 34A. Port select component 664, FIG. 30B, may be implemented as shown at 666 and 667 in FIG. 34A, these components being quad multiplexors, e.g. type 74HC157. The 485SEL signal for input 670, FIG. 34A, originates at latch 651, FIG. 30A, and is transmitted by bus 652. The RS485 interface component 570, FIG. 30B, may be implemented as indicated at 675, FIG. 34B, and component 675 may be a differential bus transceiver, e.g. type 96176.

Description of FIGS. 35A and 35B

FIGS. 35A and 35B illustrate an exemplary implementation of the power supply components 581 and 582, FIG. 30B. The input at line 680, FIG. 35A, may be between 13 volts DC and 20 volts DC and the output 681, FIG. 35A, may supply plus twelve volts to the disk drive component, while output 682 may supply plus five volts.

By way of example, component 690, FIG. 35B, may be a plus modulator, e.g. type UC494AC.

By way of example, the plus twelve volt output at 681 may be supplied by a regulator component 692, e.g. a voltage regulator type UA7812UC.

Description of FIGS. 36A, 36B and 36C

By way of example RAM controller 700, FIG. 30A, may be implemented as shown at 701, 702, FIG. 36B. Coupling of these components to address bus 710 is indicated in FIG. 36A.

FIG. 36C shows a regulator 36-REG1, e.g. type LM317LZ, which is coupled via line 712, FIGS. 36C, 36B, with a plus three volt regulator 36-REG2, e.g. type 581230. The input to components 701, 702 such as VBB1, VBB2 and plus five volts (+5 V) have suitable banks of capacitors associated therewith and the same is true of other voltage inputs throughout the preferred embodiment of a network controller. The showing of these capacitor banks has been omitted since this is a matter of routine for those skilled in the art.

FIG. 36C also shows a RAM chip select signal at 714 (RAMCS). Other connections between FIGS. 36C and 36B are indicated at 716 and 718.

Description of Exemplary Microprocessor And Related Circuits (FIGS. 37A–36F)

In FIG. 37A, the address bus 710 on a complete sheet of engineering drawings would be shown as leading to the sixteen bit inputs (A1–A16) of two EPROM chips (each 64KX8, e.g. 27C512). Such circuitry for implementing component 800, FIG. 30A, is a matter of routine for one skilled in the art, and need not be further described. The data from the EPROM 800 (e.g. D0–D7) is supplied to bus 801 (e.g. as signals DB0–DB7 and AD8–AD15).

The RAM component 810, FIG. 30A, may be implemented as twenty-four CMOS SRAM chips, 32Kx8, e.g. PD43256C. Address bus 710 would supply inputs (e.g. A1–A15), while components 701, 702, FIG. 36B would provide respective select signals (e.g. RCE0, RCE23). A further description of an implementation of component 810 is unnecessary since such circuitry is well within the routine skill of the art.

In FIG. 37A, the control and data bus 820 is shown which is associated with outputs (AD8–AD15) of the EPROM chips implementing component 820. For convenience of compact illustration of the circuitry, this bus 820 is shown offset to the right in FIG. 37D. FIG. 37D also shows a bus part 820A offset to the right from the corresponding bus part 820A of FIG. 37. Otherwise, vertical lines of FIG. 37D are in alignment with the corresponding vertical lines (i.e. 831, 832) in FIG. 37A.

Horizontal lines 841–852 in FIGS. 37A and 37B are in horizontal alignment and have been numbered for convenience of correlation of these figures.

In an actual engineering drawing, a vertical bus segment 820B is shown by the same vertical lines. Thus segments 820C in FIGS. 37C and 37B are identical segments (rather than being connected between the figures). This same procedure has been followed with respect to bus segments 820D, 820E in FIGS. 37E and 37F. Thus, in an actual engineering drawing the lines of bus segment 820B, FIGS. 37B and 37C, would be in direct alignment with and would connect with the two lines of bus segment 820D, FIGS. 37E and 37F, and bus segment 820E of FIG. 37F would be superimposed on and part of bus segment 820E of FIG. 37E. Horizontal line 861 has been numbered in FIGS. 37B and 37C to assist in correlating these figures. Horizontal line 862 has been numbered in FIGS. 37A and 37E, and the horizontal bus segments 870 have been designated at the bottom of FIG. 37A and near the top of FIG. 37E. Bus segment 880 has been labeled as a vertical segment in FIG. 37B and as a horizontal segment in FIG. 37E, these segments being in alignment in the present patent drawings. Vertical bus segments 820G have been designated in FIGS. 37B and 37E since these segments are in vertical alignment in the patent drawings. Horizontal lines 881 through 886 have been designated in FIGS. 37E and 37F to assist in associating these figures.

Exemplary components for the circuitry of FIGS. 37A through 37F is as follows:

| | |
|---|---|
| 37-U42, FIG. 37A | Buffer, e.g. 74HC241 |
| 37-U28, FIG. 37A | D-Type Positive-Edge-Triggered Flip-Flop |
| 37-U5, FIG. 37B | Microprocessor, e.g. Type 80C186 |
| 37-U6, 37-U7, 37-U8, FIG. 37C | Octal Latch, e.g. 75HC573 |
| 37-U30 | JK Flip-Flip, e.g. Type 74HC112 |
| 37-U38, FIG. 37E | CMOS Clock, e.g. Type MC146818P |
| 37-U26 | Programmable Logic "LANPAL" (Type PALC22V10H) |
| 37-U32, 37-U27 | Bus Transceiver, e.g. 74HC245 |

Description of FIGS. 38A–38E

In order to assist in correlation of FIGS. 30A, 30B with the exemplary implementation of FIGS. 38A–38E, the communications bus has been designated 624 in the detailed implementation.

FIG. 38A shows components 901 and 902 for implementing serial communications controller chips SCC1 and SCC2. The address bus has been designated 710 in FIGS. 30A, 30B and FIGS. 38A, 38B and 38E. Data bus 607, FIGS. 38A and 30B, has been designated with the same reference numeral in FIGS. 38A, 38B and 38E.

The vertical line between FIGS. 38A and 38C has been designated 905, and the horizontal lines between FIGS. 38C and 38D have been designated 911–920. The horizontal lines between FIGS. 38D and 38E have been designated 921–928.

Component 930, FIG. 38B, may represent an implementation of the keyboard interface 572, FIG. 30A. Component 940, FIG. 38E, may represent a detailed circuit for disk drive controller 573.

Exemplary type numbers for the major components in FIGS. 38A, 38B and 38E are as follows:

| | |
|---|---|
| Components 901, 902, FIG. 38A | Serial Communications Controller, e.g. Type 85C30 |
| 38-U24, FIG. 38B | Octal Latch, e.g. Type 74HC573 |
| 930, FIG. 38B | CMOS Keyboard Encoder e.g. Type 74C923 |
| 940, FIG. 38E | Controller, e.g. Type 82072 |

Description of FIG. 39

FIG. 39 illustrates components corresponding to those of FIG. 29 but discloses the conception of utilizing energy detect circuits 951 and 952 for eliminating the need for the direction control line 431, FIG. 29. An exemplary detailed implementation of the teachings of FIG. 39 has been shown in FIGS. 32A and 32B, and reference is made to the section headed "Description of FIGS. 32A and 32B" for further discussion of this development.

Description of FIG. 40

FIG. 40 is an extension of the system of FIG. 28, and illustrates how the system may be progressively expanded with the use of auxiliary power units such as 961 and 962, for example to include one or more further multidock units such as those indicated at 971–974 and 981–984.

This will serve to illustrate the manner in which the auxiliary power units of FIGS. 29, 32A, 32B and 39 may be utilized to chain further multidock units beyond the power supply capacity of the LAN controller 400. In this example an auxiliary power unit such as 961 is connected to a connector such as indicated at 312 in FIG. 25 (where connector 311 is closer in the chain to the primary LAN channel 425 of LAN controller 400). Similarly, an auxiliary power unit might be added as indicated in dash outline at 985 after multidock 974 in the primary chain, whereupon four more multidock arrangements such as that of FIGS. 6, 7, 8, 10, 11 and 23–27 could be added as needed. As indicated in FIG. 40, with the addition of an auxiliary power unit 962 in the secondary channel 426, up to four multidock units for example, may be added in a secondary chain.

Description of FIG. 41

For the sake of a specific example, FIG. 41 indicates schematically the conductor paths which may be carried by each of the multidock printed circuit boards such as printed circuit boards 301 and 302 in FIGS. 25 and 26. For the example of three docking receptacles per printed circuit board, each printed circuit board such as 990, FIG. 41, may have three docking receptacle coupling locations 991, 992, 993. For the case of a printed circuit board of a multidock, (e.g. 301, FIG. 25), which is closest to the LAN controller 400, FIGS. 28 and 40, its end connector (e.g. 311, FIG. 25) would be connected to the LAN input terminals 994 of a printed circuit board such as 990, and its connector terminals 995 would receive one end of a flex cable such as 303, FIG. 25. Where the printed circuit board was to be located in a multidock more remote from the LAN controller 400, (e.g. printed circuit board 302, FIG. 25), the other set of terminals 996 would receive the end of a flex cable such as 303, FIG. 25, and the LAN output terminals 997 would be connected to the pin positions of an adjacent end connector, (e.g. connector 312, FIG. 25).

The LAN input and output terminals 994 and 997 may be designated as follows:

| Terminal Number(s) | Designation (FIG. 41) |
|---|---|
| 1 | CHG |
| 2 | +485 |
| 3 | −485 |
| 4 | CHG |
| 5 | DIR |
| 6–11 | GND |
| 12–15 | CHG |
| 16 | SPARE |

The terminals 995 and 996 would then have the following designations in FIG. 41:

| Terminal Number(s) | Designation |
|---|---|
| 1–4 | CHG |
| 5–8 | GND |
| 9 | +485 |
| 10 | −485 |
| 11 | DIR |
| 12 | SPARE |

By way of example, the following tables will explain the interconnections of FIG. 40, having reference to the LAN controller example of FIGS. 34A, 34B, 34C, the auxiliary power unit of FIGS. 32A, 32B, and the multidock printed circuit board terminal designation of FIG. 41.

Table A shows the connections between controller 400, FIG. 40, and multidock 411, for example.

Table B shows the connections between multidock 987, FIG. 40, and auxiliary power unit 961, for example.

Table C shows the connections between auxiliary power unit 961, FIG. 40, and multidock 971.

Table D shows the connections between the secondary channel of LAN controller 400, FIG. 40, and the auxiliary power unit 962.

TABLE A

Connections Between 400 and 411, FIG. 40

| Terminal Number | LAN CONTROLLER Primary Channel Output (FIG. 34C) Designation (FIG. 34C) | MULTI-DOCK LAN INPUT Designation (FIG. 41) |
|---|---|---|
| 1 | +15 V | CHG |
| 2 | +465 | +485 |
| 3 | −485 | −485 |
| 4 | +15 V | CHG |
| 5 | DIR | DIR |
| 6 | — | — |
| 7 | GND | GND |
| 8 | GND | GND |
| 9 | — | — |

TABLE B

Connections Between 987 and 961, FIG. 40

| Terminal Number | MULTIDOCK LAN OUTPUT (FIG. 41) Designation (FIG. 41) | AUXILIARY POWER UNIT LAN INPUT Designation (FIG. 32A) |
|---|---|---|
| 1 | CHG | N.U. (Not Used) |
| 2 | +485 | +485 |
| 3 | −485 | −485 |
| 4 | CHG | N.U. |
| 5 | DIR | N.U. |
| 6 | — | N.U. |
| 7 | GND | GND |
| 8 | GND | GND |
| 9 | — | N.U. |

TABLE C

Connections Between 961 and 971, FIG. 40

| Terminal Number | AUXILIARY POWER UNIT LAN OUTPUT Designation (FIG. 32A) | MULTI-DOCK LAN INPUT Designation (FIG. 41) |
|---|---|---|
| 1 | +15 V | CHG |
| 2 | +485B | +485 |
| 3 | −485B | −485 |
| 4 | +15 V | CHG |
| 5 | N.U. | DIR |
| 6 | N.U. | — |
| 7 | GND | GND |
| 8 | GND | GND |
| 9 | N.U. | — |

TABLE D

Connections Between 400 and 962, FIG. 40

| Terminal Number | LAN CONTROLLER Secondary Channel Output (FIG. 34C) Designation (FIG. 34C) | AUXILIARY POWER UNIT Secondary (J3) Channel Input Designation (FIG. 32A) |
| --- | --- | --- |
| 1 | — | N.U. |
| 2 | +485 | +485 |
| 3 | −485 | −485 |
| 4 | — | N.U. |
| 5 | DIR | N.U. |
| 6 | — | N.U. |
| 7 | GND | GND |
| 8 | GND | GND |
| 9 | — | N.U. |

Of course, with the auxiliary power units of FIGS. 32A, 32B and 39, the conductors on the printed circuit board 990 labeled "DIR" would be unused, and could be omitted.

A unique feature resides in the construction of multiple ports of a local area network as shown in FIGS. 25, 26 and 41, whereby ports 991, 992, 993, for example, are coupled to rigid conductive signal pathways such as "+485", "−485" in FIG. 41 formed directly on rigid printed circuit boards such as 302, 302, FIGS. 25 and 26. Such rigid pathways may be associated with LAN inputs such as 994 or 996 and LAN outputs such as 995 or 997, and extend continuously therebetween.

Instead of separate rigid printed circuit boards 301 and 302 constructed as shown in FIG. 41, a single rigid printed circuit board may be used per multidock, in which case, there might be six coupling locations such as 991, 992, 993, per unitary printed circuit board, and the terminals such as 995 and 996 and any associated extra pathways could be omitted.

In FIGS. 25, 26 and 41, rigid power pathways "CHG" and "GND" traverse each printed circuit board from end to end e.g. for the case of two boards per multidock, from 994 to 995, or from 996 to 997, and e.g. for the case of a single unitary rigid printed circuit board per multidock, from LAN input 994 to LAN output 997.

Summary With Respect to FIGS. 31–41

With the foregoing description, and the detailed circuitry shown in FIGS. 31 through 38E, a preferred embodiment of the circuitry for implementing FIGS. 28, 30A, 30B, 39 and 40 will readily be understood by those skilled in the art. Of prime importance is the preferred implementation for the auxiliary power unit as described with reference to FIG. 39, the flexibility of expansion of the docking capacity as shown in FIG. 40, and the LAN multiport arrangement of FIG. 41.

Description of FIGS. 42 and 43

FIG. 42 is a plan view of the solder side of a printed circuit board such as 301 or 302 and thus corresponds with FIG. 26 except that conductive paths are physically shown. FIG. 43 shows the opposite side of the printed circuit board from FIG. 42, and the electrical connections shown conceptually in FIG. 41, are shown as physical conductive paths in FIGS. 42 and 43. In order to assist in correlating FIGS. 42 and 43 with FIG. 41, reference numerals 990 through 993, 995 and 996 from FIG. 41 have been applied in FIGS. 42 and 43.

The connectors such as 311 and 312, FIGS. 25 and 26, are coupled to the conductive paths on the printed circuit board via hole patterns 1021 and 1022, FIGS. 42 and 43. In an actual embodiment, each socket of connector 311 is connected with a respective hole of a pattern such as pattern 1021 by a wire which extends axially of the socket at one end and curves through ninety degrees so that its opposite end extends axially through a hole of the pattern and is soldered in place. Thus hole pattern 1021 represents potential LAN input terminal positions to be coupled with an input connector such as 311, and hole pattern 1022 may serve as LAN output terminal positions to be coupled with an output connector such as 312, FIG. 25. The corresponding hole patterns in FIG. 26 have been designated 1021A, 1021B and 1022A, 1022B to assist in correlating the figures.

The network conductive data paths between terminals of the end connectors 996 and 995 may be traced as follows:

network terminal 996-1, FIG. 43, copper strip sections 1031, 1032, FIG. 43, through hole 1033, FIGS. 42 and 43, copper strip 1034, FIG. 42, through hole 1035, copper strip 1036, network terminal 995-1: and network terminal 996-2, FIG. 43, copper strip 1041, through hole 1042, copper strip 1043, FIG. 42, through hole 1044, copper strip 1045, FIG. 43, and network terminal 995-2.

The various branch data paths to contact sets 991–993 may be traced as follows:

from network terminal 996-1 and network data path segment 1034, FIG. 42:

branch path 1051, FIG. 42, and contact 991-1;

branch path 1052, FIG. 42, and contact 992-1: and branch path 1053, FIG. 42, and contact 993-1.

From network terminal 996-2 and network data path segment 1043:

direct engagement with contact 991-2, FIG. 42

From network terminal 996-2 and network path segment 1045, FIG. 43:

through hole 1061, branch path 1062, and contact 992-2 through hole 1063, branch path 1064, and contact 993-2

The branch data paths to the hole patterns 1021 and 1022 are as follows:

From network data terminal 996-1 and network data path segment 1031, FIG. 43:

branch data path 1071, FIG. 43, to hold position 1021-1.

From network data terminal 996-1 and network data path segment 1034, FIG. 42:

branch data segment path 1072, FIG. 42, through hole 1073, branch data path segment 1074, FIG. 43, to hole position 1022-1.

From network data terminal 996-2 and network data path segment 1045, FIG. 43:

branch data path segment 1081, FIG. 43, to hole position 1021-2: and branch data path segment 1082, FIG. 43, to hole position 1022-2

The network power supply paths between connector positions 996-3 (CHG) and 996-4 (GND) and positions 995-3 and 995-4, respectively, are via network power supply paths 1091, FIG. 43, and 1092, FIG. 42.

Branch power supply paths from network path 1091 to the various contacts such as 991-3 are via through holes 1093, 1094 and 1095.

Branch power supply paths from network path 1092 are apparent at 1096 and 1097, FIG. 42, for the leftmost contact of set 991 and for the middle two holes of the four-hole row of hole pattern 1021. Corresponding power supply branch paths for contact sets 992 and 993 and for hole pattern 1022 are apparent in FIG. 42.

A network direction control pathway is indicated at 1098, FIG. 42, and may be coupled with branch paths such as 1099 (at the right in FIG. 43), when required, e.g. via through holes such as 1101 and 1102.

Discussion Re Claimed Subject Matter

FIG. 23 shows a series of docking receptacles 101–106 which are shown in greater detail in FIG. 7. Preferred details of each docking receptacle will be understood from the description of FIGS. 1–6, for example.

The docking receptacles have respective sets of docking terminals which are engaged with contact means 471–476, FIG. 26, of the printed circuit boards 301, 302, FIGS. 25–27. The docking terminals may be formed by spring fingers 470, FIG. 27, which include protrusions 998, FIG. 27, for engaging the respective contact means 471–476, FIG. 26. Protrusions 998 correspond with protrusion 63, FIG. 3, and contact mounting block 999, FIG. 27, may be identical to contact block 70, FIG. 3. Thus, the docking connectors 461–466, FIG. 25, may each correspond identically with the connector assembly of FIG. 3, and may be associated with a respective docking receptacle 101–106, FIG. 23, as shown in detail in FIG. 5.

Referring to FIG. 41, the sets of docking terminals at coupling locations 991, 992 and 993 may comprise data coupling terminals as represented at +485 and –485 in FIG. 41. Thus for an array of contact regions such as shown at 64 in FIG. 3, the third contact region from each end may provide a data coupling terminal. In a specific implementation, these terminal positions +485 and –485 may connect with correspondingly located external contacts 80 in FIG. 2, and such contact pads 80 (i.e. the third and tenth such contact pads 80 in FIG. 2) may be connected with the data lines of the third figure of the incorporated application Ser. No. 07/339,330 (i.e. RS485 DATA+ line ninety-seven and RS485 DATA– line ninety-eight of the incorporated third figure.)

The docking terminals such as represented at 991–993, FIG. 41, may further comprise power supply terminals such as CHG and GND, FIG. 41, which may contact the outermost pads 80, FIG. 2. The outermost pads 80 (i.e. contact positions number one and number twelve) may connect with a line designated CHARGE in the third figure of the incorporated application Ser. No. 07/339,330 (line number one hundred seven) and with the power ground of the terminal. Referring to the sixth figure of the incorporated application Ser. No. 07/339,330, now abandoned, the outermost pads 80 may be connected with the CHARGX line (designated forty-three in the incorporated sixth figure) and with the BATT– lines associated with the negative side of the terminal main battery (designated by reference numeral twenty-eight in the incorporated sixth figure).

The printed circuit boards of each multidock such as 411, 412, 1007, 987, 971–974 and 981–984, FIG. 40, may correspond with the printed circuit boards 301, 302, FIGS. 25–27. Each such printed circuit board may be configured as represented in FIG. 41, so as to provide continuous strips of electrically conductive material (e.g. copper) extending between respective terminal positions of connectors 994,996 at one end of each board and respective corresponding terminal positions of connectors 995,997 at the opposite end of each board, to provide network conductive path means. The network conductive path means are then coupled with each set of docking terminals via branch conductive path means such as branch data path means represented at 1006, 1007, FIG. 41, and branch power path means 1008, 1009, and which physically may include contacts 471–476, FIG. 26, at the opposite side of boards 301 and 302 from the network conductive strips, and through conductors extending through the boards 301 and 302.

In FIGS. 34B and 34C, the lines from terminals A and B of differential bus transceiver component 675 are designated 1011, 1012, and lead to primary channel terminals 1014 and secondary channel terminals 1015, FIG. 34C.

The multidock 411, FIG. 40, may have its first printed circuit board (such as 301, FIGS. 25–26) connected with terminals 1014, FIG. 34C, via a connector at position 450, FIG. 21, a suitable cable, and connector 311, FIG. 25. The printed circuit board 301 may then provide rigid conductor network paths as represented in FIG. 41, extending adjacent the sets of docking terminals at 461, 462, 463 from the end adjacent connector 311, FIG. 25, to the end adjacent flex cable 303, FIG. 25. The printed circuit board 302 provides rigid conductor network paths as represented in FIG. 41 from the end adjacent flex cable 303, FIG. 25, to the end adjacent connector 312, FIG. 25.

The secondary channel connectors 1015, FIG. 34C, may connect with an auxiliary power unit, e.g. at connector positions 1021, FIG. 32A.

A second printed circuit board such as 302 of a multidock such as 987, FIG. 40, may have its connector 312 coupled via a suitable cable with the LAN Input indicated at 1022, FIGS. 32A and 32B. The LAN output 1023, FIG. 32A, would then connect with a connector such as 311, FIG. 25, of a multidock such as 971, FIG. 40.

The use of equipment such as represented in FIGS. 21, 23–27, 32A, 32B, 34A–34C, 39, 40 and 41, enables a user to progressively increase docking capacity as needed e.g. by extending the network conductive path means with the use of further identical printed circuit boards, and to maintain a neat, orderly and reliable system of interconnections. Any component of the system is readily removed and replaced facilitating servicing and minimizing downtime.

Referring to the specific example of FIGS. 23–27, 42 and 43, a series of docking receptacles (101–103 or 104–106, FIG. 23) has respective sets of docking terminals, e.g. 1121–1123, FIG. 23, for coupling with portable data means (such as terminal 4, FIGS. 1, 2 and 6).

The printed circuit boards (such as 301, 302, FIGS. 23–27, and 990, FIGS. 42 and 43) have network conductive path means (such as network data path means 1034 and power supply path means 1092, FIG. 42, and network data path means 1045 and power supply path means 1091, FIG. 43) on a rigid substrate 1130, FIGS. 42 and 43. The network conductive path means extend past a multiplicity of the sets of docking terminals (e.g. past the three sets of docking terminals engaged with the contact sets 991–993, FIG. 42).

As explained in reference to FIGS. 42 and 43, the network conductive paths have branch conductive paths connecting the respective network conductive paths with the respective docking terminals of the sets 991–993. In FIG. 42, for example, network data path 1034 has branch paths 1051, 1052, 1053, leading to printed conductive contact areas 991-1, 992-1, and 993-1. These contact areas make electrical contact with respective spring fingers forming the docking terminals via protrusions such as 63, FIG. 3. Power supply branch paths are exemplified by path 1096, FIG. 42.

The printed circuit boards 301, 322, FIGS. 25–27, provide rigid substrates having electrical connector means such as 311, 1131 (FIG. 26), and 1132 (FIG. 26), 312 at the respective opposite ends for connection of the conductive strips of the rigid substrate means as described with reference to FIG. 40. The flex conductor 303 has flexible conductive paths thereon as diagrammatically indicated at 303A in FIG. 26 for connecting respective corresponding conductive strips of the printed circuit boards 301 and 302.

The orderly use of printed circuit boards to provide the network data and power supply paths leads to an optimum expandability and economy of the system while yet achieving a neat and compact arrangement with minimized opportunities for wiring errors during installation, or for inadvertent disturbance of wiring connections during use.

It will be apparent that many modifications and variations may be effected without departing from the scope of the novel teachings and concepts of the present invention.

The following pages show excerpts from a Product Specification for a commercial embodiment of auxiliary power unit in accordance with the present invention, and is designated herein as Exhibit A.

APPENDIX A

Excerpts from Sections 3.0 through 7.1 of a Product Specification of Norand Corporation, Cedar Rapids, Iowa., concerning a Model 4970 Auxiliary Power Unit, (All Copyright 1989 by Norand Corporation).

3.0 Product Overview

The Model 4970, Auxiliary Power Unit (APU) provides an extension to the Norand® 4000 Series system Local Area Network (LAN) for upto 24 additional hand-held computers. The LAN is the physical data link between Norand® 4000 Series Hand-Held computers and the Model 4980 Network Controller. System components consist of the Model 4980 Network Controller, the Model 4970 Auxiliary Power Unit (APU), the Model 4960/50 Communication Multidock/ Single Dock, the 4300/4400 Series Hand-Held Computers and the 4815 printer.

The LAN is a very high speed, serial data link implemented with technology complying to the Electronic Industries Association (EIA) RS-485 recommendation for a digital multipoint system. This physical link allows the 4000 Series system to achieve a 500 Kbits per second (Kbps) data transfer rate over balanced, twisted pair cables. The multidrop RS-485 technology and twisted pair cable media offer higher noise immunity than the traditional RS-232 technology, which results in allowable cable lengths of several thousand feet. Despite reliable communication capacity of RS-485 circuits over cables several thousand feet in length, 4000 Series system cables are limited to less than 120 feet to ensure reliable power transmission, regardless of the number of hand-held computers in the system.

Flexible confirguration and installation are achieved in 4000 Series systems implementing the Model 4970 APU. The APU allows the network to expand beyond the 24 terminals supported by a single Model 4980 Network Controller. The maximum 4000 Series network is achieved by installing two APUs, in addition to the Model 4980, permiting a total of 72 hand-held computers on one local area network. The APU provides signal reconditioning, signal direction sensing and control, terminal communication power, and battery charging for a maximum of 24 Series 4000 hand-held computers.

4.0 Equipment Specifications

Each of the following sections details Model 4970 performance parameters.

4.1 Mechanical Specifications
4.1.1 Physical Dimensions
The mechanical enclosure has an overall maximum profile as specified by the following measurements. The front surface slopes at 15.0 degrees from vertical with the bottom edge as the axis origin.
Depth: 8.10 inches (205.61 mm)
Width: 11.55 inches (293.37 mm)
Height: 10.58 inches (268.76 mm)
Weight: 4.7 pounds
4.1.2 Materials
The mechanical enclosure is comprised of two basic parts; the chassis and the front cover. The chassis provides the base for the enclosure, which houses the power supply, AC line filter, and D-Sub bracket. The top cover provides mounting for the printed circuit board. Finishing overlays applied to the front cover seal cutouts and provide the completed 4000 Series look.
4.1.2.1 Chassis Material The chassis is made of 5052H32 aluminum, 0.063 inch thick. Three brackets are required to complete the chassis assembly: Main Chassis (NPN 753-972-002) Left End Panel (NPN 753-973-004) Right End Panel (NPN 699-167-004)
4.1.2.2 Top Cover Material The top cover is made of Borg Warner, ABS, Cycolac, KJU, 0.100 in. nominal thickness. The cover color is NPN 560-500-001 (Light Gray). The cover is coated with a waterborne, conductive coating (NPN 901-398-001).
4.1.2.3 Overlay Material The overlays are made of hardcoated, polycarbonate film, 0.030 inch thickness. The backs are treated with 3M-468 permanent acrylic adhesive. There are three overlays; the top overlay (NPN 341-062-003), the 4000 Series identifier overlay (NPN 341-062-001), and the Norand® Logo overlay, 0.010 inch thickness (NPN 341-063-001).
4.1.3 Chassis Specifications The chassis consists of three parts; the right and left end panels and the main chassis bracket. The left end panel provides mounting for the AC line filter. The main chassis bracket is a three sided structure which provides mounting for the AC-DC power supply. The following sections detail the specifications for devices which mount to or are supported by the chassis. The three chassis brackets are assembled with # 4, ¼ inch flat head screws.
4.1.3.1 AC-DC Power Supply (NPN 850-456-000) The power supply is an OEM product, which meets the electrical power requirements. The power supply is encased in its own metal chassis, which provides two threaded mounting inserts for 4 mm screws. The power supply is mounted on a vertical plane to the main chassis bracket. The overall module dimensions are 7.4 inches (L)×3.75 inches (W)×2.0 inches (H). The maximum allowable profile for the power supply is 8.0 inches (H)×5.0 inches (W)×2.0 inches (H).
4.1.3.2 AC Power Entry Module (NPN 850-491-001) This module provides an International Electrotechnical Commission (IEC) power line input connector, which allows connection of universal power cords for domestic and international applications. The insulator box is a glass-filled thermoplastic (PETP) with a stamped and formed, aluminum shield providing a ground contact on the chassis mount. The module is installed on the left end panel of the main chassis. The same power entry module is used in both domestic and international configurations with only a change in wiring connections. The required mounting cutout dimensions are 2.62 inches (H)× 1.083 inches (W) with a 0.118 inch radius in each corner. The maximum interior depth required is 2.74 inches.

4.1.3.3 Mounting Facilities Both wall mount and free standing installations are provided in the chassis design. Wall mount studs are available on the back surface of the main chassis bracket. The studs insert and lock into wall mount brackets (NPN 699-224-002). Free standing installations are provided with the feet bracket (NPN 753-975-002) and rubber feet (NPN 813-090-001) on the bottom of the main chassis bracket. The mounting brackets are made of mild, cold rolled steel, 12 MSG (0.1046 in.) thick.

4.1.4 Top Cover Specifications The top cover (NPN 641-357-001) is a molded component made of Borg Warner, ABS, Cycolac, KJU, 0.100 inch nominal thickness. The cover color is NPN 560-500-001 (Light Gray). This cover provides mounting for the printed circuit board, power-on LED, and the D-Sub bracket. The inside of the cover is coated with a waterborne, conductive shield for enhanced EMI and Electrostatic Discharge (ESD) performance. Support posts for pressed nuts are provided for final assembly to the chassis.

4.1.4.1 Printed Circuit Board Assembly (NPN 214-579-002) The printed circuit board assembly is a raw board (NPN 144-376-003) fully loaded and tested with the components detailed in section 4.2.1. This assembly includes the D-Sub bracket (NPN 753-978-003).

4.2 Electrical Specifications 4.2.1 Model 4970 Printed Circuit Board Assembly (NPN 214-579-002) Raw Printed Circuit Board (NPN 144-376-003) The Model 4970 Auxiliary Power Unit printed circuit board contains all the electronic components necessary to provide the functionality, performance, and reliability required by the Product Design Specification (NPN 573-005-012). The circuit board contains functional circuits which are detailed in the following sections. These circuits include the DC-DC converters, signal direction sensing, and RS-485 serial interface. The total maximum power requirement of this printed circuit board assembly is 15 Volts @ 0.03 Amperes (4.5 watts).

4.2.1.1 DC-DC Voltage Converter (NPN 333-047-000) A +5 volt linear regulator supplies the logic voltage for the APU circuitry. The +5 volt supply is produced by an LM-317T linear regulator. This regulator is capable of providing 1.5 amperes continuously over the rated temperature. The maximum +5 volt requirement of the assembled circuit board is 300 mA.

4.2.1.2 RS-485 External Interface Drivers (NPN 310-505-000) The RS-485 standard is defined by a differential signal between two dedicated conductors. By utilizing the enhanced noise immunity and tolerance of common mode voltages, RS-485 communication is capable of achieving data rates of 10 Mbits/Second over twisted pair cable lengths of 4000 feet. The RS-485 standard defines a multi-drop environment where a maximum of 32 drivers and 32 receivers are allowed to operate on the same pair of wires. The Norand Proprietary Communication Protocol (NPCP) has been developed to resolve contention problems. The RS-485 transceiver chips also provide a level of contention protection by disabling the driver circuit when line faults are sensed. Due to power limitations of the Series 4000 system, practical cable lengths must be limited to less than 1000 feet. Three 9-pin, female D-Sub, RS-485 output connectors are provided externally. These connectors are designated as RS-485 outputs by the back panel silk screen. The three connectors are labeled LAN 1 (Output), LAN 2 (Output), and LAN 2 (Input). LAN 2 (Input) is the entry point for the LAN which is to be extended. The connectors labeled as RS-485 Outputs are actually in parallel to the RS-485 transceiver with the difference being a +15 volt supply provided to the LAN 1 Output for communication power to an immediate network. LAN 2 (Output) is intended to provide a linking node for another Auxiliary Power Unit.

The following parameters define the performance of the physical RS-485 interface on the Model 4980.

| Functional Table (Driver) | | | |
|---|---|---|---|
| Input D (TXDA) | Enable DE (RTSA) | Output A (+485) | Output B (−485) |
| H | H | H | L |
| L | H | L | H |
| X | L | Z | Z |

| Functional Table (Receiver) | | |
|---|---|---|
| Differential Inputs A−B | Enable RE (DTRA) | Output R (RXDA) |
| $V_{id} \geq 0.2$ Volts | L | H |
| $-0.2$ V $< V_{id} < 0.2$ V | L | ? |
| $V_{id} \leq -0.2$ V | L | L |
| X | H | Z |

H = High Level
L = Low Level
? = Indeterminate
X = Immaterial
Z = High Impedance

| Parameter | Min. | Typ. | Max | Units | Conditions |
|---|---|---|---|---|---|
| Driver Characteristic Specification | | | | | |
| $V_{IH}$ | 2.0 | | | volts | |
| $V_{IL}$ | | | 0.8 | volts | |
| $|V_{OD}|$ | | | 4.0 | volts | $I_o = 0$ |
| $|V_{OD}|$ | 2.0 | 2.25 | | volts | $R_L = 100\ \Omega$ |
| $|V_{OD}|$ | 1.5 | 2.0 | | volts | $R_L = 54\ \Omega$ |
| $V_{OC}$ | | | 3.0 | volts | $R_L = 54\ \Omega$ or $100\ \Omega$ |
| $I_o$ | | | 1.0 | mA | $V_o = 12$ Volts |
| $I_o$ | | | −0.8 | mA | $V_o = -7.0$ Volts |
| $t_{plh}$ | | 12 | 20 | nS | $R_L = 27\ \Omega$ |
| $t_{phl}$ | | 12 | 20 | nS | $R_L = 27\ \Omega$ |
| Receiver Characteristic Specification | | | | | |
| $V_{TH}$ | | | 0.2 | volts | $V_o = 2.7$ Volts; $I_o = -0.4$ mA |
| $V_{TL}$ | −0.2 | | | volts | $V_o = 0.5$ Volts; $I_o = 8.0$ mA |
| $V_{T+} - V_{T-}$ | | 50 | | mVolts | |
| $V_{OH}$ | 2.7 | | | volts | $V_{ID} = 200$ mV; $I_{OH} = -400\ \mu A$ |
| $V_{OL}$ | | | 0.45 | volts | $V_{ID} = 200$ mV; $I_{OH} = 8.0\ \mu A$ |
| $V_{OL}$ | | | 0.45 | volts | $I_{OH} = 16\ \mu A$ |
| $I_I$ | | | 1.0 | mA | $V_I = 12$ Volts |
| $I_I$ | | | −0.8 | mA | $V_I = -7.0$ Volts |
| $R_I$ | | 12 | | kΩ | |

-continued

| | | | | |
|---|---|---|---|---|
| $I_{OS}$ | −15 | | −85 | mA | |
| $t_p lh$ | | 16 | 25 | nS | $V_{ID}$ = −2.5 V to 25 V |
| $t_{phl}$ | | 16 | 25 | nS | $C_L$ = 15 pF |

The RS-485 signals are labeled as LAN outputs from the Model 4980. External connectors are 9-pin, female D-Sub connectors. The channels are labeled on the chassis as Primary LAN and Auxiliary LAN, which correspond to J6 and J7, respectively. The signal pinouts are:

| Pin # | Mnemonic | Definition |
|---|---|---|
| J6-1 | +15 Volts | LAN Power |
| 2 | +485 | Differential Signal (+) |
| 3 | −485 | Differential Signal (−) |
| 4 | +15 Volts | LAN Power |
| 5 | Not Used | |
| 6 | Not Used | |
| 7 | GND | Signal Ground (Common Mode) |
| 8 | GND | Signal Ground (Common Mode) |
| 9 | Not Used | |
| J7-1 | Not Used | |
| 2 | +485 | Differential Signal (+) |
| 3 | −485 | Differential Signal (−) |
| 4 | Not Used | |
| 5 | Not Used | |
| 6 | Not Used | |
| 7 | GND | Signal Ground (Common Mode) |
| 8 | GND | Signal Ground (Common Mode) |
| 9 | Not Used | |

4.2.1.3 Directional Sensing and Control The LAN is a half-duplex environment (only capable of transmitting signals in one direction). Thus, an APU must provide the same signal direction 1 as the Model 4980 Network Controller. Since the Model 4980 provides no directional control signal, the APU must ascertain signal direction on its own. This is achieved by monitoring the LAN activity and enabling the proper RS-485 Driver.

4.2.2 Power Supply (NPN 850-456-000) The power supply is an AC to DC converter that provides the electrical supply voltage to the Model 4970 circuitry, and communication and terminal charging supply voltage to a primary (LAN1) local area communication network. The power supply is an OEM product, which meets the following electrical requirements. Zinc Oxide Varistors (NPN 303-050-000) are connected to the AC input lines to the power supply to protect the unit from line surge voltages. AC line voltage surges greater than 340 volts will be suppressed (clamped) to protect the power supply electronics. Input Voltage Range: 85 to 132 Volts AC Input Frequency Range: 47 to 61 Hertz Input Current: 1.6 Amperes (max.) Input Power: 135 Watts (max.) Inrush Current: 17 Amperes (Peak) Line Regulation: ±0.4% Volt Out over line voltage range referenced to nominal input voltage. Output Voltage: 15 Volts DC Rated Output Current: 7 Amperes @ 50° C. Over Current Protection: Automatic current limiting before 8 amperes. Output Ripple: 150 mVolts, Peak to Peak Load Regulation: ±0.4% Volt Out, No load to Full Load 4.2.3 Power Entry Module (NPN 850-491-001) Accessory Fuse Drawer (NPN 850-491-101) Fuse (NPN 315-002-000) The power entry module is a 4 Amp AC Rated line filter. This module provides an International Electrotechnical Commission (IEC) power line input connector, which allows connection of universal power cords for domestic and international applications. A double-pole, double-throw rocker switch allows the user to control AC power. The power line filter reduces electromagnetic conducted (EMC) emissions from the power supply out through the power line cord. The filter circuit provides nearly 70 dB signal attenuation over the frequency range of 10 to 100 MHz (The general range for FCC Part 15J conducted emissions testing). A removeable fuse drawer facilitates changing the line fuse without disassembling the Model 4980 chassis. A 2 Amp, 250 VAC, fast acting, 3AG style fuse is used to match the AC requirements of the power supply. Power Entry Module Electrical Specifications: Voltage: 250 Volts AC (max.) Current: 4 Amperes (max.) @ 50° C. (At higher temperatures, the allowable maximum rated current decreases linearly to 0 Amps at a temperature of 85° C.) Leakage Current: 0.5 mA (250 VAC/50 Hz) Dielectric Withstand: 1500 VAC line to line, 2000 VAC line to case Agency Approvals: UL, CSA, VDE and SEV (4 A/250 V) Fuse Electrical Specifications: Nominal Current: 2 Amps Voltage: 250 Volts Interrupt Current: 10,000 Amperes @ 125 Volts AC 100 Amperes @ 125 Volts AC DC Resistance: Less than 35 m$\Omega$ @ 2 Amperes Agency Approvals: UL Listed and CSA Certified Special Type Fuse (Class 1422-01)

4.3 Cable Specifications 4.3.1 Internal Cables All internal cables are designed for optimal electrical performance, mechanical reliability, and ease of assembly. All wires are a UL recognized style. All cables are standard parts listed on the assembly bill-of-materials (NPN 225-374-XXX)

4.3.1.1 AC Power Supply Cables (NPN 216-551-XXX) Three cables provide AC power connection from the power entry module to the AC/DC power supply. All wires are stranded, 18 gauge conductors with polyvinylchloride (PVC) insulation. Refer to the Model 4970, Auxiliary Power Unit assembly drawing (NPN 225-373-001) for connection details.

4.3.1.2 DC Power Supply Cables (NPN 216-547-001) One cable assembly connects the DC output from the power supply to the printed circuit board. A polarized connector terminates the connection made to the circuit board simplifying assembly and ensuring proper DC voltage polarity. All wires are 18 gauge conductors with PVC insulation.

| Pin # | Definition | Color |
|---|---|---|
| 1 | Ground | Black |
| 2 | +15 V | White |

4.3.1.5 LED Cable (NPN 216-XXX-001) One cable assembly provides the electrical interface between the printed circuit board and the power-on LED mounted on the top cover. Both cable connectors are polarized. Both wires are 22 gauge, PVC, stranded wire.

4.3.2 External Cables All external cables are designed to provide the highest EMI and ESD protection. All cables are shielded and terminated to the connector D-Sub housing. In cases where devices with separate AC power supplies are connected, the cable shield is terminated at the Model 4970 end only. This is done to reduce ground loop currents. Reference the Norand specification on Shielded Cable Assembly Procedure (NPN 440-001-001). All external cables are standard parts under the assembly bill-of-materials (NPN 225-374-XXX).

4.3.2.1 RS-485 LAN Cable (NPN 216-601-XXX) This cable interconnects the RS-485 ports on the Model 4980 Network Controller, the Model 4970 Auxiliary Power Unit, and the Model 4960 Multidock. This provides the physical LAN and is a shielded, twisted-pair cable. The three digit index of the part number selects the cable length. The following drawing illustrates the logical signal connections between RS-485 ports.

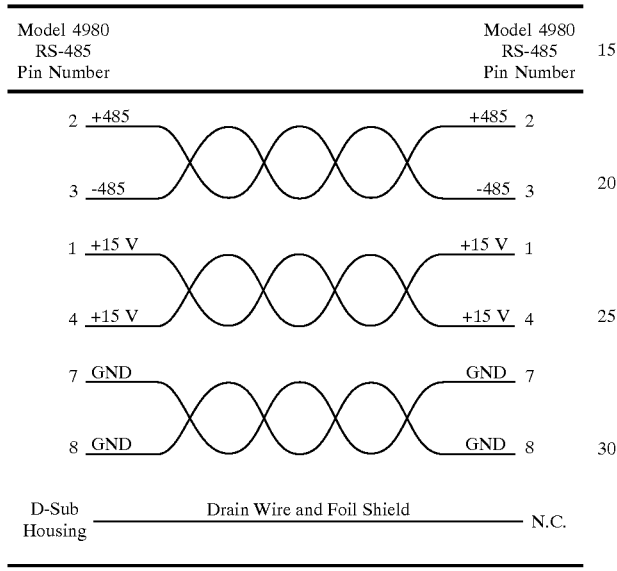

4.3.2.1 AC Power Cable (NPN 321-054-001) The AC power cable provides a reliable and safe entry path for AC power. The power cable has a molded IEC type termination, which mates to the power entry module of the Model 4970. The other end of the power cable is terminated for connection to a grounded, three-prong style AC power outlet. The cable has a foil shield and copper braid to provide suppression of EMI and EMC energy. AC Power Cable Specifications Maximum Voltage Rating: 125 VAC (minimum) Maximum Current Rating: 10 Amperes (minimum) Copper Braid Shield: 85% coverage Foil Shield: 100% coverage Conductors: 3 Conductors @ 41 gauge stranded wire. Agency Certifications: UL and CSA 4.4 Environmental Specifications The Model 4970 Auxiliary Power Unit meets all performance specifications over the range of environmental conditions defined in this section. All specifications have been verified according to Quality Assurance Environmental Testing Procedures (NPN 435-000-059, Rev. D). The Model 4970 is categorized as a type D product (stationary, portable, table-top operation). When any specified environmental condition is violated, operational performance and life expectancy of this product are compromised.

4.4.1 Operating Temperature High Operating Temperature: 50° C. (122° F.) Low Operating Temperature: 0° C. (32° F.) Reference NPN 435-000-059, Rev. D, Section 5.2 and 5.3 for operating temperature test procedure and pass/fail criteria.

4.4.2 Storage Temperature High Storage Temperature: 70° C. (158° F.) Low Storage Temperature: −30° C. (−22° F.) Reference NPN 435-000-059, Rev. D, Section 5.4 and 5.5 for storage temperature test procedure and pass/fail criteria.

4.4.3 Humidity Relative Humidity: Up to 95% noncondensing Reference NPN 435-000-059, Rev. D, Section 5.7 for operating test procedure and pass/fail criteria.

4.4.4 EMI/EMC The Model 4970 Auxiliary Power Unit will not radiate or conduct electromagnetic emissions in excess of the level described by the FCC Part 15, Subpart J, Class A Standard for computing devices.

4.5 Durability Specifications The Model 4970 Auxiliary Power Unit meets all performance specifications over a specific range of external physical conditions. All specifications have been verified according to Quality Assurance Environmental Testing Procedures (NPN 435-000-059, Rev. D). When any specified condition is violated, operational performance and life expectancy of this product are compromised.

4.5.1 Electro-Dynamic Random Vibration This simulates 1,000 miles of basic, common-carrier transportation for every hour of test. Although rarely encountered in normal operation, all Norand products are subjected to random vibrations regardless of where or how they are used. Reference NPN 435-000-059, Rev. D, Section 8.5 for operating test procedure and pass/fail criteria. Amplitude: 1.04 grams RMS (vertical axis) 0.20 grams RMS (transverse axis) 0.74 grams RMS (longitudinal axis) Frequency Range: 500 to 1500 cpm (cycles per minute) Sweep time: 1 minute Duration: 6 hours 4.5.2 Electro-Dynamic Quasi-Random Vibration Quasi-random vibration testing is a form of stress screening where vibrations are randomly induced on all three axes. This test identifies weaknesses in the product that occur due to extreme temperature change and vibration conditions. Reference NPN 435-000-059, Rev. D, Section 8.6 for operating test procedure and pass/fail criteria. Amplitude: 1.5 grams RMS Temperatures: 0° C., 50° C. Duration: 6 hours 4.5.2 Protected Drop
This test simulates handling that occurs during transportation. The packaging is adequate such that a drop from 36 inches on any surface or edge will not damage the product contained within the package. Reference NPN 435-000-059, Rev. D, Section 9.1 for test procedure and pass/fail criteria.

4.5.3 Unprotected Drop Stationary, portable products are most subject to drops from table top heights. This drop test verifies product functionality after a drop from thirty inches onto a plywood platform. Reference NPN 435-000-059, Rev. D, Section 9.2 for test procedure and pass/fail criteria.

4.5.4 Electrostatic Discharge (ESD) Performance is unaffected by any electrostatic discharge to any exterior surface or attachable cord. The Model 4970 is described as a Class B device for ESD protection. A Class B device is intended for a "typical environment" as detailed in the Engineering Special Report for ESD Test Standards (NPN 568-004-010). Test procedures are described in the "ESD Test Guidelines" specification (NPN 578-004-003). ESD Level: 20 KVolts minimum 4.5.5 Mean Time Between Failures (MTBF) The MTBF is the expected operational life time of the product under normal usage without exceeding any environmental conditions. Calculated: 88,751 Power On Hours (POH) Tested: To Be Determined

4.6 Agency Certifications 4.6.1 Underwriters Laboratories (UL) The Model 4970 Auxiliary Power Unit is certified by Underwriters Laboratories under the UL-478 Standard for electronic devices.

4.6.2 Federal Communications Commission (FCC) The Model 4970 Auxiliary Power Unit is certified by the Federal Communications Commission under the FCC Part 15, Subpart J, Class A Standard for computing devices.

5.0 Installation Specification

Proper installation of the Model 4970 Auxiliary Power Unit protects all devices in the system and promotes maximum system performance and life. Installation instructions are available in the Network Controller Installation Instructions (NPN 962-028-004).

5.1 Mechanical Installation 5.1.1 Wall Mount Installation Wall mount brackets (NPN 699-224-002) are available for wall surface installations. Studded posts on the rear of the chassis insert into slots on the wall mount brackets and slide into place as the chassis is lowered into place. When properly installed, the wall mount brackets are concealed. Wall mount brackets must be securely fastened to the wall. The brackets will be required to support 9 pounds. Two brackets are required to install the Model 4980. The brackets should be installed on 6 inch centers. Ensure that the brackets are parallel to each other and provide a level mounting platform.

5.1.2 Table Top (Free Standing) Installation Rubber feet provide a non-skid platform base for the Model 4970 chassis. Internal components have been distributed evenly to create a low center of gravity. The installation surface should be level and completely clear of non-system equipment.

5.2 Electrical Installation 5.2.1 Cable Installation 5.2.1.1 RS-485 Connectors The external RS-485 ports have 9-pin, female D-Sub connectors. Latching posts are provided with each connector. Cables are attached with clip latches provided on the connector housing of the cable.

5.2.1.2 AC Power Cable (NPN 321-054-001) The AC power cable is inserted into the receptacle provided in the power entry module on the left side of the Model 4970. The power cable is a detachable, IEC type. Complete insertion must be made for reliable operation. Refer to the Network Controller Installation Instructions (NPN 962-028-004) for AC power system requirements.

6.0 General Operational and Procedures

Once the system is correctly configured and all cables properly secured, the Model 4970 is ready for operation. This section describes the procedure for powering up the Model 4970.

6.1 Power Up Sequence The rocker switch of the power entry module is toggled to the on-line position. The power LED eluminates. Any terminals inserted into attached Multidocks receive transmission circuit power and will "wake-up".

7.0 Compatibility Specification 7.1 The Model 4970 is designed to service the Series 4000 Local Area Network. It is to be integrated into systems as a support device for the Model 4980 Network Controller only.

I claim as my invention:

1. A system for transmitting data to and from a plurality of portable data entry terminals, the system comprising:
   a plurality of data communication sub-systems each comprising:
   (a) local area network including a controller and a common data communication link interconnecting a plurality of data transfer points that transmit data between each of the plurality of data transfer points and the local area network over shared portions of the common data communication link, each data transfer point adapted to be coupled to any one of the plurality of portable data entry terminals for data transfer via the common data communication link;
   (b) a plurality of docking units, one for each of the plurality of data transfer points, each one of the plurality of docking units having a receptacle constructed to receive and retain therein any one of the plurality of portable data entry terminals and a data coupler connected to the one data transfer point corresponding to the one docking unit and arranged for coupling with any one of the plurality of portable data entry terminals upon being received therein such that data transfer with the local area network is carried out via said coupled data transfer point and the common data communication link; and
   (c) the controller coupling with the common data communication link to control data transfer between the local area network and any one of the plurality of portable data entry terminals when received by the corresponding one docking unit and one data transfer point; and
   a central controller providing communication between a respective controller of each of the plurality of data communication sub-systems and a central data link.

2. The system of claim 1, wherein the central controller further comprises circuitry that assigns a unique address to a portable data entry terminal when coupled to one of the plurality of docking units.

3. The system of claim 1 wherein each of the plurality of data transfer points is constructed to be coupled to any one of the plurality of portable data entry terminals.

4. The system of claim 1, wherein at least one of the data communication sub-systems further comprises a terminal controller that has quick release signal coupling with the common data path of the local area network to accommodate removal of any of the plurality of portable data terminals from the local area network for independent operation remote therefrom.

5. The system of claim 1, further comprising a host computer, the central controller providing a transparent communication path between the host computer and the plurality of portable data entry terminals.

6. In a system for gathering data, a plurality of portable data entry terminals, each data entry terminal having an array of terminal contacts,
   at least one unit, said unit comprising an aligned arrangement of docking receptacles, each of said docking receptacles having a like array of receptacle contacts, each of said docking receptacles adapted to receive one of said data entry terminals such that corresponding ones of said arrays of terminal and receptacle contacts mate with each other upon loading one of said data entry terminals into any one of said docking receptacles,
   said unit having electrical conductive means for transmitting data signals to and from each of said inserted data entry terminals and for providing electrical power signals to each of said inserted data entry terminals, said electrical conductive means comprising a set of main conductive paths, each main conductive path extending adjacent said arrangement of docking receptacles and continuously from a first end of said main conductive paths to a second end thereof, and a plurality of sets of branch conductive paths, one set of branch conductive paths for each of said docking receptacles, each branch conductive path extending continuously from one of said main conductive paths to a corresponding one of said receptacle contacts of its docking receptacle for providing distinct connection to each receptacle contact of its docking receptacle and for transmitting data from a loaded one of said plurality of portable data entry terminals via at least one terminal contact of said transmitting portable data entry terminal to a corresponding receptacle contact of each docking receptacle of said alignment arrangement.

7. In a data gathering system as claimed in claim 6, said unit further comprising common substrate means of elongated configuration with opposing ends, and connector means disposed at least one of said opposing ends, said main conductive paths disposed on said common substrate means and interconnected with said connector means.

8. In the data gathering system as claimed in claim 7, wherein said common substrate means comprises printed circuit board means.

9. In a data gathering system as claimed in claim 8, wherein said printed circuit board means mounts said arrangement of docking receptacles thereon.

* * * * *